United States Patent
Matsubara et al.

(10) Patent No.: US 7,383,056 B2
(45) Date of Patent: Jun. 3, 2008

(54) PROCESSING APPARATUS, PORTABLE TRANSMITTER, AND REMOTE OPERATION SYSTEM

(75) Inventors: Manabu Matsubara, Hyogo (JP); Akira Takee, Hyogo (JP); Minoru Yoshimura, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 727 days.

(21) Appl. No.: 11/010,484

(22) Filed: Dec. 14, 2004

(65) Prior Publication Data

US 2005/0164728 A1   Jul. 28, 2005

(30) Foreign Application Priority Data

Dec. 15, 2003  (JP) ............................. 2003-416398
Jan. 7, 2004  (JP) ............................. 2004-001979

(51) Int. Cl.
*H04B 7/00*  (2006.01)
*H04Q 7/20*  (2006.01)

(52) U.S. Cl. ................. 455/521; 455/569.2; 455/152.1; 455/575.9; 455/99; 455/345; 455/351; 455/352; 340/5.72; 340/426.36; 340/426.25; 340/426.13; 340/517

(58) Field of Classification Search ................ 455/521, 455/151.2, 569.2, 99, 575.6, 90.1, 575.9, 455/411, 41.2, 152.1, 154.4, 351, 419–421, 455/352, 344–346; 340/5.1, 5.72, 825.69–825.78, 340/825.62, 426, 428.5, 61, 5.64, 539.19, 340/506, 517, 825.49, 426.25, 426.36, 426.13, 340/426.1; 307/10.1, 10.2, 10.6

See application file for complete search history.

(56) References Cited

U.S. PATENT DOCUMENTS

| | | | |
|---|---|---|---|
| 5,723,911 A | 3/1998 | Glehr | |
| 6,243,022 B1 * | 6/2001 | Furukawa | 340/825.72 |
| 6,278,869 B1 * | 8/2001 | Lindenmeier et al. | 455/277.1 |
| 6,621,406 B2 * | 9/2003 | Kumano | 340/5.62 |
| 6,803,851 B1 | 10/2004 | Kramer et al. | |
| 6,958,675 B2 * | 10/2005 | Maeda et al. | 340/5.61 |
| 6,960,998 B2 * | 11/2005 | Menard et al. | 340/539.19 |
| 7,046,119 B2 * | 5/2006 | Ghabra et al. | 340/5.72 |
| 7,091,824 B2 * | 8/2006 | Matsubara et al. | 340/5.72 |

(Continued)

FOREIGN PATENT DOCUMENTS

JP   A 7-296211   11/1995

(Continued)

*Primary Examiner*—Sujatha Sharma
(74) *Attorney, Agent, or Firm*—Oliff & Berridge, PLC

(57) ABSTRACT

A processing apparatus is mounted on a to-be-equipped body, transmits/receives signals to/from a portable transmitter portably carried by a user, and activates one of functions provided in the to-be-equipped body in accordance with instruction information included in an instruction signal transmitted from the portable transmitter. The processing apparatus includes a receiving unit, a transmitting unit, a judgment unit, a control unit, and an adjustment unit. The receiving unit receives the instruction signal transmitted from the portable transmitter. The transmitting unit transmits a response signal. The judgment unit judges whether or not an acknowledgement signal has been received from the portable transmitter. The control unit activates a function to be activated by the instruction information when the judgment unit concludes that the acknowledgement signal has been received. The adjustment unit adjusts an arrival distance of the response signal in accordance with the function to be activated by the instruction information.

25 Claims, 49 Drawing Sheets

U.S. PATENT DOCUMENTS

| | | | |
|---|---|---|---|
| 7,149,480 B2 * | 12/2006 | Miyahara | 455/78 |
| 2004/0059483 A1 * | 3/2004 | Sukakura | 701/36 |
| 2004/0183714 A1 * | 9/2004 | Yamashita et al. | 342/70 |
| 2006/0186993 A1 * | 8/2006 | Inoue | 340/5.72 |
| 2007/0085657 A1 * | 4/2007 | Ogino | 340/5.64 |

FOREIGN PATENT DOCUMENTS

| | | | |
|---|---|---|---|
| JP | A 9-125768 | 5/1997 |
| JP | A 10-211868 | 8/1998 |
| JP | B2 3181997 | 4/2001 |
| JP | A 2001-349109 | 12/2001 |
| JP | A 2002-523833 | 7/2002 |
| WO | WO 00/12848 | 3/2000 |

* cited by examiner

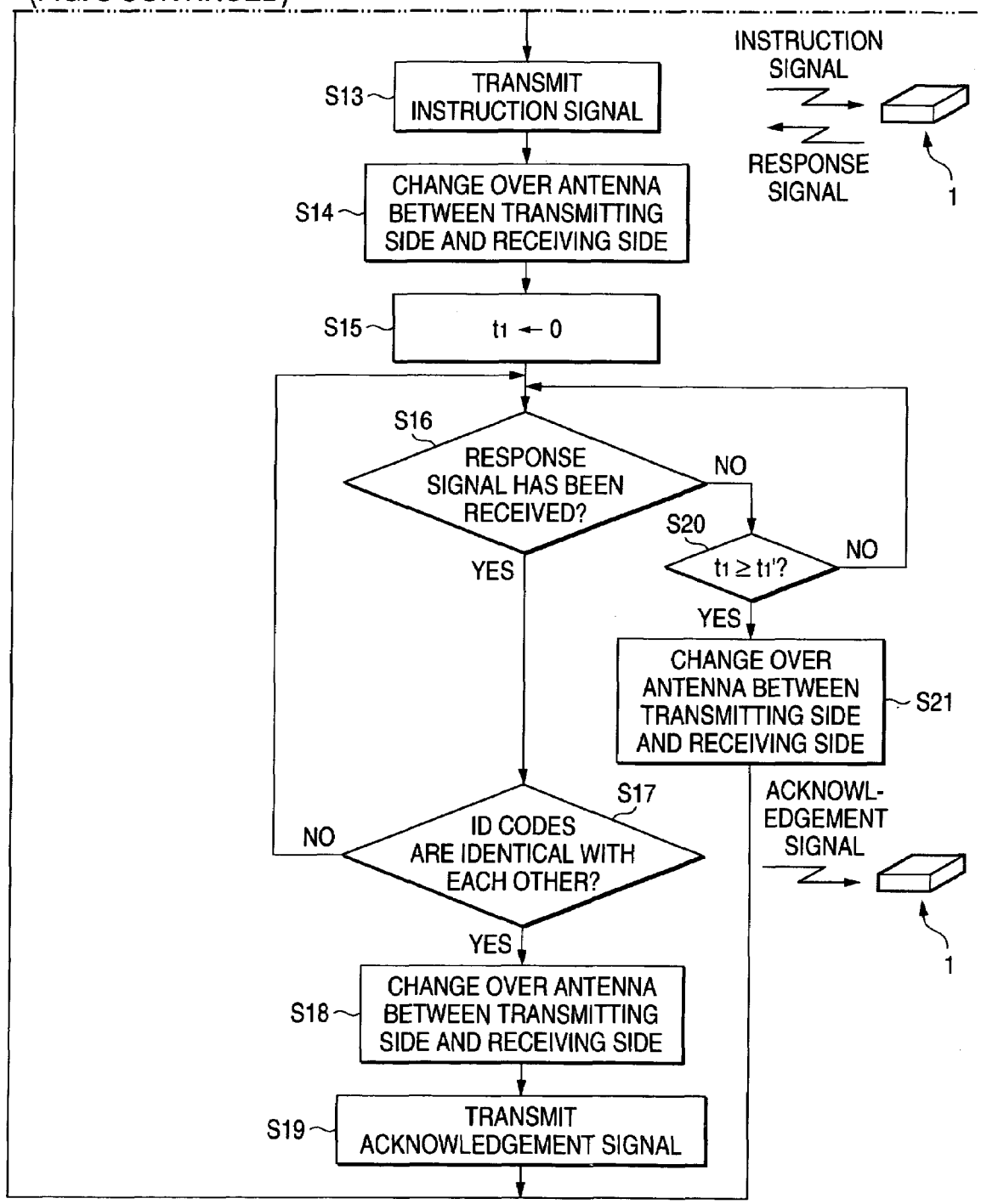

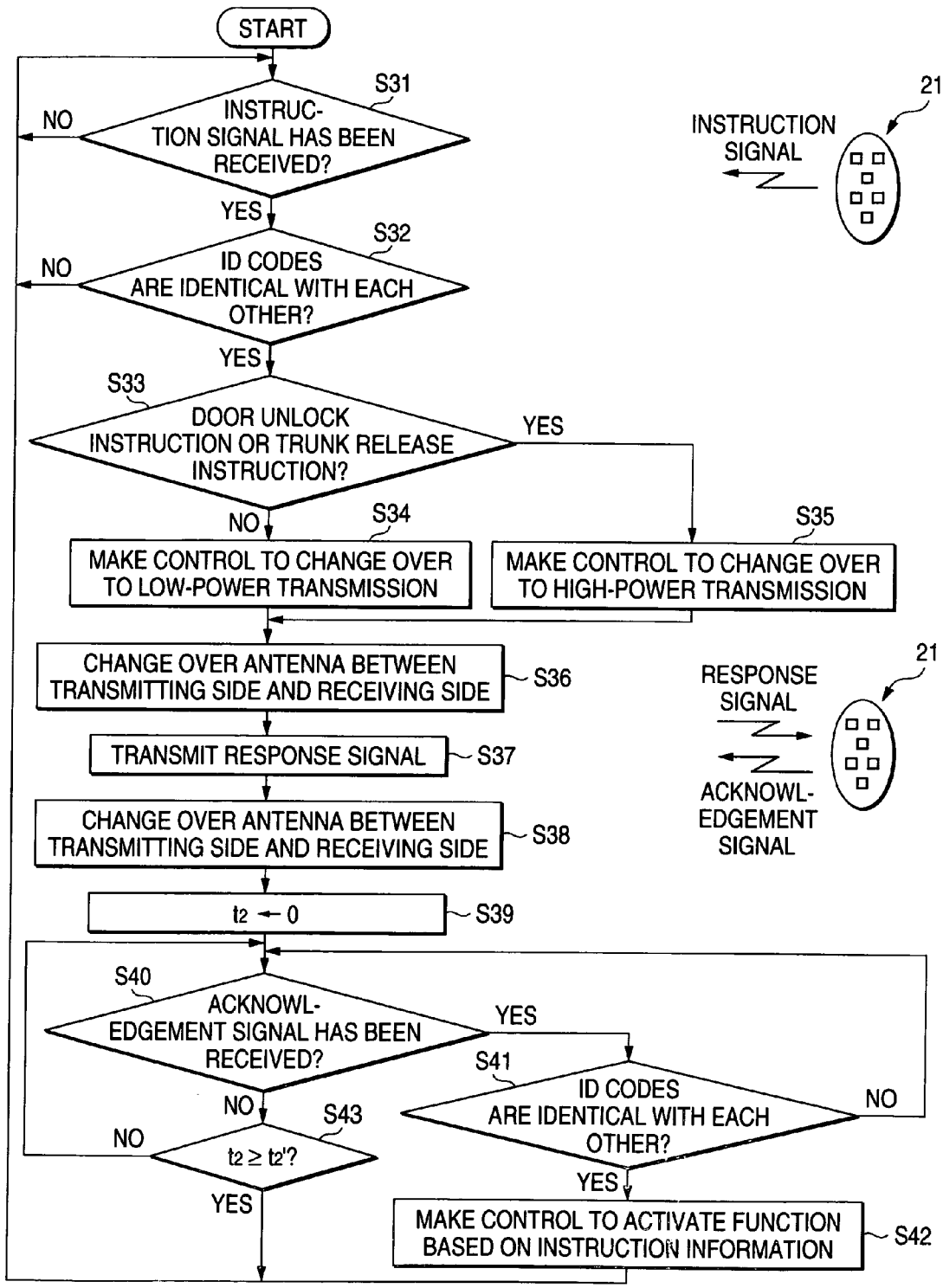

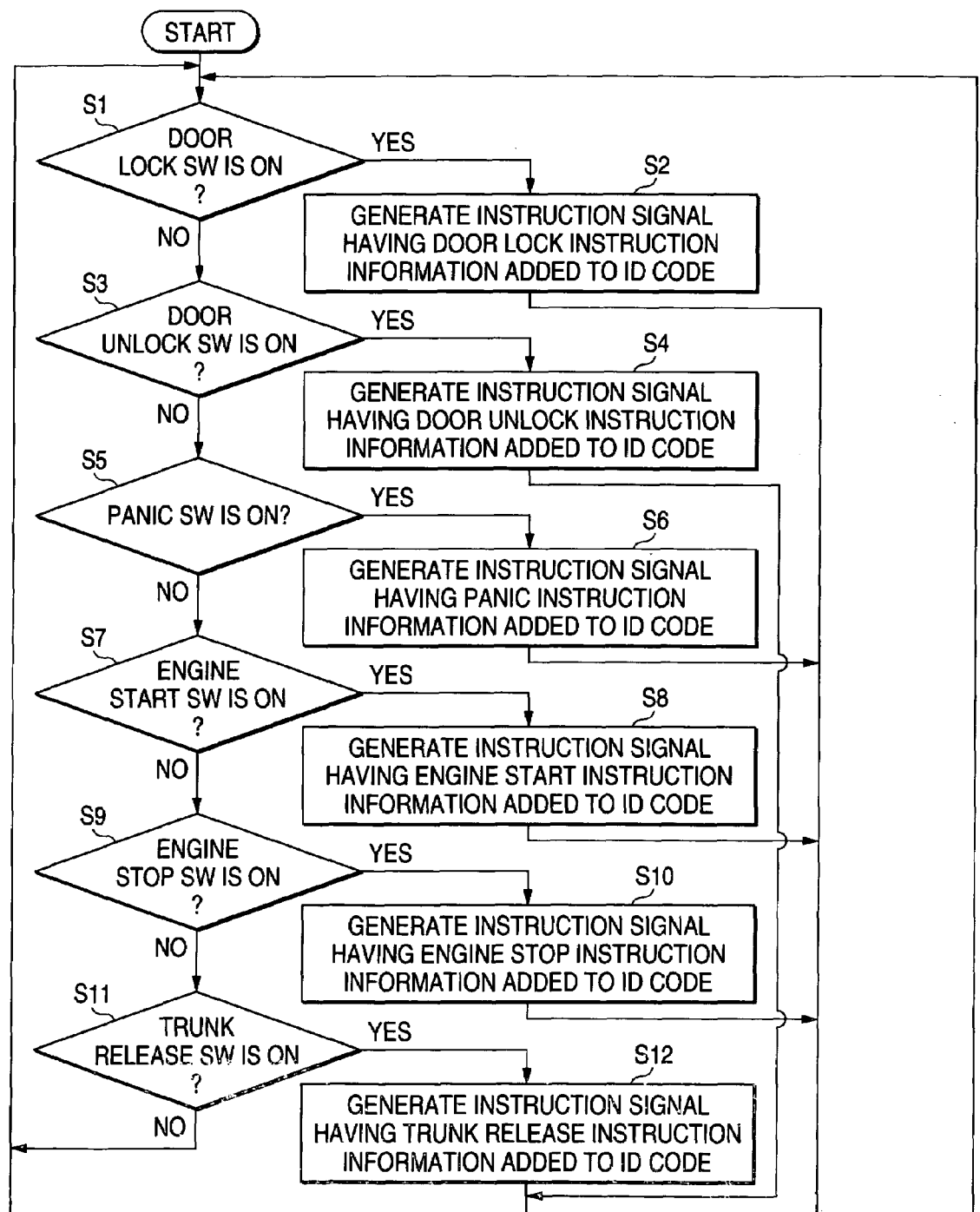

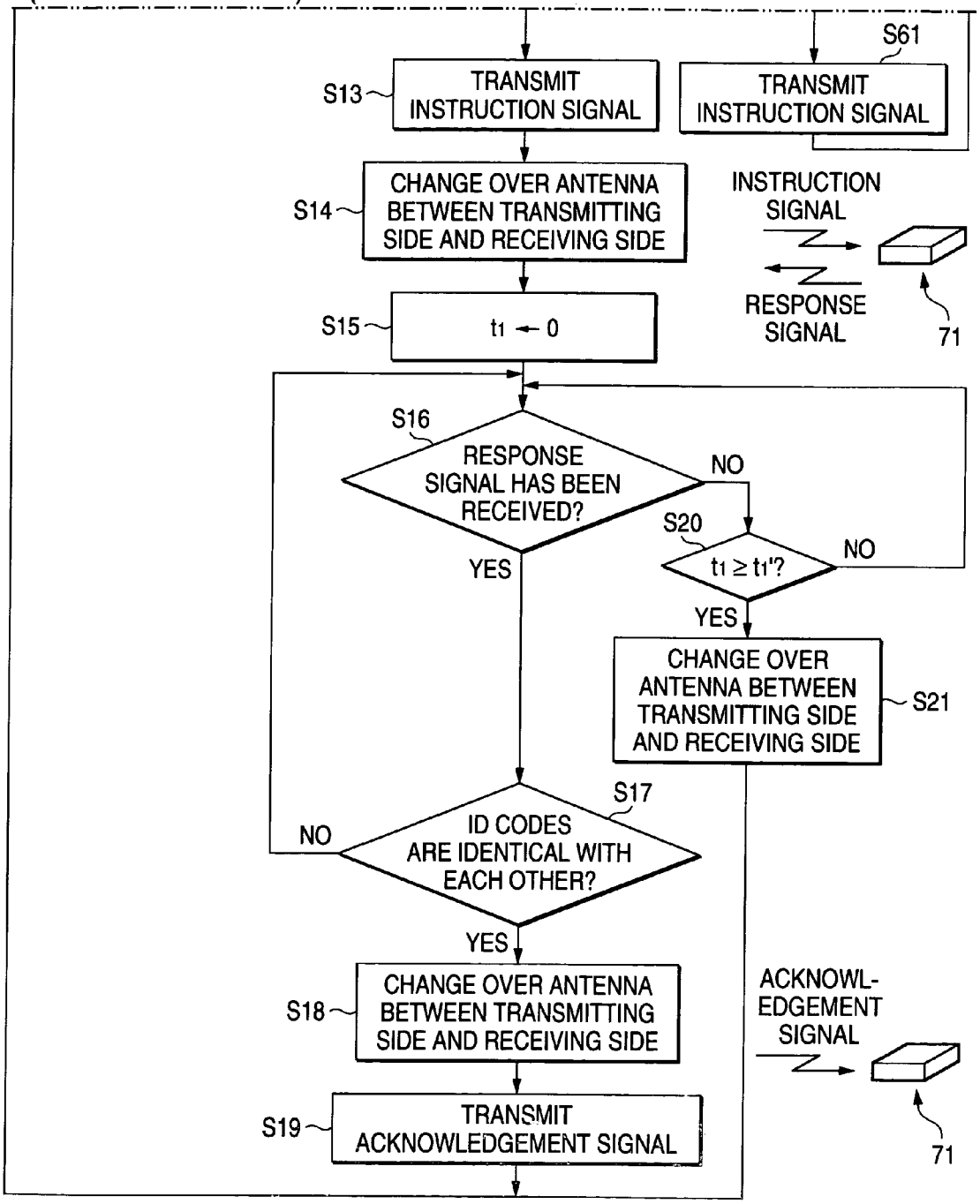

(CONT.)

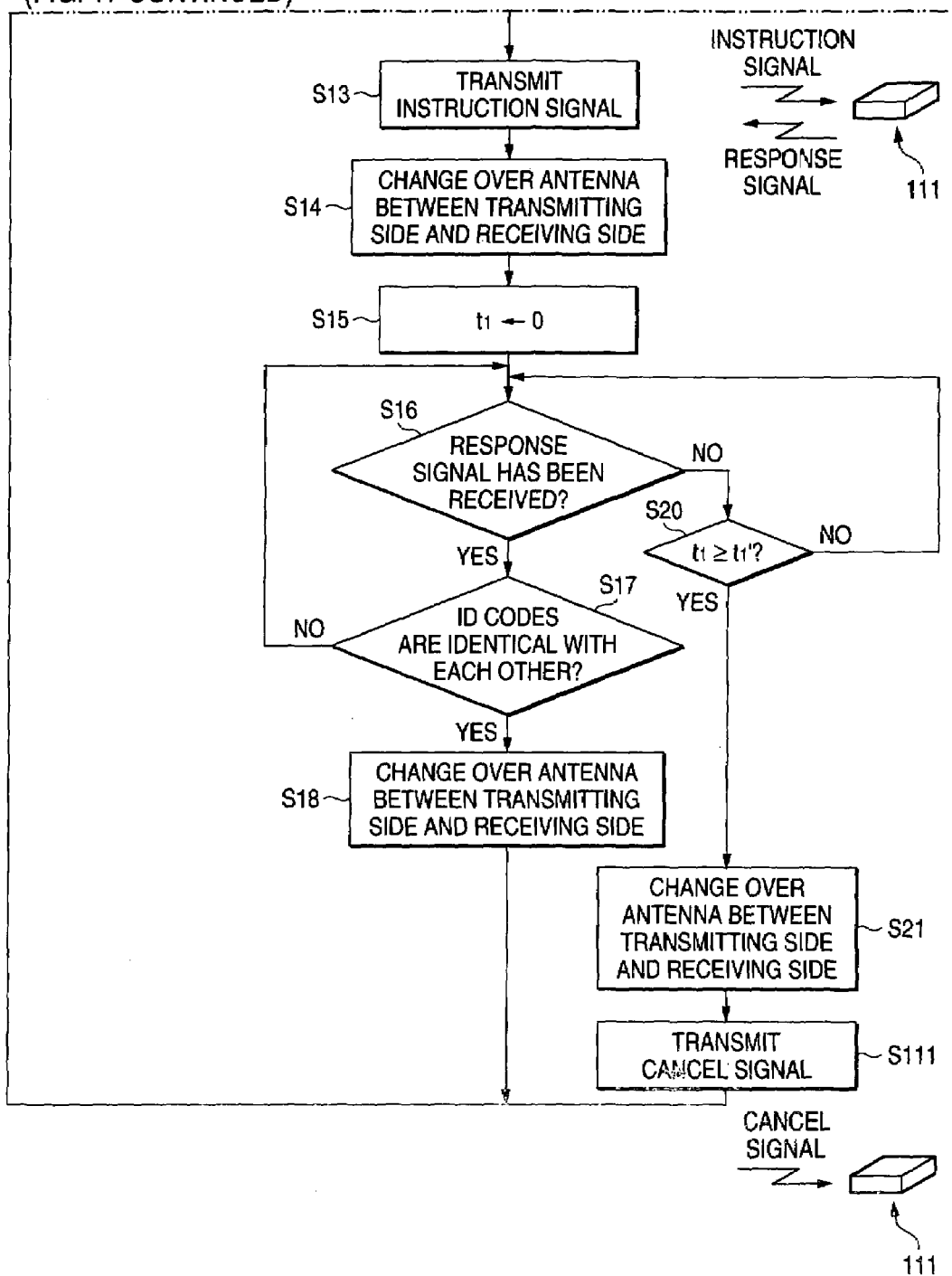

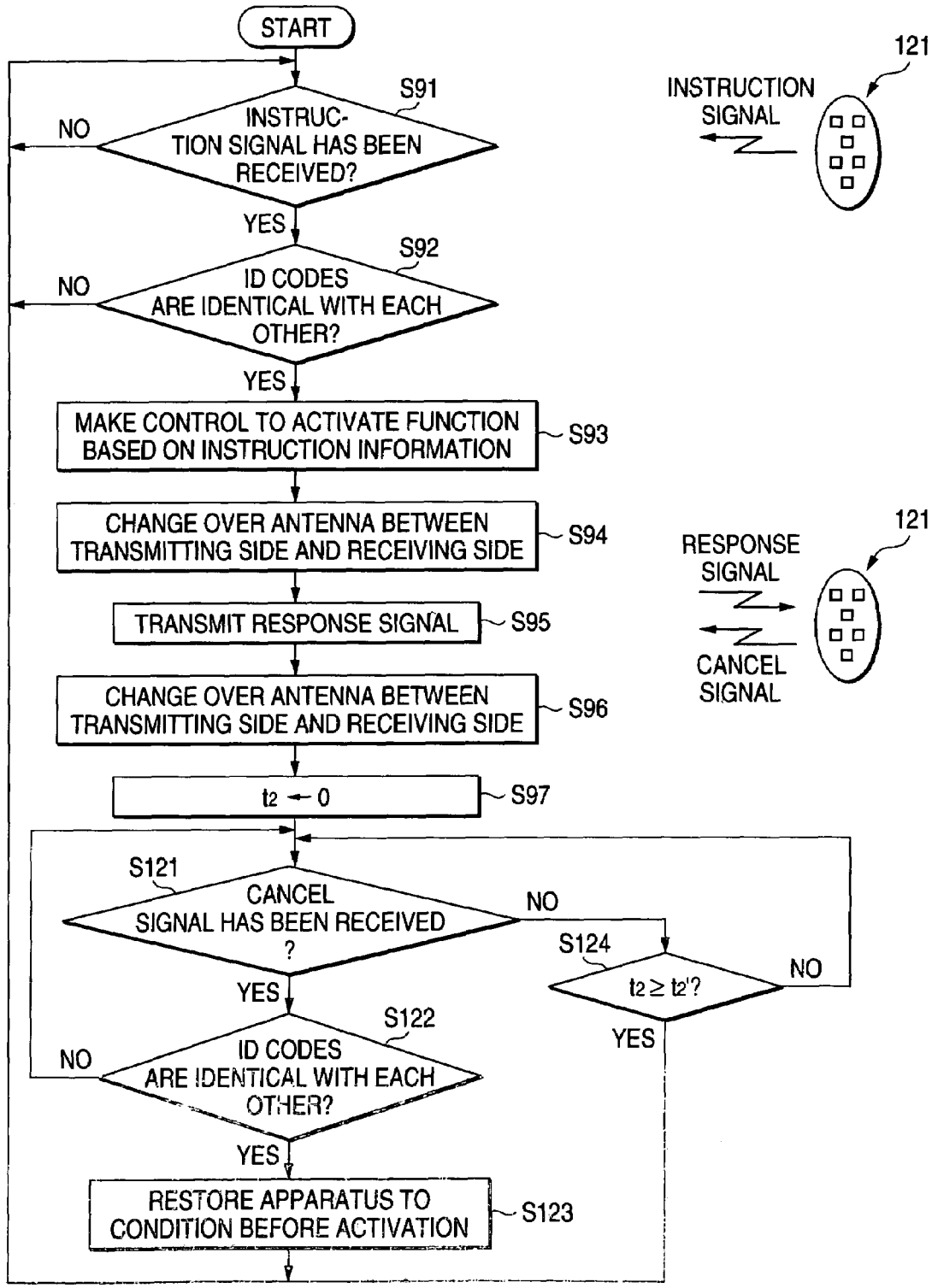

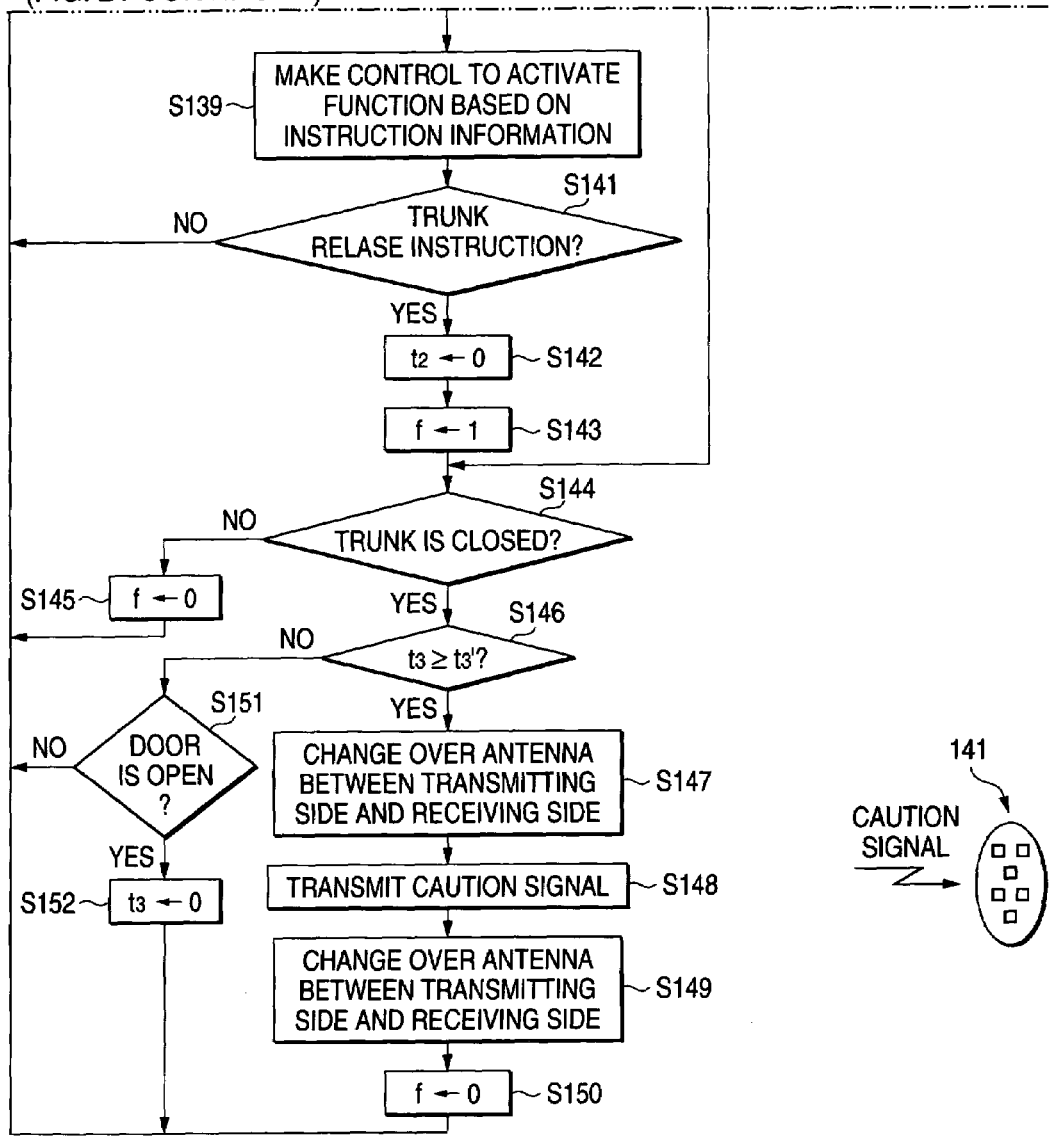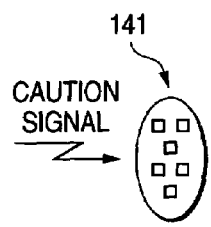

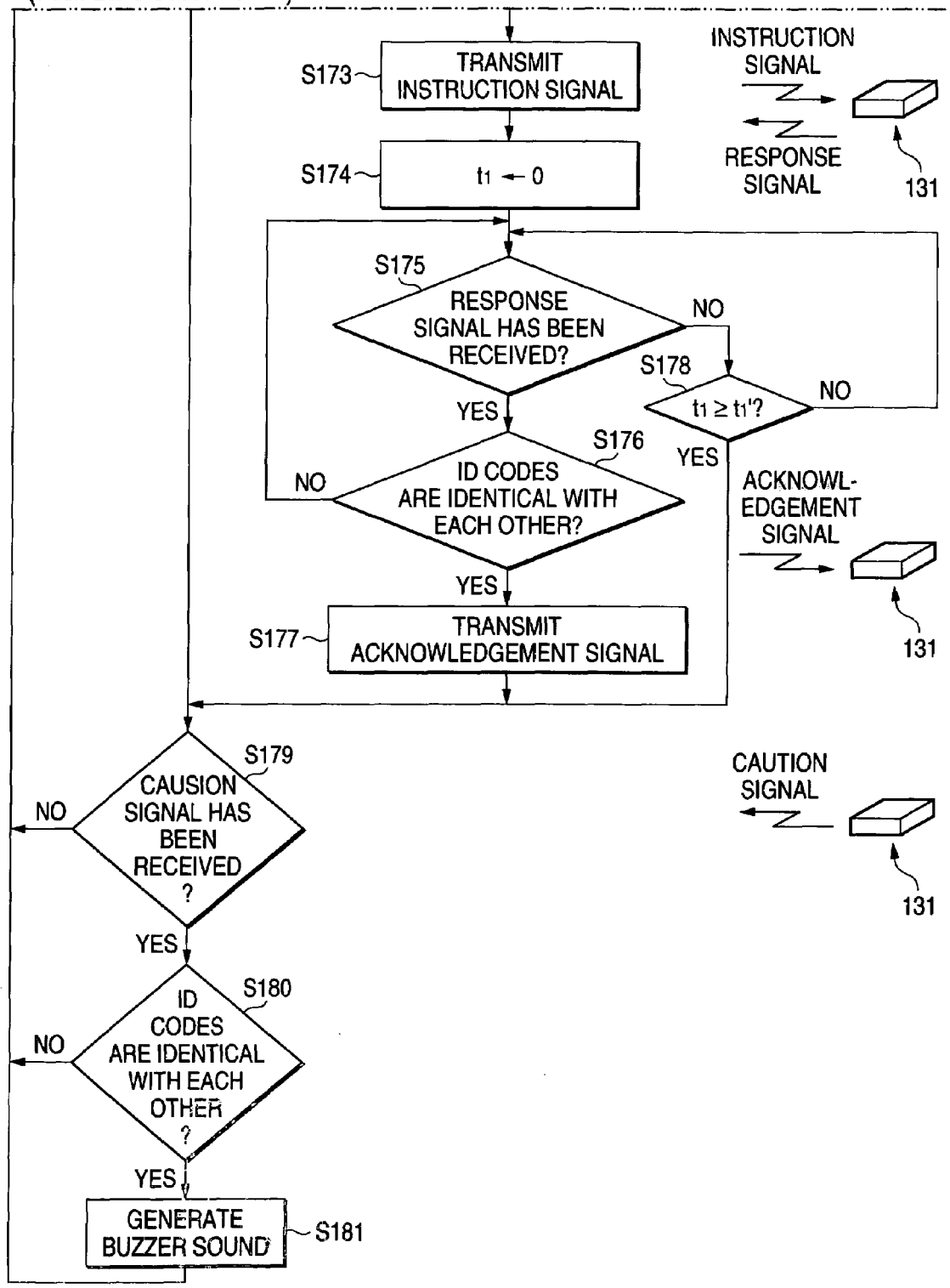

PROCESSING APPARATUS, PORTABLE TRANSMITTER, AND REMOTE OPERATION SYSTEM

BACKGROUND OF THE INVENTION

1. Field of the Invention

The present invention relates to processing apparatus, a portable transmitter and a remote operation system, and particularly relates to processing apparatus to be installed in a to-be-equipped body such as a mobile body, a portable transmitter for remotely operating a plurality of functions provided in the to-be-equipped body, and a remote operation system including the processing apparatus and the portable transmitter.

2. Description of the Related Art

There has been hitherto known an apparatus for making control to lock/unlock a door of a vehicle or to start/stop an engine of the vehicle by remote operation. For example, in a system (so-called keyless entry system) for achieving remote operation for locking/unlocking a door of a vehicle, a radio wave transmitted from a transmitter portably carried by a user is received by an antenna of the vehicle and then, an ECU (Electronic Control Unit) mounted on the vehicle identifies a transmitted code and actuates a door lock/unlock actuator.

The system for achieving the remote operation for locking/unlocking a door of a vehicle has been invented and mainly aimed at solving difficulty in looking for a key hole of the door or inserting a key into the key hole in the dark at night or the like. Accordingly, as for the remote operation for locking/unlocking the door, a user will not feel so inconvenienced even if the remote operation can be achieved only near the vehicle. Therefore, very weak radio wave power to be transmitted from the transmitter being carried by the user may be sufficient.

On the other hand, the system for attaining the remote operation for starting/stopping an engine of a vehicle has been invented and mainly aimed at warming up the engine by operation from the inside of a house or a building. Accordingly, a user will feel inconvenienced if the remote operation for starting/stopping the engine cannot be carried out from a place at a certain distance from the vehicle. Therefore, it is desired that the radio wave power to be transmitted from the transmitter being carried by the user is somewhat high.

In addition, recently, a system which can carry out remote operation to lock/unlock a door of a vehicle and to start/stop an engine of the vehicle by use of a single transmitter has been developed (for example, Japanese Patent No. 3181997, JP-A-Hei. 10-211868, and JP-A-2001-349109). When the remote operation for locking/unlocking the door of the vehicle can be achieved at a place far from the vehicle, for example, a door unlock operation button provided in the transmitter may be pushed down accidentally, so that the door may be unlocked in spite of absence of the user from the neighborhood of the vehicle. Thus, the vehicle may be put in a state against the interests of crime prevention.

As a solution to such a problem, Japanese Patent No. 3181997 discloses technique in which the electric field intensity of a radio wave received by a receiver furnished in a vehicle is detected, a distance from a transmitter is obtained indirectly from the detected electric field intensity, and an unlock instruction from the transmitter is accepted only when the obtained distance is within a short distance range or a middle distance range. Japanese Patent No. 3181997 also discloses another technique in which the transmitted radio wave power from an antenna furnished in a transmitter is attenuated as soon as an unlock operation button provided in the transmitter is pushed down, so that a receiver furnished in a vehicle is prevented from receiving a radio wave including an unlock code when there is a long distance between the transmitter and the receiver. That is, Japanese Patent No. 3181997 discloses techniques for reducing the risk of theft while attaining a main object of achieving the remote operation of these functions (engine start and stop functions, and door lock and unlock functions).

JP-A-Hei. 10-211868 and JP-A-2001-349109 disclose technique in which remote operation for starting/stopping an engine of a vehicle can be carried out at a place far from the vehicle, while remote operation for locking/unlocking a door of the vehicle is prevented from being carried out at a place far from the vehicle. That is, JP-A-Hei. 10-211868 and JP-A-2001-349109 discloses technique, which attains a main object of achieving the remote operation of these functions (engine start and stop functions, and door lock and unlock functions).

SUMMARY OF THE INVENTION

Functions to be operated remotely may include functions of locking/unlocking a door, a trunk, a bonnet, a fuel tank cap, etc., a function of starting/stopping an engine, a function (so-called panic function) of giving an alarm compulsorily by an instruction from a transmitter when a suspicious person exists near the vehicle, and so on. In the future, it is expected to commercially produce a transmitter capable of remotely operating such a large number of functions individually.

As described above, however, it is believed that user's minuter needs cannot be met sufficiently when the main object of achieving the remote operation of the functions is attained simply or the risk of theft is reduced simply. In other words, when a large number of functions can be operated remotely by a single transmitter, it is desired to set a remote operation allowable range suitably for each function.

If the user is far from the vehicle when the user is to activate a function by remote operation, it will be difficult for the user to confirm whether the function has been activated in accordance with the contents of the operation or not. JP-A-Hei. 9-125768 discloses technique for solving such a problem, that is, discloses a fixed transmitter-receiver which transmits a response signal when receiving a signal including an ID code and transmitted from a remote controller, and executes indicated job contents when receiving an acknowledgement signal transmitted from the remote controller in response to the response signal. JP-A-Hei. 9-125768 further discloses the remote controller which informs the user of the transmission of the acknowledgement signal as soon as the remote controller transmits the acknowledgement signal.

However, the technique disclosed in JP-A-Hei. 9-125768 has no contrivance for relieving the aforementioned risk of theft. In addition, since the fixed receiver carries out the indicated job contents after the fixed receiver receives the acknowledgement signal, there is a problem that it is long before the job contents are carried out actually after the first instruction. Particularly, as for the engine start function, it may require about 7 seconds before the start of the engine is completed after the activation control thereof is started. There is a fear that the user feels inconvenienced by the delay in starting the execution of job contents.

The present invention was made in consideration of the aforementioned problems. It is an object of the invention to provide processing apparatus, a portable transmitter and a remote operation system in which a remote operation allowable range can be set suitably, the remote operation allowable range can be set suitably for each of a plurality of functions which can be operated remotely, and a delay in executing job contents can be eliminated.

In order to attain the foregoing object, a processing apparatus (1) according to the invention is mounted on a to-be-equipped body, transmits/receives signals to/from a portable transmitter portably carried by a user, and activates one of functions provided in the to-be-equipped body in accordance with instruction information included in an instruction signal transmitted from the portable transmitter. The processing apparatus (1) includes a receiving unit, a transmitting unit, a judgment unit, a control unit, and an adjustment unit. The receiving unit receives the instruction signal transmitted from the portable transmitter. The transmitting unit transmits a response signal in response to the instruction signal. The judgment unit judges whether or not an acknowledgement signal transmitted from the portable transmitter in response to the response signal has been received. The control unit activates a function to be activated by the instruction information when the judgment unit concludes that the acknowledgement signal has been received. The adjustment unit adjusts an arrival distance of the response signal in accordance with the function to be activated by the instruction information.

According to the processing apparatus (1), when the transmitting unit transmits the response signal in response to the instruction signal transmitted from the portable transmitter and the judgment unit concludes that the acknowledgement signal transmitted from the portable transmitter in response to the response signal has been received, the control unit activates a function (such as an engine start/stop function or a door lock/unlock function) to be activated by instruction information included in the instruction signal. Accordingly, the control unit activates the function to be activated by the instruction information only after the judgment unit concludes that the acknowledgement signal transmitted from the portable transmitter has been received as well as the receiving unit receives the instruction signal transmitted from the portable transmitter.

The acknowledgement signal is transmitted from the portable transmitter when the portable transmitter receives the response signal transmitted from the processing apparatus (1). Accordingly, when the portable transmitter is so far from the to-be-equipped body that the response signal transmitted from the processing apparatus (1) cannot reach the portable transmitter (that is, the portable transmitter cannot receive the response signal), the acknowledgement signal is not transmitted from the portable transmitter. Thus, the range where the portable transmitter can receive the response signal (the range where the response signal can reach) corresponds to the remote operation allowable range.

In addition, according to the processing apparatus (1), the adjustment unit adjusts the arrival distance (that is, the remote operation allowable range) of the response signal in accordance with the function to be activated by the instruction information. Accordingly, in a case where a function, which may cause the user feel inconvenienced if the user cannot operate the function at some distance from the to-be-equipped body (such as a vehicle), such as an engine start/stop function, is to be activated by the instruction information, the adjustment unit can adjust the arrival distance of the response signal comparatively long. On the other hand, in a case where a function, which would not make the user feel so inconvenienced if the user can only operate the function near the to-be-equipped body, such as a door lock/unlock function or a trunk unlock function, is to be activated by the instruction information, the adjustment unit can shorten the arrival distance of the response signal. In such a manner, the remote operation allowable range can be set suitably for each function. Thus, the user friendliness can be improved, or the safety of the to-be-equipped body can be secured.

Further, according to the processing apparatus (1), the transmitting unit transmits the response signal in response to the instruction signal transmitted from the portable transmitter. Accordingly, based on judgment made as to whether or not the response signal has been received, the portable transmitter can grasp whether or not the instruction signal has reached the processing apparatus (1) properly. Thus, by use of the reception result of the response signal, the user can be informed correctly of whether or not a function agreeing with the contents of the user's operation has been activated.

A processing apparatus (2) according to the embodiment is be mounted on a to-be-equipped body, transmits/receives signals to/from a portable transmitter portably carried by a user, and activates one of functions provided in the to-be-equipped body in accordance with instruction information included in an instruction signal transmitted from the portable transmitter. The processing apparatus (2) includes a receiving unit, a first judgment unit, a first control unit, a transmitting unit, a second judgment unit, and a second control unit. The receiving unit receives the instruction signal transmitted from the portable transmitter. The first judgment unit judges whether or not it is necessary to transmit a response signal in response to the instruction signal, based on a function to be activated by the instruction information included in the instruction signal. The first control unit activates the function to be activated by the instruction information when the first judgment unit concludes that it is not necessary to transmit the response signal. The transmitting unit transmits the response signal when the first judgment unit concludes that it is necessary to transmit the response signal. The second judgment unit judges whether or not an acknowledgement signal transmitted from the portable transmitter in response to the response signal has been received. The second control unit activates the function to be activated by the instruction information when the second judgment unit concludes that the acknowledgement signal has been received.

Now assume that the portable transmitter is operated at a delicate position (that is, near a border) where it cannot be determined whether or not the instruction signal/the acknowledgement signal transmitted from the portable transmitter will reach the processing apparatus installed in the to-be-equipped body. In such a case, there may occur a case where the instruction signal reaches the processing apparatus while the acknowledgement signal does not reach the processing apparatus. Since the processing apparatus does not receive the acknowledgement signal in this case, the processing apparatus does not make activation control based on the instruction signal.

Accordingly, in the configuration where the transmitting unit transmits the response signal in response to the instruction signal and the second control unit activates a function after the second judgment unit concludes that the acknowledgement signal in response to the response signal has been received, the activation control based on the contents given at a position out of the remote operation allowable range can be surely prevented from being carried out. Thus, the safety of the to-be-equipped body (such as a vehicle) can be enhanced.

According to the processing apparatus (2), based on a function (such as an engine start/stop function or a door lock/unlock function) to be activated by instruction information included in an instruction signal transmitted from the portable transmitter, the first judgment unit judges whether or not it is necessary to transmit the response signal in response to the instruction signal. When the first judgment unit concludes that it is not necessary to transmit the response signal, the first control unit activates the function to be activated by the instruction information.

On the other hand, when it is necessary to transmit the response signal, the transmitting unit transmits the response signal. When an acknowledgement signal transmitted from the portable transmitter in response to the response signal is received, the second control unit activates the function to be activated by the instruction information included in the instruction signal.

Accordingly, activation controls for functions can be classified into ones to be carried out without waiting to receive the acknowledgement signal (to attach importance to user-friendliness) and others to be carried out after reception of the acknowledgement signal (to attach importance to safety). Thus, for example, the engine start/stop function or the door lock function is activated and controlled without waiting to receive the acknowledgement signal. On the other hand, a function, which may cause a security problem if a wide remote operation allowable range is set for the function (such as a door unlock function, a trunk unlock function, a bonnet unlock function, or a fuel tank cap unlock function), is activated and controlled after waiting to receive the acknowledgement signal. Thus, the balance can be adjusted between the user friendliness and the safety.

A processing apparatus (3) according to the invention is mounted on a to-be-equipped body, transmits/receives signals to/from a portable transmitter portably carried by a user, and activates one of functions provided in the to-be-equipped body in accordance with instruction information included in an instruction signal transmitted from the portable transmitter. The processing apparatus (3) includes a receiving unit, a transmitting unit, a judgment unit, and a control unit. The receiving unit receives the instruction signal transmitted from the portable transmitter. The transmitting unit transmits a response signal in response to the instruction signal, the response signal being shorter in arrival distance than the instruction signal. The judgment unit judges whether or not an acknowledgement signal transmitted from the portable transmitter in response to the response signal has been received. The control unit activates a function to be activated by the instruction information when the judgment unit concludes that the acknowledgement signal has been received.

According to the processing apparatus (3), when the transmitting unit transmits a response signal in response to an instruction signal transmitted from a portable transmitter and the judgment unit concludes that an acknowledgement signal transmitted from the portable transmitter in response to the response signal has been received, the control unit activates a function (such as an engine start/stop function or a door lock/unlock function) to be activated by instruction information included in the instruction signal. Accordingly, the control unit activates the function to be activated by the instruction information only after the judgment unit concludes that the acknowledgement signal transmitted from the portable transmitter has been received as well as the receiving unit receives the instruction signal transmitted from the portable transmitter.

The acknowledgement signal is transmitted from the portable transmitter when the portable transmitted receives the response signal transmitted from the processing apparatus (3). Accordingly, when the portable transmitter is so far from the to-be-equipped body that the response signal transmitted from the processing apparatus (3) cannot reach the portable transmitter (that is, the portable transmitter cannot receive the response signal), the acknowledgement signal is not transmitted from the portable transmitter. Thus, the range where the portable transmitter can receive the response signal (the range where the response signal can reach) corresponds to the remote operation allowable range.

In addition, according to the processing apparatus (3), since the arrival distance of the response signal is shorter than that of the instruction signal transmitted from the portable transmitter, the range where the portable transmitter can receive the response signal corresponds to the remote operation allowable range. Accordingly, the remote operation allowable range can be set suitably on the processing apparatus (3) side.

A processing apparatus (4) according to the invention is mounted on a to-be-equipped body, transmits/receives signals to/from a portable transmitter portably carried by a user, and activates one of functions provided in the to-be-equipped body in accordance with instruction information included in an instruction signal transmitted from the portable transmitter. The processing apparatus (4) includes a receiving unit, a first control unit, a transmitting unit, a judgment unit, and a second control unit. The receiving unit receives the instruction signal transmitted from the portable transmitter. The first control unit activates a function to be activated by the instruction information included in the instruction signal when the receiving unit receives the instruction signal. The transmitting unit transmits a response signal in response to the instruction signal. The judgment unit judges whether or not an acknowledgement signal transmitted from the portable transmitter in response to the response signal has been received. The second control unit performs one of (a) canceling activation of the function having no acknowledgement and (b) restoring the to-be-equipped body to a state before activating the function having no acknowledgement, when the judgment unit concludes that the acknowledgement signal has not been received.

According to the processing apparatus (4), when the receiving unit receives an instruction signal transmitted from the portable transmitter, the first control unit activates a function to be activated by instruction information included in the instruction signal. That is, the first control unit activates the function without waiting to receive an acknowledgement signal to be transmitted from the portable transmitter. Thus, the delay in starting the activation control can be eliminated.

In addition, the transmitting unit transmits a response signal in response to the instruction signal. When the judgment unit concludes that the acknowledgement signal to be transmitted from the portable transmitter in response to the response signal has not been received (for example, when the acknowledgement signal is not received even though two seconds have passed since the response signal was transmitted), the second control unit cancels the activation of the function or to restores the to-be-equipped body to the condition before activation. That is, when the second control unit concludes that the acknowledgement signal has not been received in spite that the first control unit has activated the function without waiting to receive the acknowledge signal, the second control unit cancels the activation of the function to restore the to-be-equipped body to the condition where the function has not been activated.

Further, according to the processing apparatus (4), the transmitting unit transmits the response signal in response to the instruction signal transmitted from the portable transmitter. Accordingly, based on judgment made as to whether the response signal has been received or not, the portable transmitter can grasp whether or not the instruction signal has reached the processing apparatus (4) properly. Thus, by use of the reception result of the response signal, the user can be informed correctly of whether or not a function agreeing with the contents of the user's operation has been activated. As a result, the delay in executing the job contents can be eliminated while the user can be informed correctly of whether or not a function agreeing with the contents of the user's operation has been activated.

A processing apparatus (5) according to the invention is mounted on a to-be-equipped body, transmits/receives signals to/from a portable transmitter portably carried by a user, and activates one of functions provided in the to-be-equipped body in accordance with instruction information included in an instruction signal transmitted from the portable transmitter. The processing apparatus (5) includes a receiving unit, a first control unit, a transmitting unit, a judgment unit, and a second control unit. The receiving unit receives the instruction signal transmitted from the portable transmitter. The first control unit activates a function to be activated by the instruction information included in the instruction signal when the receiving unit receives the instruction signal. The transmitting unit transmits a response signal in response to the instruction signal. The judgment unit judges whether or not a cancel signal, which is transmitted from the portable transmitter and includes cancel instruction information, has been received. The second control unit performs one of (a) canceling activation of the function in accordance with the cancel instruction information and (b) restoring the to-be-equipped body to a state before the activation of the function, when the cancel signal reception judgment unit concludes that the cancel signal has been received.

According to the processing apparatus (5), when the receiving unit receives an instruction signal transmitted from the portable transmitter, the first control unit activates a function to be activated by instruction information included in the instruction signal. That is, the first control unit activates the function without waiting to receive a reply from the portable transmitter to a response signal transmitted in response to the instruction signal. Thus, the delay in starting the activation control can be eliminated.

In addition, when the response signal is not received in the portable transmitter, a cancel signal is transmitted from the portable transmitter. When the judgment unit concludes that the cancel signal has been received (that is, the portable transmitter is not in a range where the response signal can reach the portable transmitter), the second control unit cancels the activation of the function or restores the to-be-equipped body to the condition before activation. That is, when the judgment unit concludes that the cancel signal has been received in spite that the first control unit activates the function without waiting to receive a reply from the portable transmitter in response to the response signal, the second control unit cancels the activation of the function to restore the to-be-equipped body to the condition where the function has not been activated.

Further, according to the processing apparatus (5), the response signal is transmitted in response to the instruction signal transmitted from the portable transmitter. Accordingly, based on judgment made as to whether or not the response signal has been received, the portable transmitter can grasp whether or not the instruction signal has reached the processing apparatus (5) properly. Thus, by use of the reception result of the response signal, the user can be informed correctly of whether or not a function agreeing with the contents of the user's operation has been activated. As a result, the delay in executing the job contents can be eliminated while the user can be informed correctly of whether or not a function agreeing with the contents of the user's operation has been activated.

A processing apparatus (6) according to the invention is based on any one of the processing apparatus (2) to (5), and further includes an adjustment unit that adjusts an arrival distance of the response signal in accordance with the function to be activated by the instruction information.

According to the processing apparatus (6), the adjustment unit adjusts the arrival distance (that is, the remote operation allowable range) of the response signal in accordance with the function to be activated by the instruction information. Accordingly, when a function, which may make the user will feel inconvenienced if the user cannot operate the function at some distance from the to-be-equipped body (such as a vehicle), such as an engine start/stop function, is to be activated by the instruction information, the arrival distance of the response signal may be made comparatively long. On the other hand, when a function, which may not make the user feel so inconvenienced if the user can only operate the function near the to-be-equipped body, such as a door lock/unlock function or a trunk unlock function, is to be activated by the instruction information, the arrival distance of the response signal may be shortened. In such a manner, the remote operation allowable range can be set suitably for each function. Thus, the user friendliness can be improved, or the safety of the to-be-equipped body can be secured.

In a processing apparatus (7) according to the invention is based on the processing apparatus (1), when the function to be activated by the instruction information is a function, which may cause a security problem if a remote operation allowable range for the function is wider than a predetermined distance, the adjustment unit sets the arrival distance of the response signal within the predetermined distance.

According to the processing apparatus (7), when a function, which may cause a security problem if a wide remote operation allowable range is set for the function (such as a door unlock function, a trunk unlock function, a bonnet unlock function or a fuel tank cap unlock function) is to be activated by the instruction information, the arrival distance of the response signal may be set within the predetermined distance (for example, 10 m) so that the arrival distance of the response signal is limited within the vicinity of the to-be-equipped body (such as a vehicle). In such a manner, the remote operation of the door unlock function or the trunk unlock function can be accepted, for example, only within a range where the user can observe visually. Thus, the safety of the to-be-equipped body (such as a vehicle) can be secured.

A processing apparatus (8) according to the invention is based on any one of the processing apparatus (1) and (3) and further includes a second adjustment unit and an information unit. The second judgment unit judges whether or not a trunk lock mechanism of the to-be-equipped body has been unlocked for at least a predetermined time, when the control unit activates a function of unlocking the trunk lock mechanism in accordance with the instruction signal transmitted from the portable transmitter. The information unit informs the user of a fact that the trunk lock mechanism has been unlocked, when the second judgment unit concludes that the trunk lock mechanism has been unlocked for at least the predetermined time.

In a processing apparatus (9) according to the invention is based on the processing apparatus (8), when (a) the control unit activates the function of unlocking the trunk lock mechanism and (b) a door-open detection unit detects that a door is opened before the trunk lock mechanism has been unlocked for the predetermined time, the information unit is prohibited from informing the user.

It is believed that the risk of vehicle theft will increase if the door or the trunk is unlocked by remote operation when the user is not near the to-be-equipped body (such as a vehicle). It is also believed that the risk of theft is higher when the trunk has been unlocked than when the door has been unlocked.

This reason will be described below. Whether or not the trunk has been unlocked can be more easily found from the outside than whether or not the door has been unlocked. In addition, the trunk can be closed only by hand. Further, even if the door is unlocked by remote operation, the door cannot open at its own will. Accordingly, chances of theft when the door has been unlocked are lower than those when the trunk has been unlocked. Further, if there is provided an auto-relock function, the door will be locked automatically when a predetermined period of time has passed with the door not opened. Thus, it cannot be regarded as acceptable that the trunk is kept unlocked though the user is not near the vehicle.

According to the processing apparatus (8) or (9), when the trunk lock mechanism has been unlocked for at least the predetermined time after the control unit activates the unlock function for unlocking the trunk lock mechanism in response to the instruction signal transmitted from the portable transmitter, the information unit informs the user of the fact that the trunk lock mechanism has been unlocked. For example, the information unit may display in a display portion provided in the portable transmitter, or turn on a lamp, or a voice, vibration, to inform the user of the fact that the trunk lock mechanism has been unlocked.

In addition, the condition set forth above includes the elapse of at least the predetermined time with the trunk lock mechanism not being locked. Accordingly, the user can recognize that the predetermined time has passed with the trunk being still unlocked since the trunk was unlocked by remote operation. Thus, the risk of theft can be lowered.

Further, according to the processing apparatus (9), when the door-open detection unit detects the opening of the door (that is, the user is near the vehicle) before the condition is established after the trunk lock mechanism has been unlocked in response to the instruction signal, the information unit is prohibited from informing the user. That is, when the user is near the vehicle, information of the unlocked state of the trunk can be avoided even if the predetermined time has passed since the trunk was unlocked by remote operation. Thus, unnecessary information can be avoided.

A portable transmitter (1) according to the invention is portably carried by a user, and transmits/receives signals to/from a processing apparatus installed in a to-be-equipped body to remotely operate one of functions provided in the to-be-equipped body. The portable transmitter includes a first transmitting unit, a receiving unit, a judgment unit, and a second transmitting unit. The first transmitting unit transmits, in accordance with a predetermined operation, an instruction signal including instruction information for activating the function provided in the to-be-equipped body. The receiving unit receives signals transmitted from the processing apparatus. The judgment unit judges whether or not a response signal transmitted from the processing apparatus in response to the instruction signal has been received. The second transmitting unit transmits a cancel signal including cancel instruction information for giving an instruction to cancel activation of the function to be activated in accordance with the instruction information included in the instruction signal, when the judgment unit concludes that the response signal transmitted from the processing apparatus has not been received.

According to the portable transmitter (1), when the judgment unit concludes that a response signal to be transmitted from the processing apparatus in response to an instruction signal has not been received (for example, when the response signal is not received though two seconds have passed since the instruction signal was transmitted), the second transmitting unit transmits a cancel signal including cancel instruction information for giving an instruction to cancel the activation of a function to be activated by instruction information included in the instruction signal is transmitted.

As a result, the cancel signal will be transmitted if the user performs remote operation using the portable transmitter (1) in a range where the response signal to be transmitted from the processing apparatus cannot be received. Accordingly, when the arrival distance of the response signal to be transmitted from the processing apparatus is adjusted for each function, the remote operation allowable range can be set for each function.

A remote operation system (1) according to the invention includes any one of processing apparatuses (1) to (9) and a portable transmitter. The portable transmitter includes a second receiving unit, a second transmitting unit, a third transmitting unit, and a second adjustment unit. The second receiving unit receives signals transmitted from the processing apparatus. The second transmitting unit transmits the instruction signal, in accordance with a predetermined operation. The third transmitting unit transmits an acknowledgement signal in response to the response signal transmitted from the processing apparatus. The second adjustment unit adjusts an arrival distance of the instruction signal in accordance with the function to be activated.

According to the remote operation system (1), not only the arrival distance (that is, the remote operation allowable range) of the response signal to be transmitted from the processing apparatus but also the arrival distance of the instruction signal to be transmitted from the portable transmitter are adjusted in accordance with a function to be activated. That is, not only one but both of the arrival distance of a signal to be transmitted from the processing apparatus and the arrival distance of a signal to be transmitted from the portable transmitter are adjusted, so that the remote operation allowable range can be set more suitably.

A portable transmitter (2) according to the invention remotely operates functions provided in a vehicle. The portable transmitter (2) includes a transmitting unit and an adjustment unit. The transmitting unit transmits a signal including an instruction signal for activating one of the functions provided in the vehicle, the functions to be operated remotely including a door unlock function and a trunk unlock function. The adjustment unit adjusts an arrival distance of a signal transmitted by the transmitting unit so that an arrival distance of a signal for activating the trunk unlock function is shorter than that of a signal for activating the door unlock function.

It is believed that the risk of theft when the trunk has been unlocked is higher than that when the door has been unlocked. This reason will be described below. Whether or not the trunk has been unlocked or not can be more easily found from the outside than whether the door has been unlocked. In addition, the trunk can be closed only by hand. Further, even if the door is unlocked by remote operation, the door cannot open at its own will. Accordingly, chances of theft when the door has been unlocked are lower than those when the trunk has been unlocked. Further, if there is provided an auto-relock function, the door will be locked automatically when a predetermined period of time has passed with the door not open.

According to the portable transmitter (2), the adjustment unit adjusts the arrival distance of the signal so that the arrival distance of a signal for activating the door unlock function is shorter than that of a signal for activating the trunk unlock function. Thus, the remote operation allowable range in the trunk unlock function can be limited to only a range closer to the vehicle than the remote operation allowable range in the door unlock function. Accordingly, the risk of vehicle theft can be further reduced so that the security can be improved.

A portable transmitter (3) according to the invention remotely operates functions provided in a vehicle. The portable transmitter (3) includes a transmitting unit and an adjustment unit. The transmitting unit transmits a signal including an instruction signal for activating one of the functions provided in the vehicle, the functions to be operated remotely including an engine stop function and an engine start function. The adjustment unit adjusts an arrival distance of a signal transmitted by the transmitting unit so that an arrival distance of a signal for activating the engine start function is shorter than that of a signal for activating the engine stop function.

According to the portable transmitter (3), the adjustment unit adjusts the arrival distance of the signal so that the arrival distance of a signal for activating the engine start function is shorter than that of a signal for activating the engine stop function. Thus, the engine stop function can be always operated remotely wherever the engine start function can be operated remotely. Accordingly, the engine can be prevented from being driven unnecessarily.

A portable transmitter (4) according to the invention remotely operates functions provided in a vehicle. The portable transmitter (4) includes a transmitting unit and an adjustment unit. The transmitting unit transmits a signal including an instruction signal for activating one of the functions provided in the vehicle, the functions to be operated remotely including a panic function and a door unlock function, the panic function being a function of forcibly generating an alarm in response to an instruction from the portable transmitter. The adjustment unit adjusts an arrival distance of a signal transmitted by the transmitting unit so that an arrival distance of a signal for activating the door unlock function is shorter than that of a signal for activating the panic function.

The panic function is a function of forcibly giving an alarm when the existence of a suspicious person inside or near the vehicle is detected in a position at a distance from the vehicle. Therefore, it is inconvenient and risky that the panic function cannot be operated from a place at a certain distance from the vehicle. On the other hand, the user may not feel so inconvenienced if the user can operate the door unlock function only near the vehicle. In addition, the risk of vehicle theft will increase if the door unlock function can be operated at a place far from the vehicle.

According to the portable transmitter (4), the adjustment unit adjusts the arrival distance of the signal so that the arrival distance of a signal for activating the door unlock function is shorter than that of a signal for activating the panic function. Thus, the remote operation allowable range in the door unlock function can be limited to only a range closer to the vehicle than the remote operation allowable range in the panic function. Accordingly, it is possible to obtain a remote operation system keeping a balance between the user-friendliness and the security.

A portable transmitter (5) according to the invention remotely operates functions provided in a vehicle. The portable transmitter (5) includes a transmitting unit and an adjustment unit. The transmitting unit transmits a signal including an instruction signal for activating one of the functions provided in the vehicle, the functions to be operated remotely including a panic function and a trunk unlock function, the panic function being a function of forcibly generating an alarm in response to an instruction from the portable transmitter. The adjustment unit adjusts an arrival distance of a signal transmitted by the transmitting unit so that an arrival distance of a signal for activating the trunk unlock function is shorter than that of a signal for activating the panic function.

The panic function is a function of forcibly giving an alarm when the existence of a suspicious person inside or near the vehicle is detected in a position at a distance from the vehicle. Therefore, it is inconvenient and risky that the panic function cannot be operated from a place at a certain distance from the vehicle. On the other hand, the user may not feel so inconvenienced if the user can operate the trunk unlock function only near the vehicle. In addition, the risk of vehicle theft will increase if the trunk unlock function can be operated at a place far from the vehicle.

According to the portable transmitter (5), the adjustment unit adjusts the arrival distance of the signal so that the arrival distance of a signal for activating the trunk unlock function is shorter than that of a signal for activating the panic function. Thus, the remote operation allowable range in the trunk unlock function can be limited to only a range closer to the vehicle than the remote operation allowable range in the panic function. Accordingly, it is possible to obtain a remote operation system keeping a balance between the user-friendliness and the security.

In a portable transmitter (6) according to the invention is based on any one of the portable transmitters (2) to (5), number of the functions to be operated remotely is three or more. The adjustment units classifies arrival distances of the signals transmitted by the transmitting unit into at least three levels.

According to the portable transmitter (6), arrival distances of signals to be transmitted from the transmitting unit are classified into not two levels but at least three levels. Accordingly, not simple setting such that remote operation up to 100 m distant from the vehicle can be allowed for some functions while remote operation up to 300 m distant from the vehicle can be allowed for the other functions; but minute setting such that, for example, remote operation up to 100 m distant from the vehicle can be allowed for the door lock function, remote operation up to 30 m distant from the vehicle can be allowed for the door unlock function, and remote operation up to 10 m distant from the vehicle can be allowed for the trunk unlock function can be made.

A portable transmitter (7) according to the invention remotely operates functions provided in a vehicle. The portable transmitter (7) includes a transmitting unit and an adjustment unit. The transmitting unit transmits a signal including an instruction signal for activating one of the functions provided in the vehicle, the functions to be operated remotely including at least three kinds of functions. The adjustment unit classifies arrival distances of the signals transmitted by the transmitting unit into at least three levels to adjust the arrival distances of the signals based on the functions to be operated remotely.

According to the portable transmitter (7), the adjustment unit classifies arrival distances of signals to be transmitted from the transmitting unit into not two levels but at least three levels. Accordingly, not simple setting such that remote operation up to 100 m distant from the vehicle can be allowed for some functions while remote operation up to 300 m distant from the vehicle can be allowed for the other functions; but minute setting such that, for example, remote operation up to 200 m distant from the vehicle can be allowed for the engine start and stop functions, the panic function and the door lock function, remote operation up to 30 m distant from the vehicle can be allowed for the door unlock function, and remote operation up to 10 m distant from the vehicle can be allowed for the trunk unlock function can be made.

In a portable transmitter (8) according to the invention based on any one of the portable transmitters (2) to (7), the adjustment unit adjusts power intensity of the signal transmitted by the transmitting unit so as to adjust the arrival distance of the signal.

According to the portable transmitter (8), the adjustment unit adjusts the arrival distance of a signal to be transmitted from the transmitting unit by adjusting the power intensity of the signal. Thus, the number of transmitting antennas to be furnished in the portable transmitter can be reduced to one.

A portable transmitter (9) according to the invention based on anyone of the portable transmitters (1) to (8), further includes a plurality of transmitting antennas different in radiant efficiency. The adjustment unit changes over from one of the transmitting antennas to another so as to adjust the arrival distance of the signal.

According to the portable transmitter (9), the adjustment unit adjusts the arrival distance of a signal to be transmitted from the transmitting unit by changing over from one of transmitting antennas different in radiant efficiency to another. As a result, the number of transmitting antennas increases, but it is not necessary to furnish a member for adjusting the power intensity. It will go well only if a comparatively simple member such as a changeover switch for changing over from one antenna to another is furnished.

The arrival distance of a signal may be adjusted not only by changing over from one of transmitting antennas different in radiant efficiency to another but also by adjusting the power intensity of the signal. Thus, the remote operation allowable range can be adjusted more minutely for each function. For example, assume that only two transmitting antennas different in radiant efficiency are furnished. In such a case, the arrival distances (that is, the remote operation allowable ranges) of signals can be classified into only two levels by changing over from one antenna to the other simply. However, the arrival distances can be classified into three or more levels by using adjustment of signal power intensity.

A portable transmitter (10) according to the invention based on any one of the portable transmitters (1) to (9), further includes a detection unit and an output reduction unit. The detection unit detects a battery capacity. The output reduction unit reduces a radio wave transmission power based on the battery capacity detected by the detection unit.

According to the portable transmitter (10), the output reduction unit reduces the radio wave transmitting power in accordance with the battery capacity. Thus, when, for example, the battery capacity is low, the radio wave transmitting power can be reduced. Accordingly, the usable period of the battery can be prolonged, though the arrival distance of the transmitted radio wave is shortened.

A portable transmitter (11) according to the invention based on the portable transmitter (10), further includes an information unit that informs a user of reduction in the radio wave transmission power based on the battery capacity detected by the detection unit.

According to the portable transmitter (11), the information unit informs the user of the fact that the radio wave transmitting power has been reduced in accordance with the battery capacity. Accordingly, the user can recognize that the remote operation allowable range has been narrowed not due to a fault but due to reduction in battery power. Thus, the user can take proper measures quickly.

BRIEF DESCRIPTION OF THE DRAWINGS

FIG. 4 is a flow chart showing a processing operation to be executed by a microcomputer in the processing apparatus according to Embodiment (1).

FIG. 11 is a flow chart showing a processing operation to be executed by a microcomputer in the portable transmitter according to Embodiment (4).

FIG. 18 is a flow chart showing a processing operation to be executed by a microcomputer in processing apparatus according to Embodiment (7).

DETAILED DESCRIPTION OF THE PREFERRED EMBODIMENTS

Figure 1:
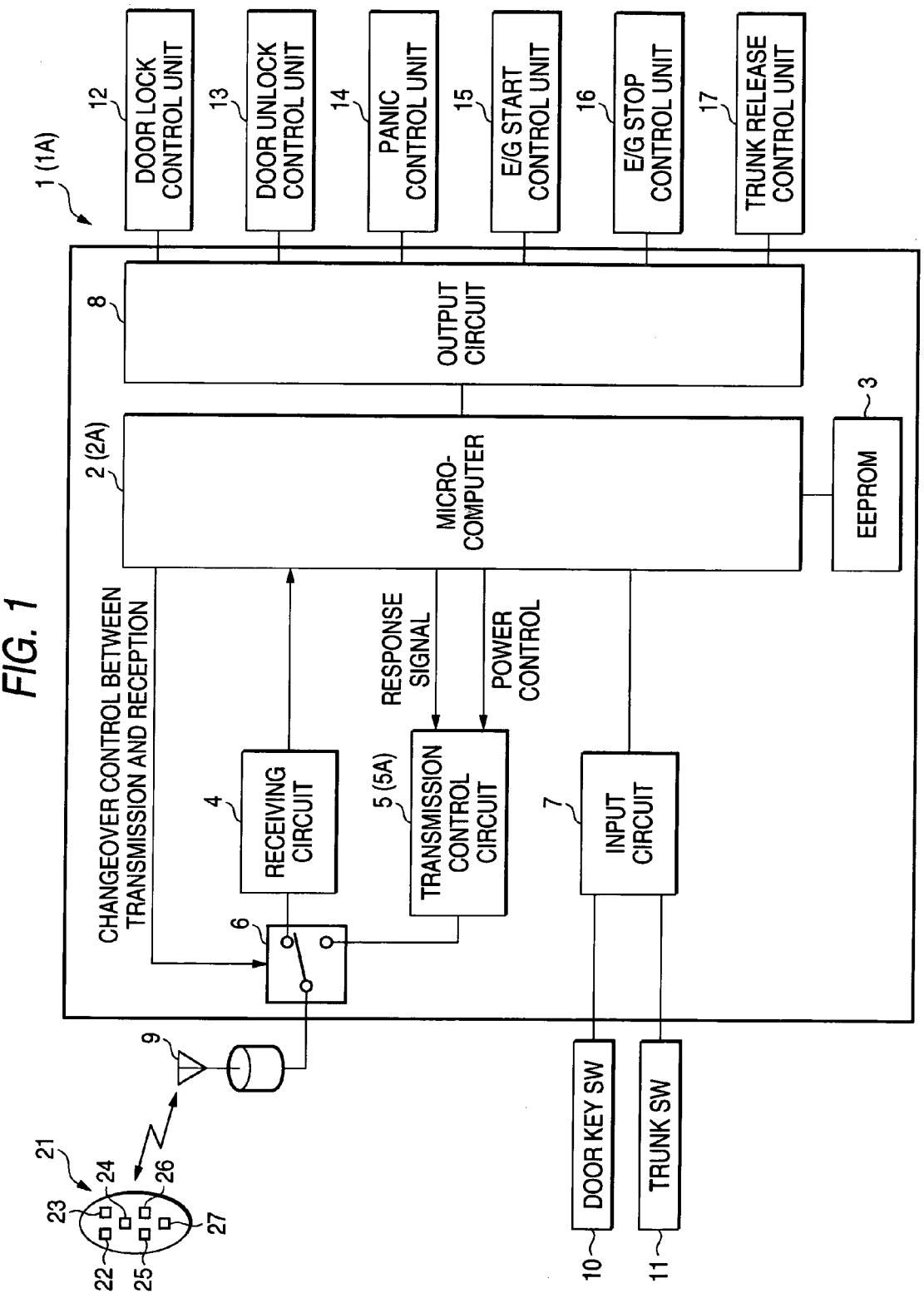
FIG. 1 is a block diagram schematically showing a main portion of a remote operation system including processing apparatus and a portable transmitter according to Embodiment (1) of the invention.

Embodiments of processing apparatus, a portable transmitter and a remote operation system according to embodiments of the invention will be described with reference to the drawings. FIG. 1 is a block diagram schematically showing a main portion of a remote operation system including processing apparatus and a portable transmitter according to Embodiment (1).

In FIG. 1, the reference numeral 1 represents processing apparatus to be mounted on a vehicle. The processing apparatus 1 includes a microcomputer 2, an EEPROM 3 storing an ID code, a receiving circuit 4 for receiving a radio wave (such as a signal in which instruction information has been added to the ID code) transmitted from a portable transmitter 21 to be portably carried by a registered user, a transmission control circuit 5, a changeover switch 6 for changing over an antenna between the transmitting side and the receiving side, an input circuit 7, and an output circuit 8.

A high-efficiency antenna 9 having a comparatively long arrival distance (for example, 200 m) of radio waves transmitted therefrom is connected to the changeover switch 6. The high-efficiency antenna 9 is connected to the receiving circuit 4 and the transmission control circuit 5 through the changeover switch 6. On the other hand, the portable transmitter 21 includes a door lock switch 22, a door unlock switch 23, a panic switch 24, an engine start switch 25, an engine stop switch 26 and a trunk release switch 27.

A door key switch 10 for locking/unlocking the door and a trunk switch 11 for releasing the trunk are connected to the input circuit 7. A door lock control unit 12 for making door lock control, a door unlock control unit 13 for making door unlock control, a panic control unit 14 for giving an alarm, an engine start control unit 15 for making engine start control, an engine stop control unit 16 for making engine stop control, and a trunk release control unit 17 for making trunk release control are connected to the output circuit 8.

When receiving a signal in which door lock instruction information has been added to a correct ID code (that is, a code identical to the ID code stored in the EEPROM 3), the microcomputer 2 controls the door lock control unit 12 so as to lock the door. When receiving a signal in which door unlock instruction information has been added to the correct ID code, the microcomputer 2 controls the door unlock control unit 13 so as to unlock the door.

When receiving a signal in which panic instruction information, engine start instruction information, engine stop instruction information or trunk release instruction information has been added to the correct ID code, the microcomputer 2 controls a control unit corresponding to the received instruction information, that is, the panic control unit 14, the engine start control unit 15, the engine stop control unit 16 or the trunk release control unit 17 so as to give an buzzer sound, start the engine, stop the engine or release the trunk in the same manner as when receiving a signal including the door lock instruction information or the door unlock instruction information.

Further, based on a signal obtained from the door key switch 10 or the trunk switch 11, the microcomputer 2 controls the door lock control unit 12, the door unlock control unit 13 or the trunk release control unit 17 so as to lock the door, unlock the door or release the trunk. In addition, the microcomputer 2 can control the changeover switch 6 so as to change over the high-efficiency antenna 9 between the transmitting side and the receiving side.

Figure 2:
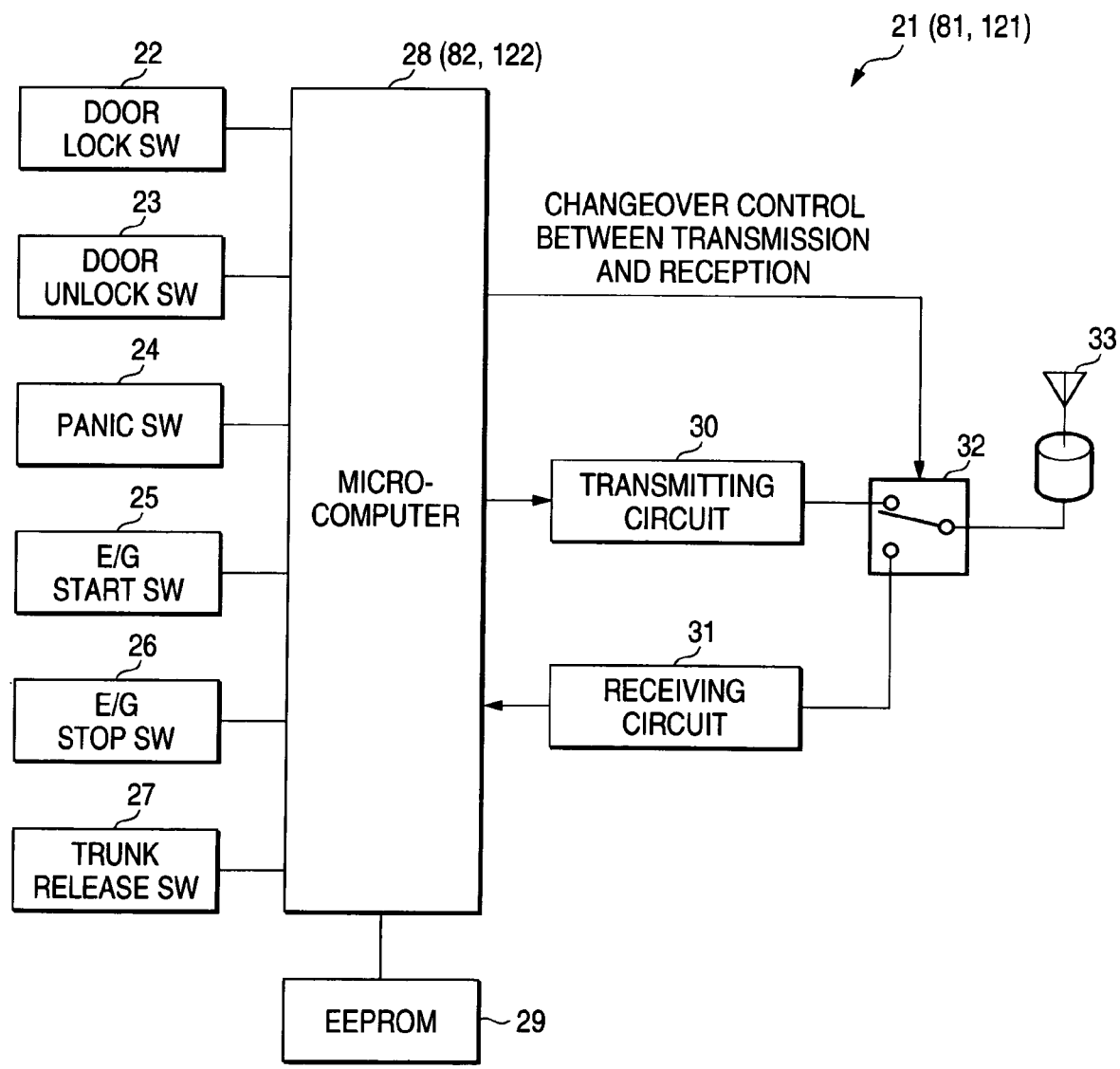
FIG. 2 is a block diagram schematically showing a main portion of the portable transmitter according to Embodiment (1).

FIG. 2 is a block diagram schematically showing a main portion of the portable transmitter 21 according to Embodiment (1). The portable transmitter 21 includes a microcomputer 28, an EEPROM 29 storing an ID code, a transmitting circuit 30, a receiving circuit 31, a changeover switch 32 for changing over an antenna between the transmitting side and the receiving side, a high-efficiency antenna 33 having a comparatively long arrival distance (for example, 200 m) of transmitted radio waves, the door lock switch 22, the door unlock switch 23, the panic switch 24, the engine start switch 25, the engine stop switch 26 and the trunk release switch 27.

When the door lock switch 22 is operated, the microcomputer 28 outputs an instruction signal in which the door lock instruction information has been added to the ID code, to the transmitting circuit 30. Then, the microcomputer 28 makes control to radiate the instruction signal from the high-efficiency antenna 33. On the other hand, when the door unlock switch 23 is operated, the microcomputer 28 outputs an instruction signal in which the door unlock instruction information has been added to the ID code, to the transmitting circuit 30. Then, the microcomputer 28 makes control to radiate the instruction signal from the high-efficiency antenna 33.

When the panic switch 24, the engine start switch 25, the engine stop switch 26 or the trunk release switch 27 is operated, the microcomputer 28 outputs an instruction signal in which instruction information corresponding to the operated switch has been added to the ID code, to the transmitting circuit 30 in the same manner as when the door lock switch 22 or the door unlock switch 23 is operated. Then, the microcomputer 28 makes control to radiate the instruction signal from the high-efficiency antenna 33. In addition, the microcomputer 28 can control the changeover switch 32 so as to changeover the high-efficiency antenna 33 between the transmitting side and the receiving side.

Figure 3:
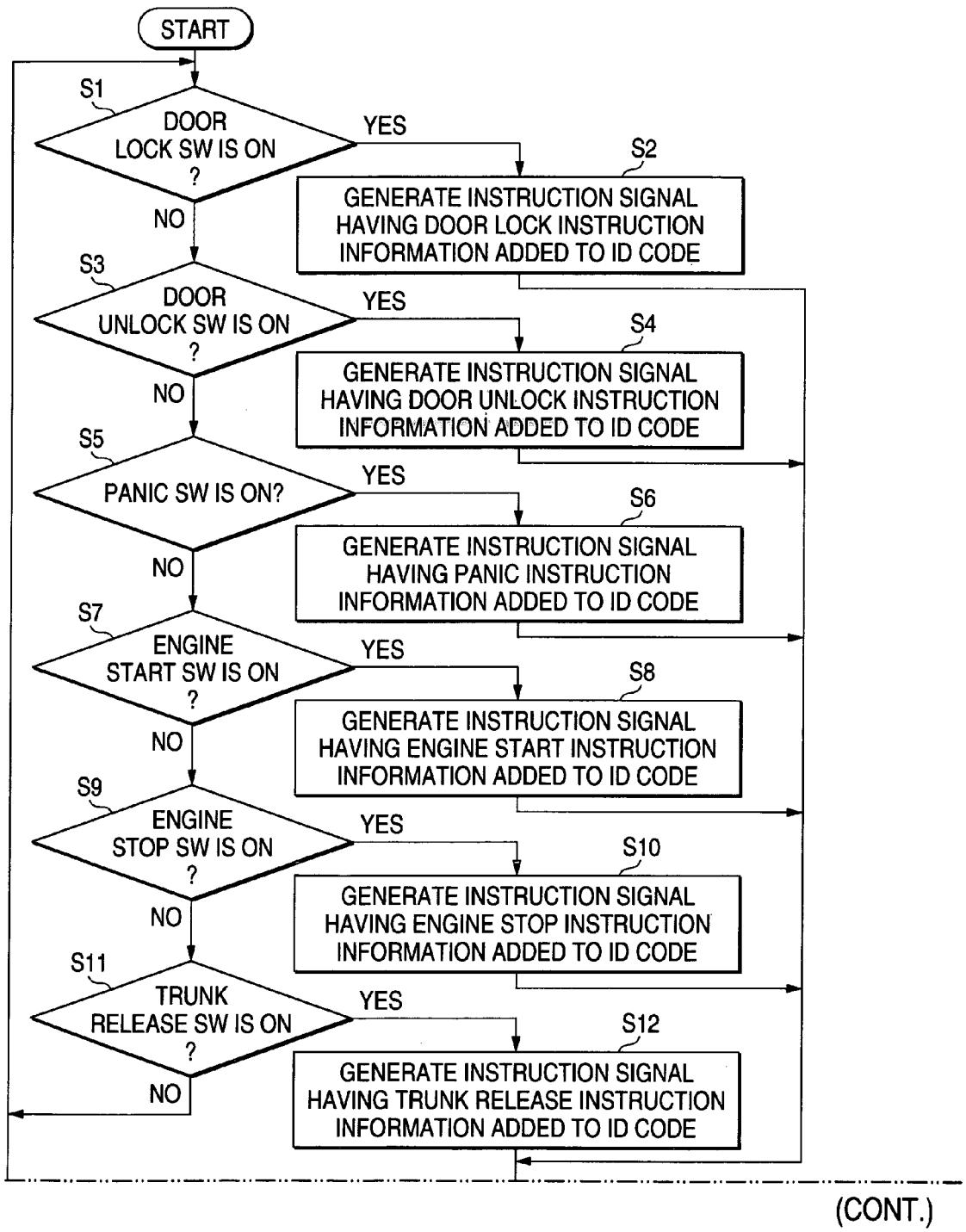
FIG. 3 is a flow chart showing a processing operation to be executed by a microcomputer in the portable transmitter according to Embodiment (1).

Next, a processing operation [1-a] to be executed by the microcomputer 28 in the portable transmitter 21 according to Embodiment (1) will be described with reference to the flow chart shown in FIG. 3. First, the microcomputer 28 judges whether the door lock switch 22 has been operated or not (Step S1). When the microcomputer 28 concludes that the door lock switch 22 has been operated, the microcomputer 28 next reads the ID code stored in the EEPROM 29, and generates an instruction signal in which instruction information (door lock instruction information in this case) corresponding to the operated switch has been added to the read ID code (Step S2).

The microcomputer 28 outputs the generated instruction signal to the transmitting circuit 30 so as to radiate the instruction signal from the high-efficiency antenna 33 (Step S13). After that, the microcomputer 28 controls the changeover switch 32 to change over the high-efficiency antenna 33 to the receiving side (Step S14). The microcomputer 28 sets a timer $t_1$ to 0 and starts the timer $t_1$ (Step S15).

Next, the microcomputer 28 judges whether a response signal transmitted from the processing apparatus 1 in response to the instruction signal has been received or not (Step S16). When the microcomputer 28 concludes that the response signal has been received, the microcomputer 28 judges whether the ID code included in the received response signal are identical with the ID code stored in the EEPROM 29 or not (Step S17).

When the microcomputer 28 concludes that the ID codes are identical with each other (that is, the received response signal is a signal transmitted from the processing apparatus 1 paired with the portable transmitter 21), the microcomputer 28 controls the changeover switch 32 to change over the high-efficiency antenna 33 to the transmitting side (Step S18). The microcomputer 28 outputs an acknowledgement signal (including the ID code stored in the EEPROM 29) to the response signal to the transmitting circuit 30 so as to radiate the acknowledgement signal from the high-efficiency antenna 33 (Step S19). Then, the processing operation returns to Step S1.

On the other hand, when the microcomputer 28 concludes in Step S17 that the ID codes are not identical with each other, the processing operation returns to Step S16 in which the microcomputer 28 waits to receive the response signal. When the microcomputer 28 concludes in Step S16 that the response signal has not been received, the microcomputer 28 next judges whether a predetermined time $t_1'$ (for example, 2 seconds) has passed in the timer $t_1$ or not (Step S20).

When the microcomputer 28 concludes that the timer $t_1$ has not yet reached the predetermined time $t_1'$ (that is, two seconds have not passed since the instruction signal was transmitted), the processing operation returns to Step S16 in which the microcomputer 28 waits to receive the response signal. On the other hand, when the microcomputer 28 concludes that the timer $t_1$ has reached the predetermined time $t_1'$ (that is, the response signal has not yet been received though two seconds have passed since the instruction signal was transmitted), the microcomputer 28 next controls the changeover switch 32 to change over the high-efficiency antenna 33 to the transmitting side (Step S21). Then, the processing operation returns to Step S1. Incidentally, the situation where the response signal has not yet been received by the portable transmitter 21 though two seconds have passed since the instruction signal was transmitted from the portable transmitter 21 appears when the instruction signal has not reached the processing apparatus 1 or when the response signal transmitted from the processing apparatus 1 has not reached the portable transmitter 21.

On the other hand, when the microcomputer 28 concludes in Step S1 that the door lock switch 22 has not been operated, the microcomputer 28 next judges whether the door unlock switch 23 has been operated or not (Step S3). When the microcomputer 28 concludes that the door unlock switch 23 has been operated, the microcomputer 28 next reads the ID code stored in the EEPROM 29, and generates an instruction signal in which instruction information (door unlock instruction information in this case) corresponding to the operated switch has been added to the read ID code (Step S4). Then, in the same manner as described above, the microcomputer 28 outputs the generated instruction signal to the transmitting circuit 30 so as to radiate the instruction signal from the high-efficiency antenna 33 (Step S13).

On the other hand, when the microcomputer 28 concludes in Step S3 that the door unlock switch 23 has not been operated, the microcomputer 28 judges whether the panic switch 24, the engine start switch 25, the engine stop switch 26 or the trunk release switch 27 has been operated or not (Step S5, S7, S9 or S11), in the same manner as described above. When the microcomputer 28 concludes that the panic switch 24, the engine start switch 25, the engine stop switch 26 or the trunk release switch 27 has been operated, the microcomputer 28 generates an instruction signal in which instruction information (panic instruction information, engine start instruction information, engine stop instruction information or trunk release instruction information in this case) corresponding to the operated switch has been added to the ID code (Step S6, S8, S10 or S12) in the same manner as when the microcomputer 28 concludes that the door lock switch 22 is operated. Then, the microcomputer 28 radiates the generated instruction signal from the high-efficiency antenna 33 (Step S13).

Next, a processing operation [1-b] to be executed by the microcomputer 2 in the processing apparatus 1 according to Embodiment (1) will be described with reference to the flow chart shown in FIG. 4. First, the microcomputer 2 judges whether the instruction signal transmitted from the portable transmitter 21 has been received or not (Step S31). When the microcomputer 2 concludes that the instruction signal has been received, the microcomputer 2 judges whether the ID code included in the received instruction signal is identical with the ID code stored in the EEPROM 3 or not (Step S32).

When the microcomputer 2 concludes that the ID codes are identical with each other (that is, the received instruction signal is a signal transmitted from the portable transmitter 21 paired with the processing apparatus 1), the microcomputer 2 next judges whether the instruction information included in the instruction signal is any one of the door unlock instruction information and the trunk release instruction information, or not (that is, whether it is instruction information for a function which may cause a security problem if the remote operation allowable range is set to be wide, or not) (Step S33).

When the microcomputer 2 concludes that the instruction information included in the instruction signal is the door unlock instruction information or the trunk release instruction information, the microcomputer 2 controls the power of the transmission control circuit 5 (that is, controls the power intensity of a radio wave to be transmitted to be attenuated in this case) so as to shorten the arrival distance (for example, up to 10 m) of a signal to be transmitted from the high-efficiency antenna 9 (Step S34).

On the other hand, when the microcomputer 2 concludes that the instruction information included in the instruction signal is neither the door unlock instruction information nor the trunk release instruction information but the door lock instruction information, the panic instruction information, the engine start instruction information or the engine stop instruction information (that is, instruction information for a function which will cause no security problem even if the remote operation allowable range is set to be wide), the microcomputer 2 next controls the power of the transmission control circuit 5 (for example, sets the power intensity of a radio wave to be transmitted at a maximum value) so as to extend the arrival distance (for example, up to 200 m) of a signal to be transmitted from the high-efficiency antenna 9 (Step S35).

Next, the microcomputer 2 controls the changeover switch 6 to change over the high-efficiency antenna 9 to the transmitting side (Step S36). The microcomputer 2 outputs a response signal (including the ID code stored in the EEPROM 3) to the instruction signal to the transmission control circuit 5 so as to radiate the response signal from the high-efficiency antenna 9 (Step S37). Then, the microcomputer 2 controls the changeover switch 6 to change over the high-efficiency antenna 9 to the receiving side (Step S38). The microcomputer 2 sets a timer $t_2$ to zero and starts the timer $t_2$ (Step S39).

Next, the microcomputer 2 judges whether an acknowledgement signal transmitted from the portable transmitter 21 in response to the response signal has been received or not (Step S40). When the microcomputer 2 concludes that the acknowledgement signal has been received, the microcomputer 2 judges whether the ID code included in the received acknowledgement signal is identical with the ID code stored in the EEPROM 3 or not (Step S41).

When the microcomputer 2 concludes that the ID codes are identical with each other (that is, the received acknowledgement signal is a signal transmitted from the portable transmitter 21 paired with the processing apparatus 1), the microcomputer 2 makes control to activate a function to be activated by the instruction information included in the instruction signal, in accordance with the instruction information (Step S42). Then, the processing operation returns to Step S31.

For example, when the instruction information is door lock instruction information, the microcomputer 2 controls the door lock control unit 12 to lock the door. When the instruction information is door unlock instruction information, the microcomputer 2 controls the door unlock control unit 13 to unlock the door. Here, although the microcomputer 2 controls the activation of the function based on the instruction information included in the instruction signal, the acknowledgement signal transmitted from the portable transmitter 21 may include instruction information. In that case, the microcomputer 2 may control the activation of the function based on the instruction information not included in the instruction signal but included in the acknowledgement signal.

On the other hand, when the microcomputer 2 concludes in Step S41 that the ID codes are not identical with each other, the processing operation returns to Step S40 in which the microcomputer 2 waits to receive the acknowledgement signal. When the microcomputer 2 concludes in Step S40 that the acknowledgement signal has not been received, the microcomputer 2 next judges whether a predetermined time $t_2'$ (for example, 2 seconds) has passed in the timer $t_2$ or not (Step S43).

When the microcomputer 2 concludes that the timer $t_2$ has not yet reached the predetermined time $t_2'$ (that is, two seconds have not passed since the response signal was transmitted), the processing operation returns to Step S40 in which the microcomputer 2 waits to receive the acknowledgement signal. On the other hand, when the microcomputer 2 concludes that the timer $t_2$ has reached the predetermined time $t_2'$ (that is, the acknowledgement signal has not yet been received though two seconds have passed since the response signal was transmitted), the processing operation returns directly to Step S31. Incidentally, the situation where the acknowledgement signal has not yet been received by the processing apparatus 1 though two seconds have passed since the response signal was transmitted from the processing apparatus 1 appears when the response signal has not reached the portable transmitter 21 or when the acknowledgement signal transmitted from the portable transmitter 21 has not reached the processing apparatus 1.

According to the remote operation system including the processing apparatus and the portable transmitter according to Embodiment (1), a response signal is transmitted from the processing apparatus 1 in response to an instruction signal transmitted from the portable transmitter 21, and an acknowledgement signal is transmitted from the portable transmitter 21 in response to the response signal. Only after receiving the acknowledgement signal, the processing apparatus 1 controls the activation of a function based on instruction information included in the instruction signal.

Even when the instruction signal transmitted from the portable transmitter 21 is received by the processing apparatus 1, the acknowledgement signal will not be transmitted from the portable transmitter 21 unless the response signal transmitted from the processing apparatus 1 is received by the portable transmitter 21. Not to say, if the acknowledgement signal is not transmitted from the portable transmitter 21, the acknowledgement signal will not be received by the processing apparatus 1. Thus, the processing apparatus 1 will not control the activation of the function to be activated by the instruction information.

That is, the arrival range of the response signal to be transmitted from the processing apparatus 1 serves as a remote operation allowable range. The arrival distance of the response signal is adjusted for each function. Accordingly, a remote operation allowable range is set for each function. Thus, the user-friendliness can be improved, or safety can be secured.

In the processing apparatus 1 according to Embodiment (1), the power is controlled to extend the arrival distance of the response signal when the instruction information included in the instruction signal transmitted from the portable transmitter 21 is door lock instruction information. However, the user may not feel so inconvenienced if the user can operate the door unlock function only near the vehicle. In processing apparatus according to another embodiment, the power may be controlled to shorten the arrival distance of the response signal to the instruction signal including the door lock instruction information.

Figure 5:
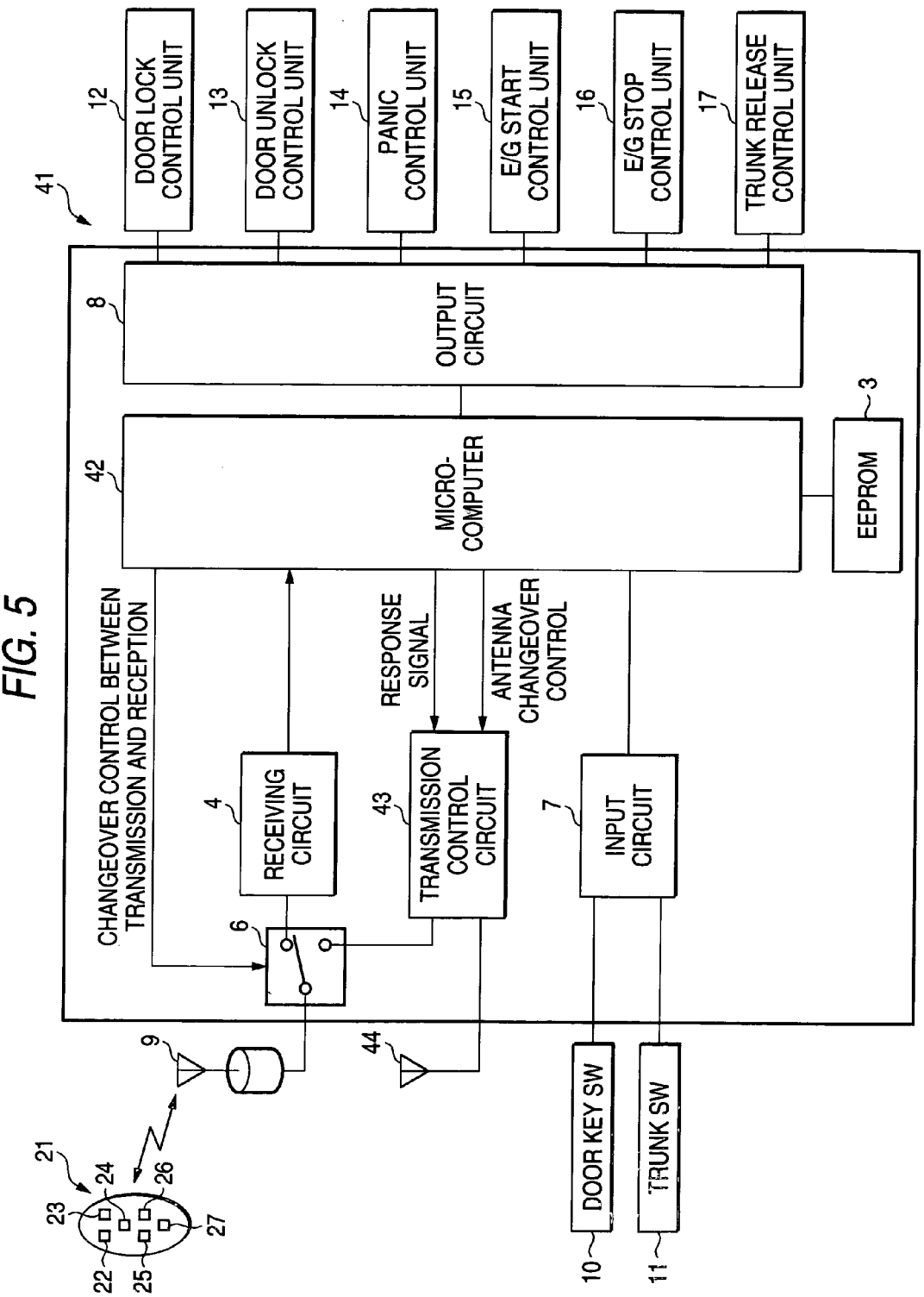
FIG. 5 is a block diagram schematically showing a main portion of a remote operation system including processing apparatus and a portable transmitter according to Embodiment (2).

FIG. 5 is a block diagram schematically showing a main portion of a remote operation system including processing apparatus and a portable transmitter according to Embodiment (2). Constituent parts similar to those in the remote operation system shown in FIG. 1 are denoted by the same reference numbers correspondingly, and description thereof will be omitted here. In FIG. 5, the reference numeral 41 represents a processing apparatus to be mounted on a vehicle. The processing apparatus 41 includes a microcomputer 42, an EEPROM 3 storing an ID code, a receiving circuit 4 for receiving a radio wave (such as a signal having instruction information added to an ID code) transmitted from a portable transmitter 21 to be portably carried by a registered user, a transmission control circuit 43, a changeover switch 6 for changing over an antenna between the transmitting side and the receiving side, an input circuit 7 and an output circuit 8.

A high-efficiency antenna 9 having a comparatively long arrival distance (for example, 200 m) of transmitted radio waves is connected to the changeover switch 6. The high-efficiency antenna 9 is connected to the receiving circuit 4 and the transmission control circuit 43 through the changeover switch 6. In addition, a low-efficiency antenna 44 having a short arrival distance (for example, 10 m) of transmitted radio waves is connected to the transmission control circuit 43.

Figure 6:
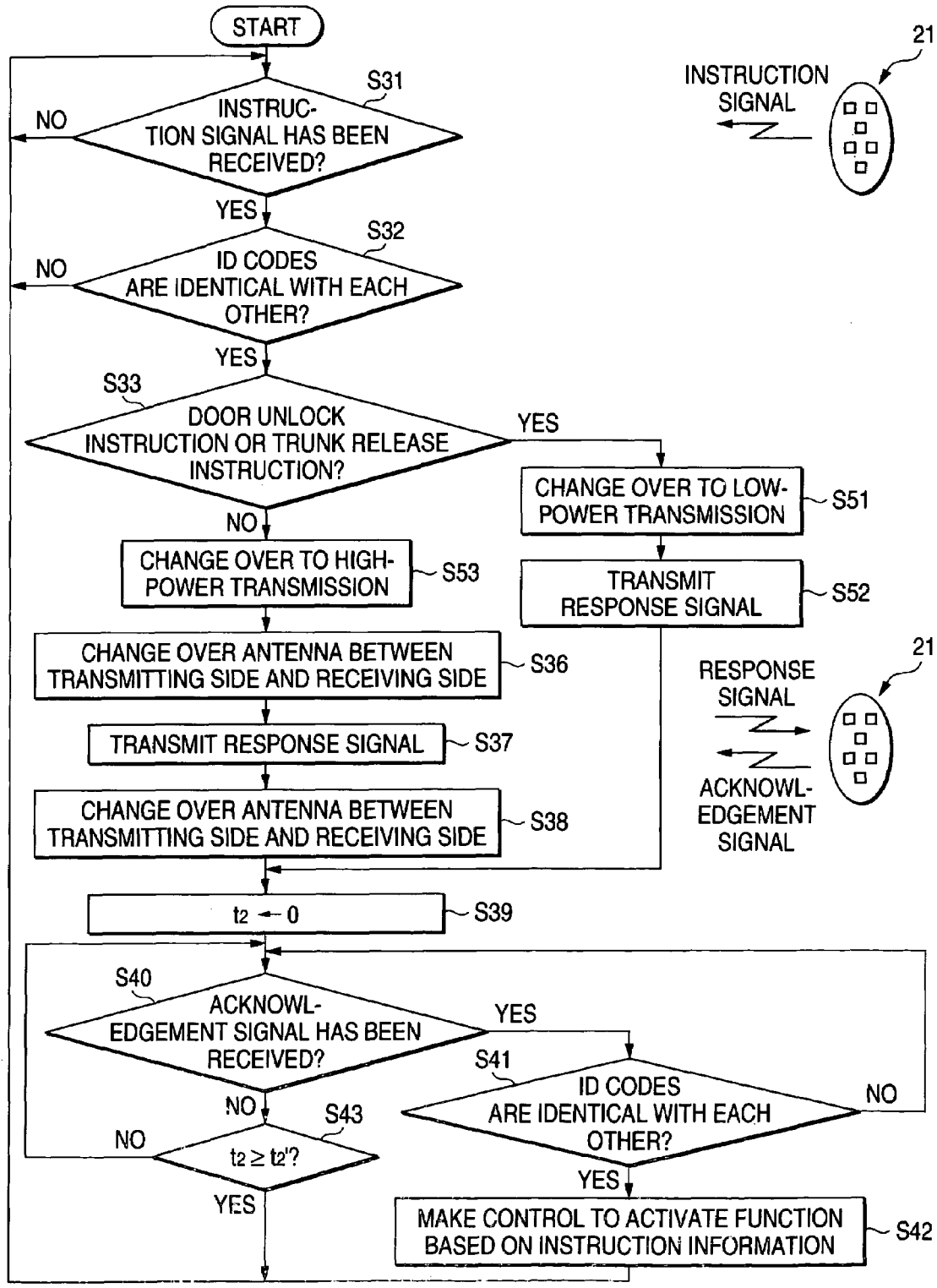
FIG. 6 is a flow chart showing a processing operation to be executed by a microcomputer in the processing apparatus according to Embodiment (2).

Next, a processing operation [2-b] to be executed by the microcomputer 42 in the processing apparatus 41 according to Embodiment (2) will be described with reference to the flow chart shown in FIG. 6. The processing operation [2-b] is similar to the processing operation [1-b] shown in FIG. 4 except for steps after the microcomputer 42 concludes in Step S32 that the ID code included in the received instruction signal is identical with the ID code stored in the EEPROM 3 (that is, the received instruction signal is a signal transmitted from the portable transmitter 21 paired with the processing apparatus 41). Accordingly, description will be made here about only the operation after the microcomputer 42 concludes that the received instruction signal is a signal transmitted from the portable transmitter 21 paired with the processing apparatus 41.

When the microcomputer 42 concludes in Step 32 that the received instruction signal is a signal transmitted from the portable transmitter 21 paired with the processing apparatus 41, the microcomputer 42 next judges whether or not the instruction information included in the instruction signal is any one of the door unlock instruction information and the trunk release instruction information (that is, whether or not it is instruction information for a function which may cause a security problem if the remote operation allowable range is set to be wide) (Step S33).

When the microcomputer 42 concludes that the instruction information included in the instruction signal is the door unlock instruction information or the trunk release instruction information, the microcomputer 42 controls the transmission control circuit 43 to set the low-efficiency antenna 44 as an output antenna (Step S51). The microcomputer 42 outputs a response signal (including the ID code stored in the EEPROM 3) to the instruction signal to the transmission control circuit 43 so as to radiate the response signal from the low-efficiency antenna 44 (Step S52).

On the other hand, when the microcomputer 42 concludes that the instruction information included in the instruction signal is neither the door unlock instruction information nor the trunk release instruction information but any one of the door lock instruction information, the panic instruction information, the engine start instruction information and the engine stop instruction information (that is, instruction information for a function which will cause no security problem even if the remote operation allowable range is set to be wide), the microcomputer 42 next controls the transmission control circuit 43 to set the high-efficiency antenna 9 as the output antenna (Step S53).

The remote operation system including the processing apparatus and the portable transmitter according to Embodiment (2) has similar effect to that of the remote operation system according to Embodiment (1). In the processing apparatus 41 according to Embodiment (2), the high-efficiency antenna 9 is used to increase the arrival distance of the response signal when the instruction information included in the instruction signal transmitted from the portable transmitter 21 is the door lock instruction information. However, the user may not feel so inconvenienced if the user can operate the door unlock function only near the vehicle. In processing apparatus according to another embodiment, the low-efficiency antenna 44 may be used to shorten the arrival distance of the response signal to the instruction signal including the door lock instruction information.

Figure 7:
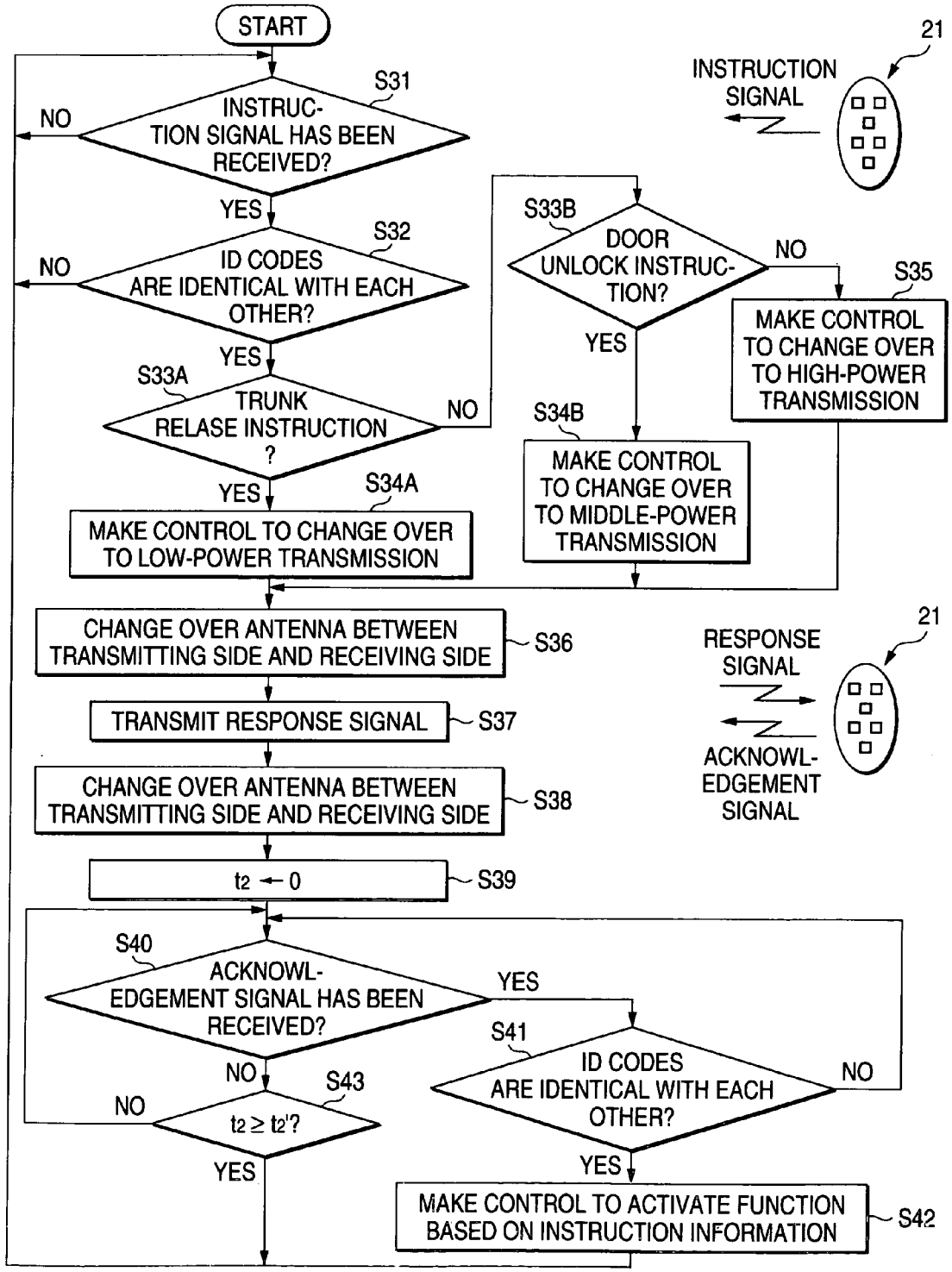
FIG. 7 is a flow chart showing a processing operation to be executed by a microcomputer in processing apparatus according to Embodiment (3).

Next, description will be made about a remote operation system including processing apparatus and a portable transmitter according to Embodiment (3). The remote operation system has a similar configuration to that of the remote operation system shown in FIG. 1 except for the processing apparatus, a microcomputer and a transmission control circuit constituting the processing apparatus. Therefore, the processing apparatus, the microcomputer and the transmission control circuit are denoted by reference numerals different from the processing apparatus 1, the microcomputer 2 and the transmission control circuit 5, while description about the other constituent parts will be omitted here. In FIG. 7, the reference numeral 1A represents processing apparatus. The processing apparatus 1A includes a microcomputer 2A, an EEPROM 3, a receiving circuit 4, a transmission control circuit 5A, a changeover switch 6, an input circuit 7 and an output circuit 8.

Next, a processing operation [3-b] to be executed by the microcomputer 2A in the processing apparatus 1A according to Embodiment (3) will be described with reference to the flow chart shown in FIG. 7. The processing operation [3-b] is similar to the processing operation [1-b] shown in FIG. 4 except for steps after the microcomputer 2A concludes in Step S32 that the ID code included in the received instruction signal is identical with the ID code stored in the EEPROM 3 (that is, the received instruction signal is a signal transmitted from the portable transmitter 21 paired with the processing apparatus 1A). Accordingly, description will be made here about only the operation after the microcomputer 2A concludes that the received instruction signal is a signal transmitted from the portable transmitter 21 paired with the processing apparatus 1A.

When the microcomputer 2A concludes in Step 32 that the received instruction signal is a signal transmitted from the portable transmitter 21 paired with the processing apparatus 1A, the microcomputer 2A next judges whether the instruction information included in the instruction signal is the trunk release instruction information or not (Step S33A).

When the microcomputer 2A concludes that the instruction information included in the instruction signal is the trunk release instruction information, the microcomputer 2A next controls the power of the transmission control circuit 5A (that is, controls the power intensity of a radio wave to be transmitted to be attenuated in this case) so as to shorten the arrival distance (for example, up to 10 m) of a signal to be transmitted from the high-efficiency antenna 9 (Step S34A). On the other hand, when the microcomputer 2A concludes that the instruction information included in the instruction signal is not the trunk release instruction information, the microcomputer 2A next judges whether the instruction information included in the instruction signal is the door unlock instruction information or not (Step S33B).

When the microcomputer 2A concludes that the instruction information included in the instruction signal is the door unlock instruction information, the microcomputer 2A next controls the power of the transmission control circuit 5A (that is, controls the power intensity of a radio wave to be transmitted to be attenuated in this case) so that the arrival distance of a signal to be transmitted from the high-efficiency antenna 9 is made comparatively short (for example, up to 50 m) (Step S34B).

On the other hand, when the microcomputer 2A concludes that the instruction information included in the instruction signal is neither the door unlock information nor the trunk release instruction information but any one of the door lock instruction information, the panic instruction information, the engine start instruction information and the engine stop instruction information (that is, instruction information for a function which will cause no security problem even if the remote operation allowable range is set to be wide), the microcomputer 2A next controls the power of the transmission control circuit 5A (for example, so as to set the power intensity of a radio wave to be transmitted at a maximum value) so that the arrival distance of a signal to be transmitted from the high-efficiency antenna 9 is made long (for example, 200 m) (Step S35).

In the remote operation system including the processing apparatus and the portable transmitter according to Embodiment (3), the arrival distance of the response signal can be set not in two levels but in three levels. Thus, the remote operation allowable range can be set more suitably for each function. It is therefore possible to obtain a system more excellent in use-friendliness and safety.

Figure 8:
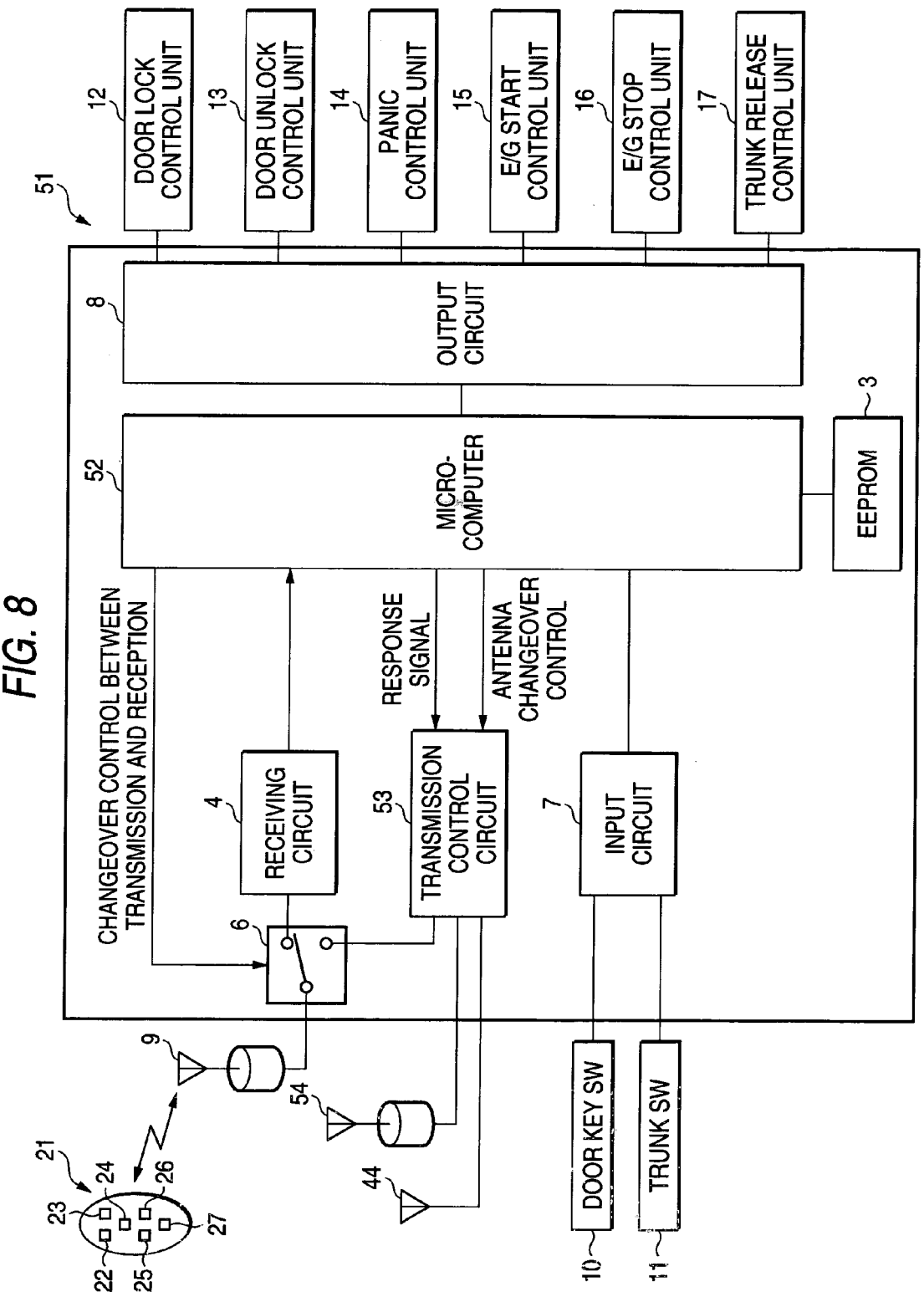
FIG. 8 is a block diagram schematically showing a main portion of a remote operation system including processing apparatus and a portable transmitter according to another embodiment.

In the processing apparatus 1A according to Embodiment (3), the power of the transmission control circuit 5A is controlled to adjust the arrival distance of the response signal. In processing apparatus 51 according to another embodiment, however, a high-efficiency antenna 9, a middle-efficiency antenna 54 and a low-efficiency antenna 44 having different radiation efficiencies may be provided, for example, as shown in FIG. 8. In FIG. 8, a microcomputer 52 controls a transmission control circuit 53 so as to change over the output antenna. Thus, the arrival distance of the response signal is adjusted in three levels.

Figure 9:
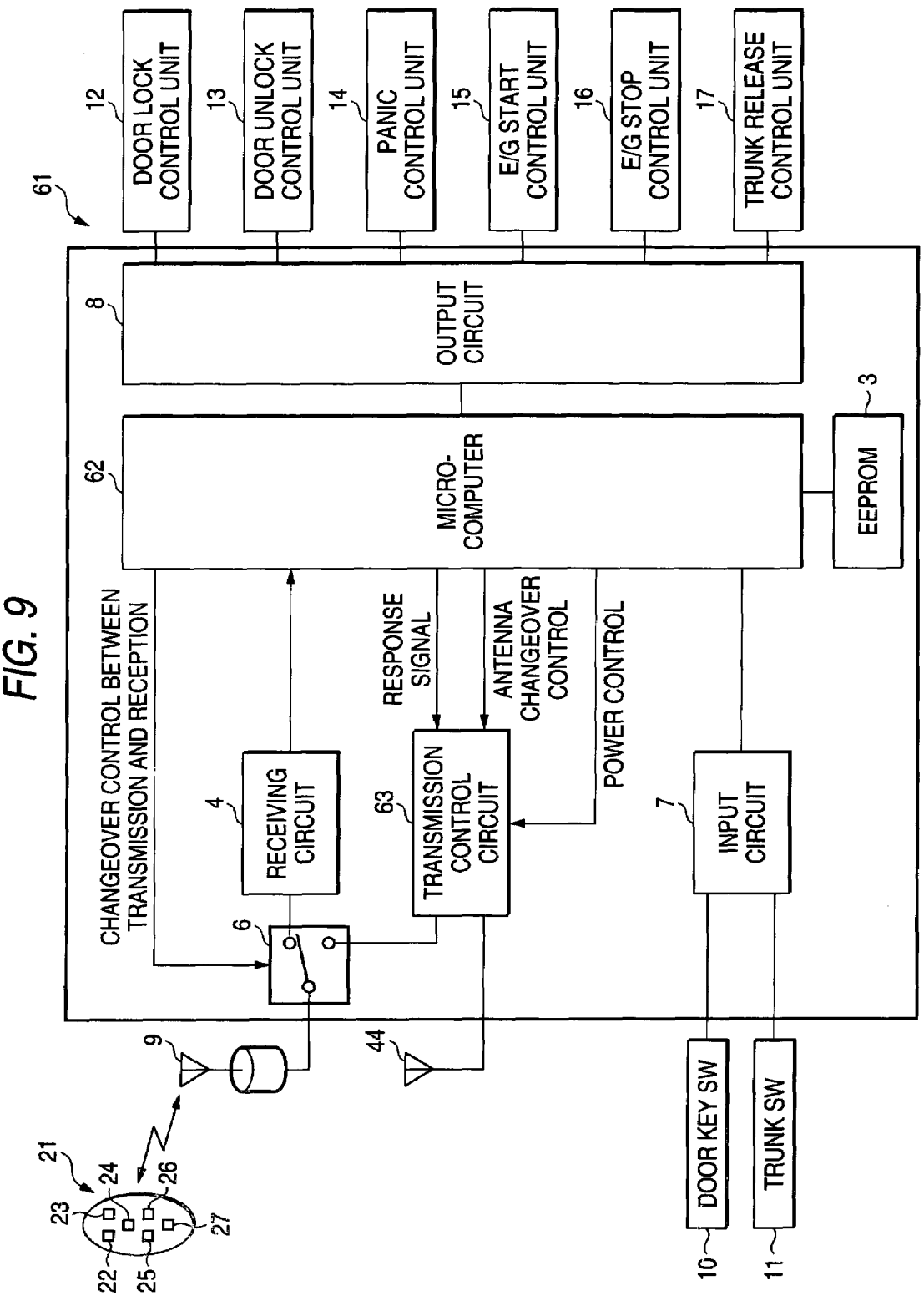
FIG. 9 is a block diagram schematically showing a main portion of a remote operation system including processing apparatus and a portable transmitter according to another embodiment.

In processing apparatus 61 according to further another embodiment, a high-efficiency antenna 9 and a low-efficiency antenna 44 may be provided, for example, as shown in FIG. 9. In FIG. 9, a microcomputer 62 controls a transmission control circuit 63 so as to change over the output antenna and adjust the power intensity (power) of a radio wave to be transmitted. Thus, the arrival distance of the response signal is adjusted in three or more levels.

Figure 10:
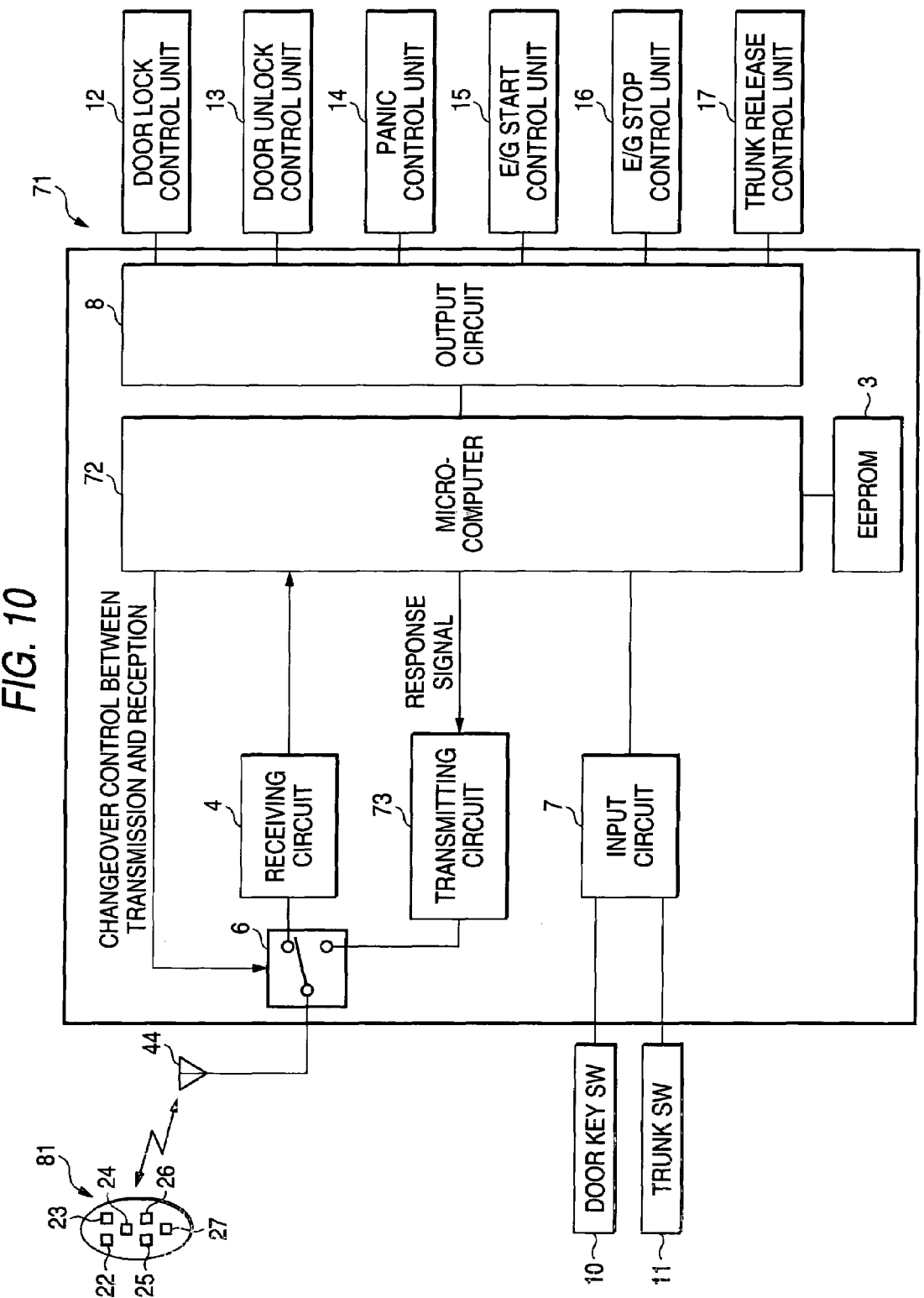
FIG. 10 is a block diagram schematically showing a main portion of a remote operation system including processing apparatus and a portable transmitter according to Embodiment (4).

FIG. 10 is a block diagram schematically showing a main portion of a remote operation system including processing apparatus and a portable transmitter according to Embodiment (4). Constituent parts similar to those in the remote operation system shown in FIG. 1 are denoted by the same reference numerals correspondingly, and description thereof will be omitted here. In FIG. 10, the reference numeral 71 represents a processing apparatus to be mounted on a vehicle. The processing apparatus 71 includes a microcomputer 72, an EEPROM 3 storing an ID code, a receiving circuit 4 for receiving a radio wave (such as a signal having instruction information added to an ID code) transmitted from a portable transmitter 81 to be portably carried by a registered user, a transmitting circuit 73, a changeover switch 6 for changing over an antenna between the transmitting side and the receiving side, an input circuit 7 and an output circuit 8.

A low-efficiency antenna 44 having a short arrival distance (for example, 10 m) of transmitted radio waves is connected to the changeover switch 6. The low-efficiency antenna 44 is connected to the receiving circuit 4 and the transmitting circuit 73 through the changeover switch 6. The portable transmitter 81 has a similar configuration to that of the portable transmitter 21 shown in FIG. 2, except for the microcomputer 82. Accordingly, a microcomputer in the portable transmitter 81 is denoted by another reference numeral 82, and description of the other parts will be omitted here.

Next, a processing operation [4-a] to be executed by the microcomputer 82 in the portable transmitter 81 according to Embodiment (4) will be described with reference to the flow chart shown in FIG. 11. The processing operation [4-a] is similar to the processing operation [1-a] shown in FIG. 3 except for steps after the microcomputer 82 concludes in Step S1, S5, S7 or S9 that the door lock switch 22, the panic switch 24, the engine start switch 25 or the engine stop switch 26 has been operated. Accordingly, description will be made here about only the operation after the microcomputer 82 concludes in Step S1, S5, S7 or S9 that the door lock switch 22, the panic switch 24, the engine start switch 25 or the engine stop switch 26 has been operated.

When the microcomputer 82 concludes in Step 1 that the door lock switch 22 has been operated, the microcomputer 82 next reads the ID code stored in the EEPROM 29, and generates an instruction signal in which instruction information (door lock instruction information in this case) corresponding to the operated switch has been added to the read ID code (Step S2). The microcomputer 82 outputs the generated instruction signal to the transmitting circuit 30 so as to radiate the instruction signal from the high-efficiency antenna 33 (Step S61). After that, the processing operation returns to Step S1.

On the other hand, when the microcomputer 82 concludes in Step S5, S7 or S9 that the panic switch 24, the engine start switch 25 or the engine stop switch 26 has been operated, the microcomputer 82 next reads the ID code stored in the EEPROM 29, and generates an instruction signal in which instruction information (panic instruction information, engine start instruction information, or engine stop instruction information in this case) corresponding to the operated switch has been added to the read ID code (Step S6, S8 or S10) in the same manner as when the microcomputer 82 concludes that the door lock switch 22 has been operated. Then, the microcomputer 82 outputs the generated instruction signal to the transmitting circuit 30 so as to radiate the instruction signal from the high-efficiency antenna 33 (Step S61). After that, the processing operation returns to Step S1. That is, the portable transmitter 81 is designed to wait for a response signal transmitted in response to an instruction signal transmitted from the portable transmitter 81 as long as the instruction signal is an instruction signal added with the door unlock instruction information or the trunk release instruction information. This is a difference between the portable transmitter 81 and the portable transmitter 21.

Figure 12:
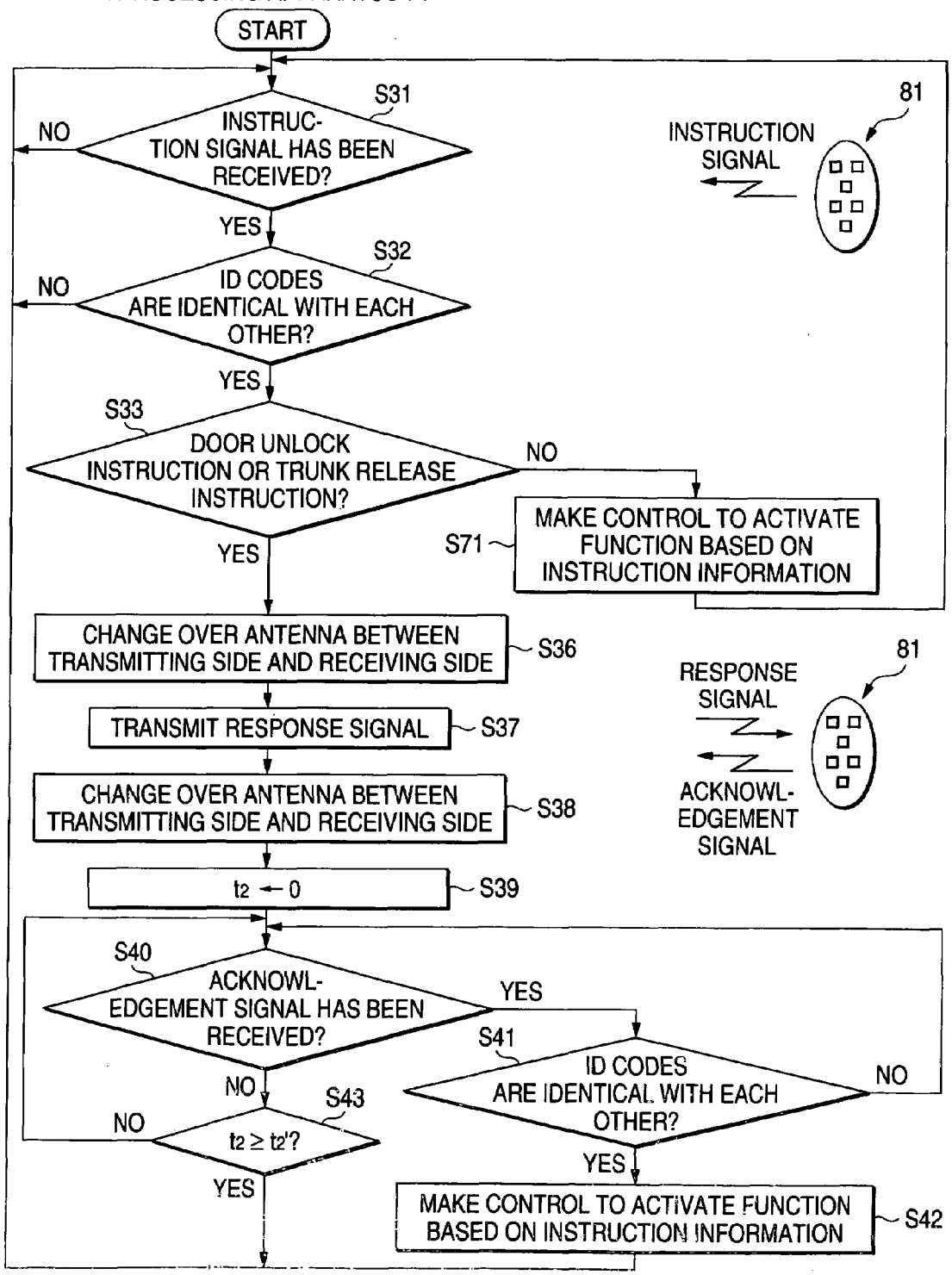
FIG. 12 is a flow chart showing a processing operation to be executed by a microcomputer in the processing apparatus according to Embodiment (4).

Next, a processing operation [4-b] to be executed by the microcomputer 72 in the processing apparatus 71 according to Embodiment (4) will be described with reference to the flow chart shown in FIG. 12. The processing operation [4-b] is similar to the processing operation [1-b] shown in FIG. 4 except for steps after the microcomputer 72 concludes in Step S32 that the ID code included in the received instruction signal is identical with the ID code stored in the EEPROM 3 (that is, the received instruction signal is a signal transmitted from the portable transmitter 81 paired with the processing apparatus 71). Accordingly, description will be made here about only the operation after the microcomputer 72 concludes that the instruction signal is a signal transmitted from the portable transmitter 81 paired with the processing apparatus 71.

When the microcomputer 72 concludes in Step 32 that the received instruction signal is a signal transmitted from the portable transmitter 81 paired with the processing apparatus 71, the microcomputer 72 next judges whether or not the instruction information included in the instruction signal is any one of the door unlock instruction information or the trunk release instruction information (that is, whether or not it is instruction information for a function which may cause a security problem if the remote operation allowable range is set to be wide) (Step S33).

When the microcomputer 72 concludes that the instruction information included in the instruction signal is the door unlock instruction information or the trunk release instruction information, the microcomputer 72 next controls the changeover switch 6 to change over the low-efficiency antenna 44 to the transmitting side (Step S36). The microcomputer 72 outputs a response signal (including the ID code stored in the EEPROM 3) to the instruction signal to the transmitting circuit 73 so as to radiate the response signal from the low-efficiency antenna 44 (Step S37). After that, the microcomputer 72 controls the changeover switch 6 to change over the low-efficiency antenna 44 to the receiving side (Step S38) so as to wait to receive an acknowledgement signal transmitted from the portable transmitter 81 in response to the response signal.

On the other hand, when the microcomputer 72 concludes in Step 33 that the instruction information included in the instruction signal is neither the door unlock instruction information nor the trunk release instruction information but any one of the door lock instruction information, the panic instruction information, the engine start instruction information and the engine stop instruction information (that is, instruction information for a function which will cause no security problem even if the remote operation allowable range is set to be wide), the microcomputer 72 makes control to activate a function to be activated by the instruction information included in the instruction signal, based on the instruction information without transmitting the response signal (that is, in spite of no reception of the acknowledgement signal) (Step S71). Then, the processing operation returns to Step S31.

According to the remote operation system including the processing apparatus and the portable transmitter according to Embodiment (4), when the processing apparatus 71 receives instruction information for activating the door unlock function or the trunk release function which may cause a security problem if the remote operation allowable range is set to be wide, the response signal having an arrival distance limited to be short is transmitted to narrow the remote operation allowable range for these functions.

On the other hand, as for the door lock function, the engine start/stop function or the like, the processing apparatus 71 is designed to make control to activate the function when an instruction signal is just received. Thus, the remote operation allowable range for these functions is made wide. As a result, it is possible to obtain a remote operation system superior in user-friendliness and safety.

Figure 13:
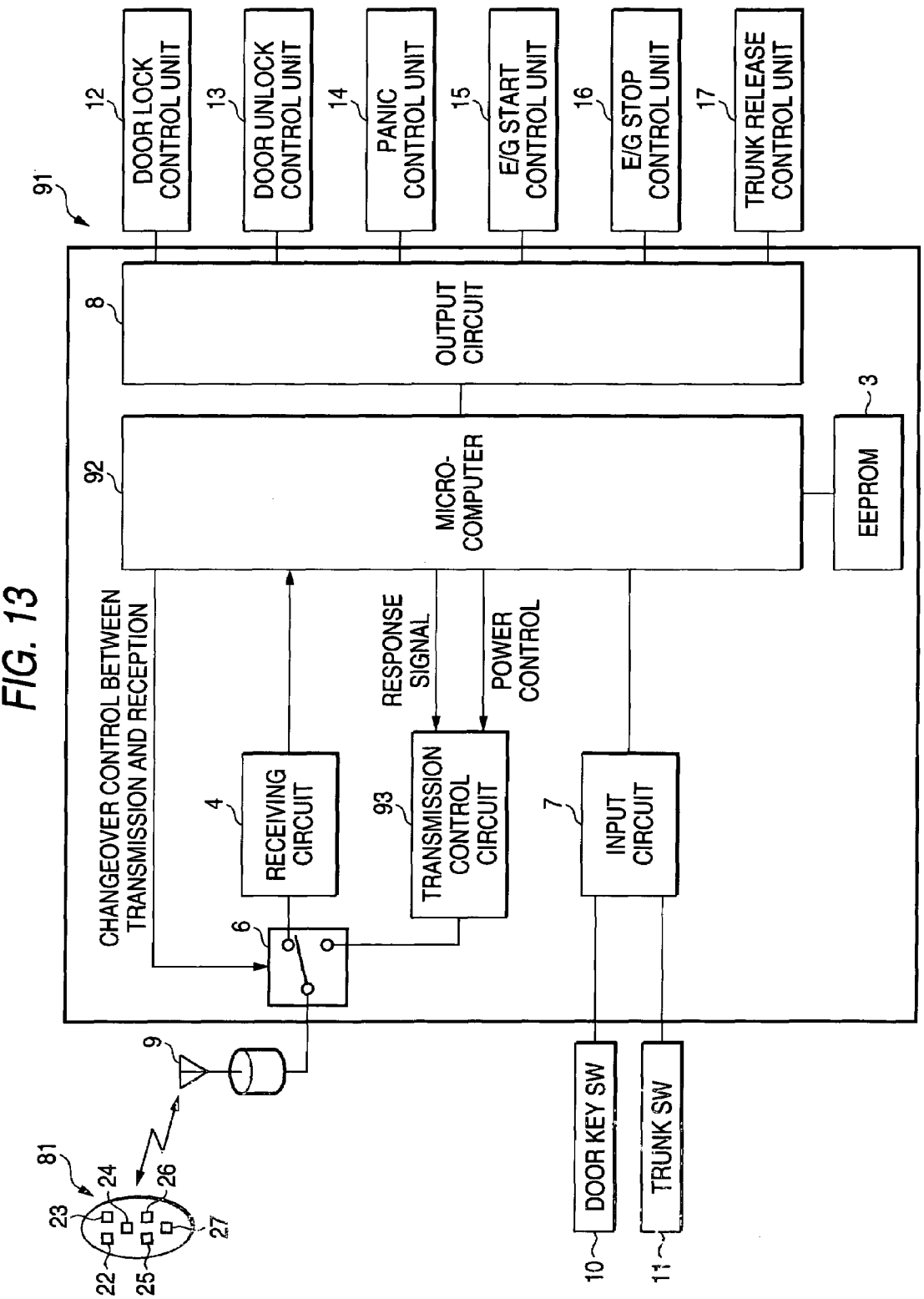
FIG. 13 is a block diagram schematically showing a main portion of a remote operation system including processing apparatus and a portable transmitter according to Embodiment (5).

FIG. 13 is a block diagram schematically showing a main portion of a remote operation system including processing apparatus and a portable transmitter according to Embodiment (5). Constituent parts similar to those in the remote operation system shown in FIG. 1 are denoted by the same reference numerals correspondingly, and description thereof will be omitted here. In FIG. 13, the reference numeral 91 represents processing apparatus to be mounted on a vehicle. The processing apparatus 91 includes a microcomputer 92, an EEPROM 3 storing an ID code, a receiving circuit 4 for receiving a radio wave (such as a signal having instruction information added to an ID code) transmitted from a portable transmitter 81 to be portably carried by a registered user, a transmission control circuit 93, a changeover switch 6 for changing over an antenna between the transmitting side and the receiving side, an input circuit 7 and an output circuit 8. A high-efficiency antenna 9 having a comparatively long arrival distance (for example, 200 m) of transmitted radio waves is connected to the changeover switch 6. The high-efficiency antenna 9 is connected to the receiving circuit 4 and the transmission control circuit 93 through the changeover switch 6.

Figure 14:
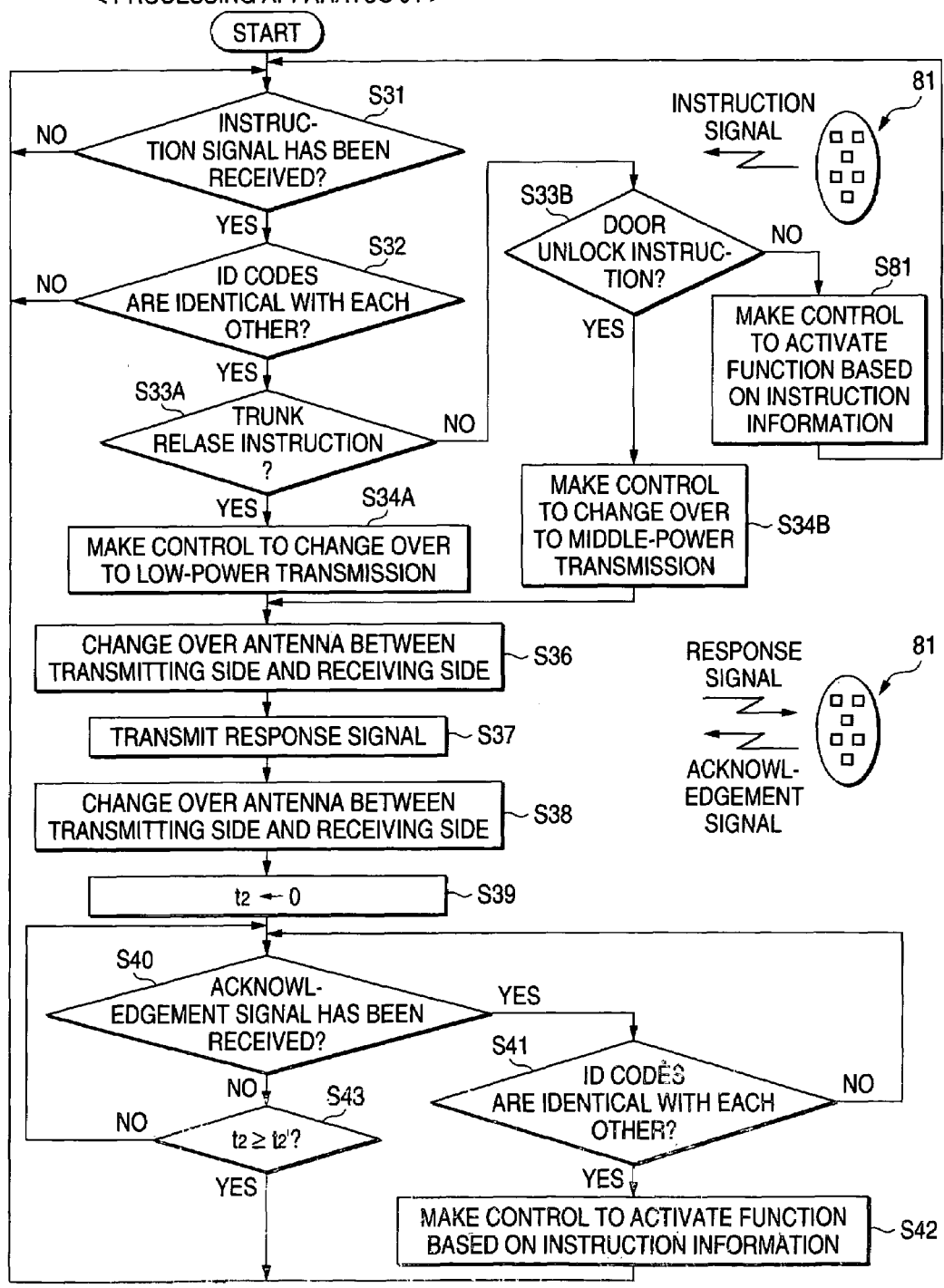
FIG. 14 is a flow chart showing a processing operation to be executed by a microcomputer in the processing apparatus according to Embodiment (5).

Next, a processing operation [5-b] to be executed by the microcomputer 92 in the processing apparatus 91 according to Embodiment (5) will be described with reference to the flow chart shown in FIG. 14. The processing operation [5-b] is similar to the processing operation [1-b] shown in FIG. 4 except for steps after the microcomputer 92 concludes in Step S32 that the ID code included in the received instruction signal is identical with the ID code stored in the EEPROM 3 (that is, the received instruction signal is a signal transmitted from the portable transmitter 81 paired with the processing apparatus 91). Accordingly, description will be made here about only the received operation after the microcomputer 92 concludes that the received instruction signal is a signal transmitted from the portable transmitter 81 paired with the processing apparatus 91.

When the microcomputer 92 concludes in Step 32 that the received instruction signal is a signal transmitted from the portable transmitter 81 paired with the processing apparatus 91, the microcomputer 92 next judges whether the instruction information included in the instruction signal is the trunk release instruction information or not (Step S33A).

When the microcomputer 92 concludes that the instruction information included in the instruction signal is the trunk release instruction information, the microcomputer 92 next controls the power of the transmission control circuit 93 (that is, controls the power intensity of a radio wave to be transmitted to be attenuated in this case) so as to shorten the arrival distance (for example, up to 10 m) of a signal to be transmitted from the high-efficiency antenna 9 (Step S34A). On the other hand, when the microcomputer 92 concludes that the instruction information included in the instruction signal is not the trunk release instruction information, the microcomputer 92 next judges whether the instruction information included in the instruction signal is the door unlock instruction information or not (Step S33B).

When the microcomputer 92 concludes that the instruction information included in the instruction signal is the door unlock instruction information, the microcomputer 92 next controls the power of the transmission control circuit 93 (that is, controls the power intensity of a radio wave to be transmitted to be attenuated in this case) so that the arrival distance of a signal to be transmitted from the high-efficiency antenna 9 is made comparatively short (for example, up to 50 m) (Step S34B).

On the other hand, when the microcomputer 92 concludes that the instruction information included in the instruction signal is neither the door unlock information nor the trunk release instruction information but any one of the door lock instruction information, the panic instruction information, the engine start instruction information and the engine stop instruction information (that is, instruction information for a function which will cause no security problem even if the remote operation allowable range is set to be wide), the microcomputer 92 makes control to activate a function to be activated by the instruction information included in the instruction signal, based on the instruction information without transmitting the response signal (that is, in spite of no reception of the acknowledgement signal) (Step S81). Then, the processing operation returns to Step S31.

In the remote operation system including the processing apparatus and the portable transmitter according to Embodiment (5), when receiving instruction information for activating the door unlock function or the trunk release function which may cause a security problem if the remote operation allowable range is set to be wide, the processing apparatus 91 transmits the response signal having an arrival distance limited to be short so as to narrow the remote operation allowable range for these functions. In addition, the arrival distance of the response signal is adjusted for each function so that the remote operation allowable range can be set more finely and properly.

On the other hand, as for the door lock function, the engine start/stop function or the like, the processing apparatus 91 is designed to make control to activate the function when an instruction signal is just received. Thus, the remote operation allowable range for these functions is made wide. As a result, it is possible to obtain a remote operation system more superior in user-friendliness and safety.

Figure 15:
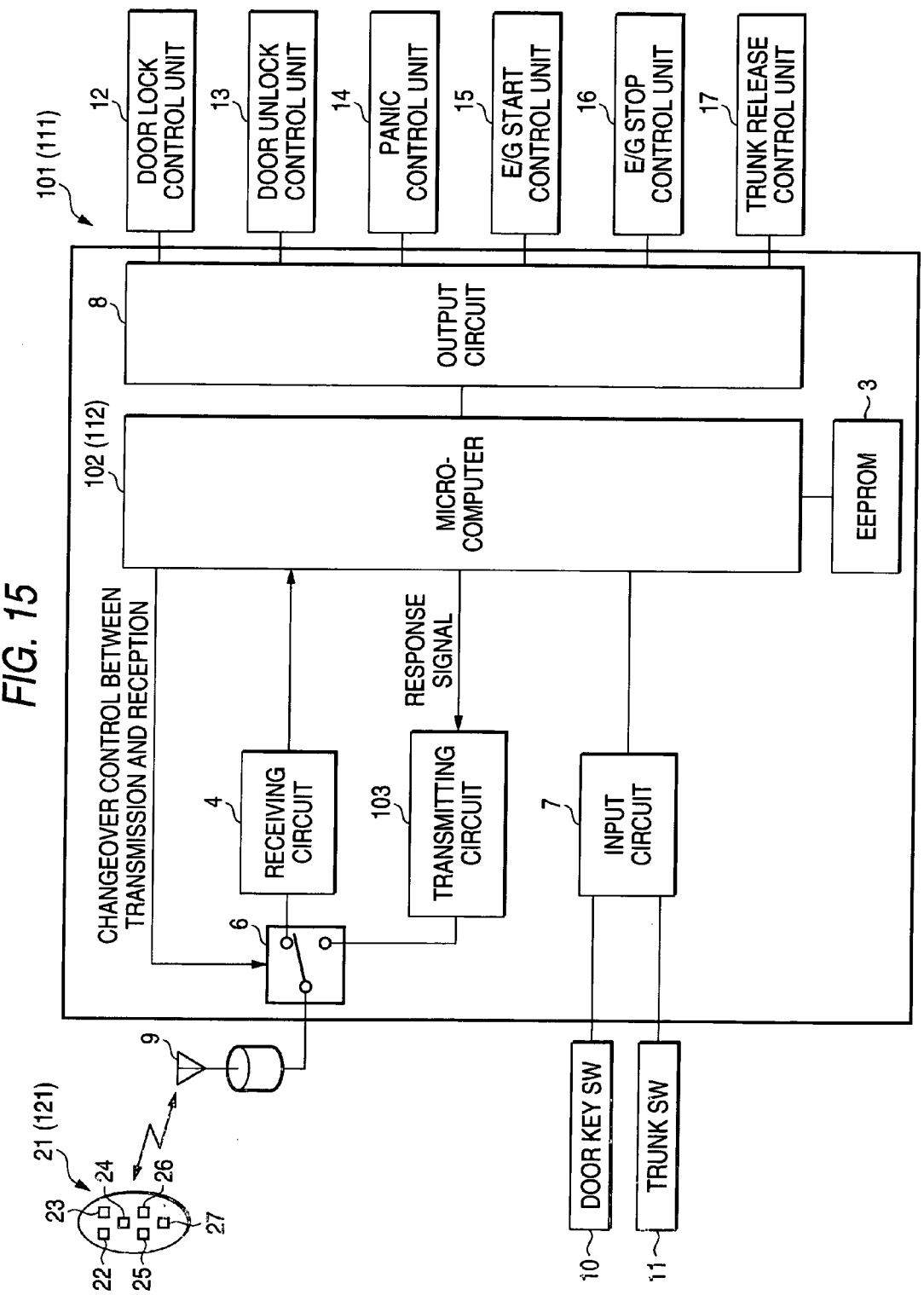
FIG. 15 is a block diagram schematically showing a main portion of a remote operation system including processing apparatus and a portable transmitter according to Embodiment (6).

FIG. 15 is a block diagram schematically showing a main portion of a remote operation system including processing apparatus and a portable transmitter according to Embodiment (6). Constituent parts similar to those in the remote operation system shown in FIG. 1 are denoted by the same reference numerals correspondingly, and description thereof will be omitted here. In FIG. 15, the reference numeral 101 represents a processing apparatus to be mounted on a vehicle. The processing apparatus 101 includes a microcomputer 102, an EEPROM 3 storing an ID code, a receiving circuit 4 for receiving a radio wave (such as a signal having instruction information added to an ID code) transmitted from a portable transmitter 21 to be portably carried by a registered user, a transmitting circuit 103, a changeover switch 6 for changing over an antenna between the transmitting side and the receiving side, an input circuit 7 and an output circuit 8. A high-efficiency antenna 9 having a comparatively long arrival distance (for example, 200 m) of transmitted radio waves is connected to the changeover switch 6. The high-efficiency antenna 9 is connected to the receiving circuit 4 and the transmitting circuit 103 through the changeover switch 6.

Figure 16:
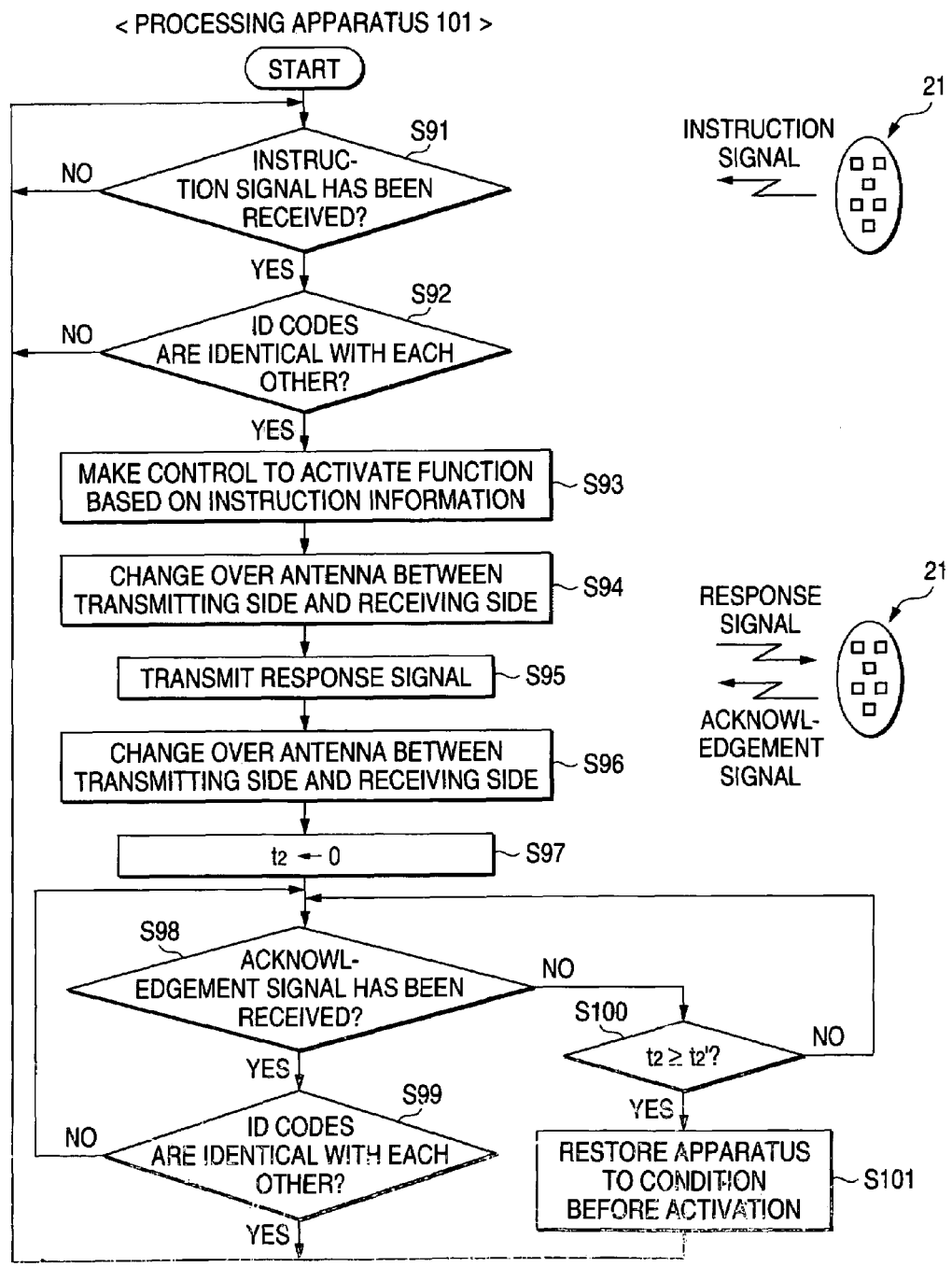
FIG. 16 is a flow chart showing a processing operation to be executed by a microcomputer in the processing apparatus according to Embodiment (6).

Next, a processing operation [6-b] to be executed by the microcomputer 102 in the processing apparatus 101 according to Embodiment (6) will be described with reference to the flow chart shown in FIG. 16. First, the microcomputer 102 judges whether an instruction signal transmitted from the portable transmitter 21 has been received or not (Step S91). When the microcomputer 102 concludes that the instruction signal has been received, the microcomputer 102 judges whether the ID code included in the received instruction signal is identical with the ID code stored in the EEPROM 3 or not (Step S92).

When the microcomputer 102 concludes that the ID codes are identical with each other (that is, the received instruction signal is a signal transmitted from the portable transmitter 21 paired with the processing apparatus 101), the microcomputer 102 makes control to activate a function to be activated by instruction information included in the instruction signal, based on the instruction information (Step S93). For example, when the instruction information is door lock instruction information, the microcomputer 102 controls the door lock control unit 12 to lock the door. When the instruction information is door unlock instruction information, the microcomputer 102 controls the door unlock control unit 13 to unlock the door.

Next, the microcomputer 102 controls the changeover switch 6 to change over the high-efficiency antenna 9 to the transmitting side (Step S94). The microcomputer 102 outputs a response signal (including the ID code stored in the EEPROM 3) to the instruction signal to the transmitting circuit 103 so as to radiate the response signal from the high-efficiency antenna 9 (Step S95). Then, the microcomputer 102 controls the changeover switch 6 to change over the high-efficiency antenna 9 to the receiving side (Step S96). The microcomputer 102 sets a timer $t_2$ to zero and starts the timer $t_2$ (Step S97).

Next, the microcomputer 102 judges whether an acknowledgement signal transmitted from the portable transmitter 21 in response to the response signal has been received or not (Step S98). When the microcomputer 102 concludes that the acknowledgement signal has been received, the microcomputer 102 judges whether the ID code included in the received acknowledgement signal is identical with the ID code stored in the EEPROM 3 or not (that is, whether the received acknowledgement signal is a signal transmitted from the portable transmitter 21 paired with the processing apparatus 101 or not) (Step S99). When the microcomputer 102 concludes that the received acknowledgement signal is a signal transmitted from the portable transmitter 21 paired with the processing apparatus 101 (that is, the response signal has reached the portable transmitter 21 properly), the processing operation returns directly to Step S91.

On the other hand, when the microcomputer 102 concludes in Step S99 that the received acknowledgement signal is not a signal transmitted from the portable transmitter 21, the processing operation returns to Step S98 in which the microcomputer 102 waits to receive the acknowledgement signal. When the microcomputer 102 concludes in Step S98 that the acknowledgement signal has not been received, the microcomputer 102 next judges whether a predetermined time $t_2'$ (for example, 2 seconds) has passed in the timer $t_2$ or not (Step S100).

When the microcomputer 102 concludes that the timer $t_2$ has not yet reached the predetermined time $t_2'$ (that is, two seconds have not passed since the response signal was transmitted), the processing operation returns to Step S98 in which the microcomputer 102 waits to receive the acknowledgement signal. On the other hand, when the microcomputer 102 concludes that the timer $t_2$ has reached the predetermined time $t_2'$ (that is, the acknowledgement signal has not yet been received though two seconds have passed since the response signal was transmitted), the microcomputer 102 further concludes that the response signal has not reached the portable transmitter 21 properly, and the microcomputer 102 makes control to cancel the activation of the function activated in Step S93 or to restore the processing apparatus 101 to the condition where the function has not been activated (Step S101). Then, the processing operation returns to Step S91. For example, when the panic function has been activated to give an alarm etc., the microcomputer 102 controls the panic control circuit 14 to stop the alarm etc. When the door unlock function has been activated to unlock the door, the microcomputer 102 controls the door lock control unit 12 to lock the door.

In the remote operation system including the processing apparatus and the portable transmitter according to Embodiment (6), when receiving an instruction signal transmitted from the portable transmitter 21, the processing apparatus 101 makes control to activate a function to be activated by instruction information included in the instruction signal. That is, the processing apparatus 101 makes control to activate the function without waiting to receive an acknowledgement signal transmitted from the portable transmitter 21. Thus, it is possible to eliminate delay in starting the control of activation.

Assume that the processing apparatus 101 transmits a response signal to the instruction signal, but does not receive the acknowledgement signal which is supposed to be transmitted from the portable transmitter 21 in response to the response signal. In that case, the processing apparatus 101 makes control to cancel the activation of the function or to restore itself to the condition where the function has not been activated. That is, even when the processing apparatus 101 makes control to activate the function without waiting to receive the acknowledgement signal, the processing apparatus 101 can restore itself to the condition where the function has not been activated if the processing apparatus 101 does not receive the acknowledgement signal.

Next, description will be made about a remote operation system including processing apparatus and a portable transmitter according to Embodiment (7). The remote operation system has a configuration similar to that of the remote operation system shown in FIG. 15, except for a processing apparatus, a microcomputer constituting the processing apparatus, and a portable transmitter. Accordingly, the processing apparatus, the microcomputer and the portable transmitter are denoted by different reference numerals from the processing apparatus 101, the microcomputer 102 and the portable transmitter 21, and description of the other parts will be omitted here.

In FIG. 15, the reference numeral 111 represents a processing apparatus. The processing apparatus 111 includes a microcomputer 112, an EEPROM 3, a receiving circuit 4 for receiving a radio wave (such as a signal having instruction information added to an ID code) transmitted from a portable transmitter 121 to be portably carried by a registered user, a transmitting circuit 103, a changeover switch 6, an input circuit 7 and an output circuit 8.

A high-efficiency antenna 9 having a comparatively long arrival distance (for example, 200 m) of transmitted radio waves is connected to the changeover switch 6. The high-efficiency antenna 9 is connected to the receiving circuit 4 and the transmitting circuit 103 through the changeover switch 6. The portable transmitter 121 has a configuration similar to that of the portable transmitter 21 shown in FIG. 2, except for the microcomputer 28. Accordingly, a microcomputer in the portable transmitter 121 is denoted by another reference numeral 122, and description of the other parts will be omitted here.

Figure 17:
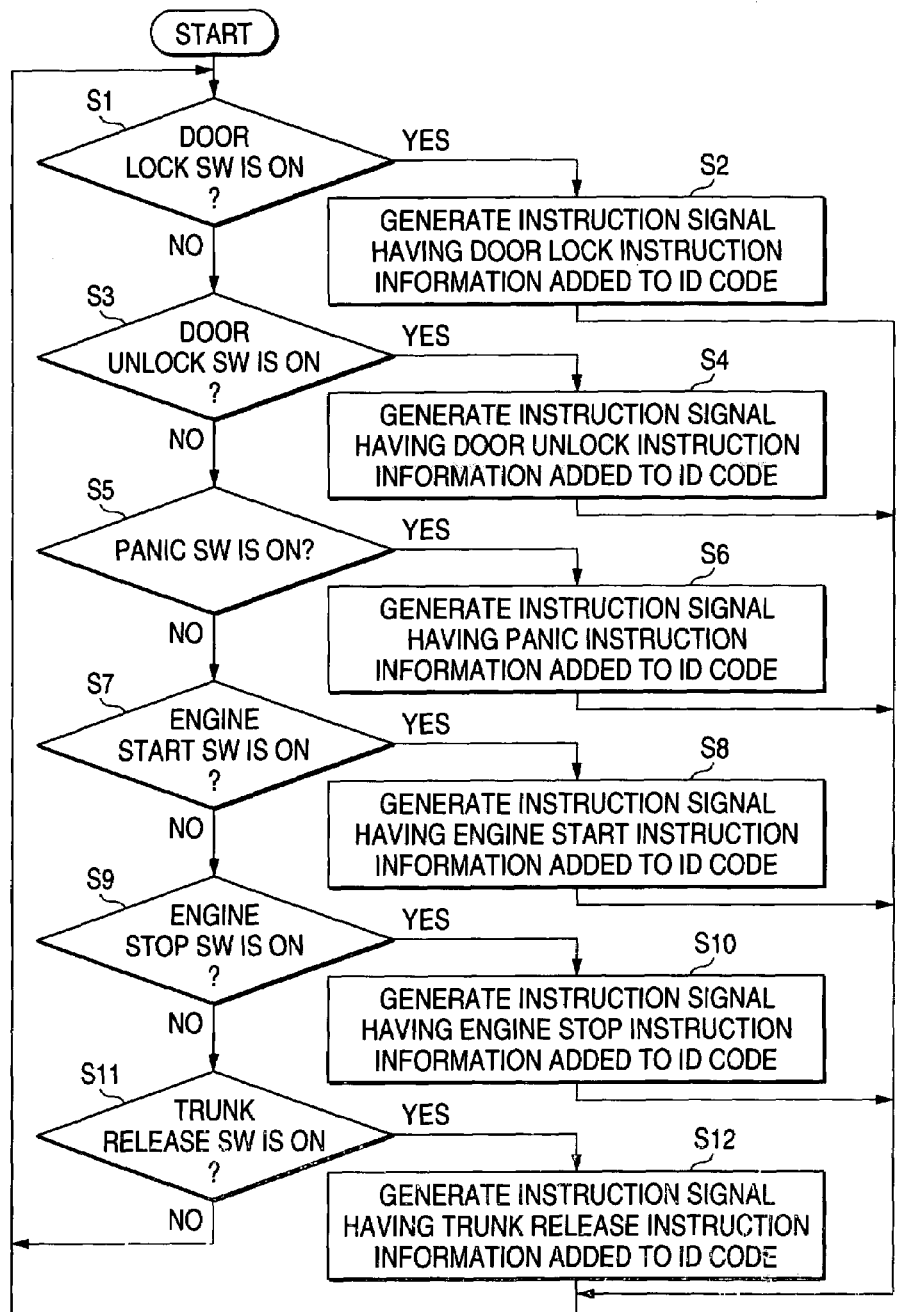
FIG. 17 is a flow chart showing a processing operation to be executed by a microcomputer in a portable transmitter according to Embodiment (7).

Next, a processing operation [7-a] to be executed by the microcomputer 122 in the portable transmitter 121 according to Embodiment (7) will be described with reference to the flow chart shown in FIG. 17. The processing operation [7-a] is similar to the processing operation [1-a] shown in FIG. 3 except for steps after the microcomputer 122 judges in Step S16 whether or not a response signal transmitted from the processing apparatus 111 has been received. Accordingly, description will be made here about only the operation after the processing step in which the microcomputer 122 judges whether or not the response signal has been received.

In Step S16, the microcomputer 122 judges whether or not a response signal transmitted from the processing apparatus 111 has been received. When the microcomputer 122 concludes that the response signal has been received, the microcomputer 122 judges whether the ID code included in the received response signal is identical with the ID code stored in the EEPROM 29 or not (Step S17).

When the microcomputer 122 concludes that the ID codes are identical with each other (that is, the received response signal is a signal transmitted from the processing apparatus 111 paired with the portable transmitter 121), the microcomputer 122 further concludes that the instruction signal has reached the processing apparatus 111 properly, and controls the changeover switch 32 to change over the high-efficiency antenna 33 to the transmitting side (Step S18). Then, the processing operation returns to Step S1.

On the other hand, when the microcomputer 122 concludes in Step S17 that the ID codes are not identical with each other, the processing operation returns to Step S16 in which the microcomputer 122 waits to receive the response signal. When the microcomputer 122 concludes in Step S16 that the response signal has not been received, the microcomputer 122 next judges whether a predetermined time $t_1'$ (for example, 2 seconds) has passed in the timer $t_1$ or not (Step S20).

When the microcomputer 122 concludes that the timer $t_1$ has not yet reached the predetermined time $t_1'$ (that is, two seconds have not passed since the instruction signal was transmitted), the processing operation returns to Step S16 in which the microcomputer 122 waits to receive the response signal. On the other hand, when the microcomputer 122 concludes that the timer $t_1$ has reached the predetermined time $t_1'$ (that is, the response signal has not yet been received though two seconds have passed since the instruction signal was transmitted), the microcomputer 122 further concludes that the instruction signal has not reached the processing apparatus 111 properly, and controls the changeover switch 32 to changeover the high-efficiency antenna 33 to the transmitting side (Step S21) After that, the microcomputer 122 outputs a cancel signal to the transmitting circuit 30 so as to radiated the cancel signal from the high-efficiency antenna 33 (Step S111). The cancel signal (including the ID code stored in the EEPROM 29) includes cancel instruction information for giving an instruction to cancel the activation of a function to be activated by the instruction information included in the instruction signal transmitted in Step S13. Then, the processing operation returns to Step S1.

Next, a processing operation [7-b] to be executed by the microcomputer 112 in the processing apparatus 111 according to Embodiment (7) will be described with reference to the flow chart shown in FIG. 18. The processing operation [7-b] is similar to the processing operation [6-b] shown in FIG. 16 except for steps after Step S97 in which the microcomputer 112 sets a timer $t_2$ to zero and starts the timer $t_2$. Accordingly, description will be made here about only the operation after the processing step in which the microcomputer 112 sets a timer $t_2$ to zero and starts the timer $t_2$.

When the microcomputer 112 sets the timer $t_2$ to zero and starts the timer $t_2$ in Step S97, the microcomputer 112 next judges whether or not the cancel signal transmitted from the portable signal 121 has been received (Step S121). When the microcomputer 112 concludes that the cancel signal has been received, the microcomputer 112 judges whether or not an ID code included in the received cancel signal is identical with the ID code stored in the EEPROM 3 (that is, whether or not the received cancel signal is a signal transmitted from the portable transmitter 121 paired with the processing apparatus 111) (Step S122).

When the microcomputer 112 concludes that the received cancel signal is a signal transmitted from the portable transmitter 121 paired with the processing apparatus 111 (that is, the response signal has not reached the portable transmitter 121 properly), the microcomputer 112 makes control to cancel the activation of the function activated in Step S93 or to restore the processing apparatus 111 to the condition where the function has not been activated (Step S123). Then, the processing operation returns to Step S91. For example, when the panic function has been activated to give an alarm etc., the microcomputer 112 controls the panic control unit 14 to stop the alarm etc. When the door unlock function has been activated to unlock the door, the microcomputer 112 controls the door lock control unit 12 to lock the door.

On the other hand, when the microcomputer 112 concludes in Step S122 that the received cancel signal is not a signal transmitted from the portable transmitter 121, the processing operation returns to Step 121 in which the microcomputer 112 waits to receive the cancel signal. When the microcomputer 112 concludes in Step S121 that the cancel signal has not been received, the microcomputer 112 next judges whether a predetermined time $t_2'$ (for example, 2 seconds) has passed in the timer $t_2$ or not (Step S124).

When the microcomputer 112 concludes that the timer $t_2$ has not yet reached the predetermined time $t_2'$ (that is, two seconds have not passed since the response signal was transmitted), the processing operation returns to Step S121 in which the microcomputer 112 waits to receive the cancel signal. On the other hand, when the microcomputer 112 concludes that the timer $t_2$ has reached the predetermined time $t_2'$ (that is, the cancel signal has not yet been received though two seconds have passed since the response signal was transmitted), the microcomputer 112 concludes that the response signal has reached the portable transmitter 121 properly. Then, the processing operation returns directly to Step S91.

According to the remote operation system including the processing apparatus and the portable transmitter according to Embodiment (7), when the processing apparatus 111 receives an instruction signal transmitted from the portable transmitter 121, the processing apparatus 111 makes control to activate a function to be activated by instruction information included in the instruction signal. Thus, it is possible to eliminate delay in starting the control of activation.

When the response signal transmitted from the processing apparatus 111 is not received by the portable transmitter 121, the cancel signal is transmitted from the portable transmitter 121. When receiving the cancel signal, the processing apparatus 111 makes control to cancel the activation of the function or to restore itself to the condition where the function has not been activated. That is, even when the processing apparatus 111 makes control to activate the function as soon as the processing apparatus 111 receives the instruction signal, the processing apparatus 111 can restore itself to the condition where the function has not been activated if the response signal is not properly received by the portable transmitter 121.

In the processing apparatus 101 or 111 according to Embodiment (6) or (7), the arrival distance (that is, the remote operation allowable range) of the response signal to the instruction signal is not adjusted. However, in processing apparatus according to another embodiment, the arrival distance may be adjusted for each function as in the processing apparatus 1. Thus, the remote operation allowable range can be set suitably for each function. As a result, it is possible to obtain a remote operation system very excellent in user-friendliness and safety.

Figure 19:
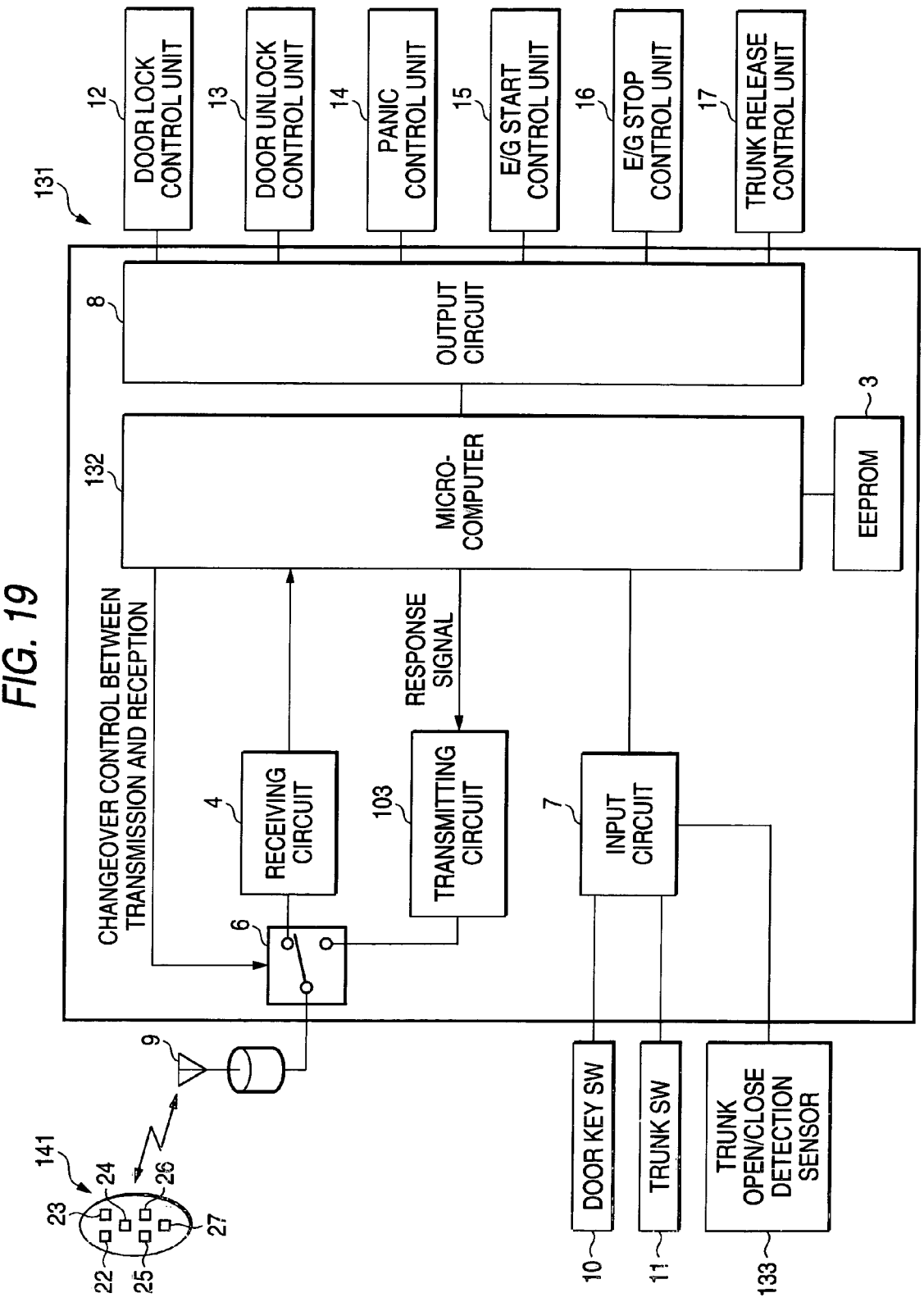
FIG. 19 is a block diagram schematically showing a main portion of a remote operation system including processing apparatus and a portable transmitter according to Embodiment (8).

FIG. 19 is a block diagram schematically showing a main portion of a remote operation system including processing apparatus and a portable transmitter according to Embodiment (8). Constituent parts similar to those in the remote operation system shown in FIG. 1 are denoted by the same reference numerals correspondingly, and description thereof will be omitted here. In FIG. 19, the reference numeral 131 represents a processing apparatus to be mounted on a vehicle. The processing apparatus 131 includes a microcomputer 132, an EEPROM 3 storing an ID code, a receiving circuit 4 for receiving a radio wave (such as a signal having instruction information added to an ID code) transmitted from a portable transmitter 141 to be portably carried by a registered user, a transmitting circuit 103, a changeover switch 6 for changing over an antenna between the transmitting side and the receiving side, an input circuit 7 and an output circuit 8.

A high-efficiency antenna 9 having a comparatively long arrival distance (for example, 200 m) of transmitted radio waves is connected to the changeover switch 6. The high-efficiency antenna 9 is connected to the receiving circuit 4 and the transmitting circuit 103 through the changeover switch 6. In addition, a door key switch 10 for locking/unlocking the door, a trunk switch 11 for releasing the trunk, and a trunk open/close detection sensor 133 for detecting the open/close state of the trunk are connected to the input circuit 7.

Figure 20:
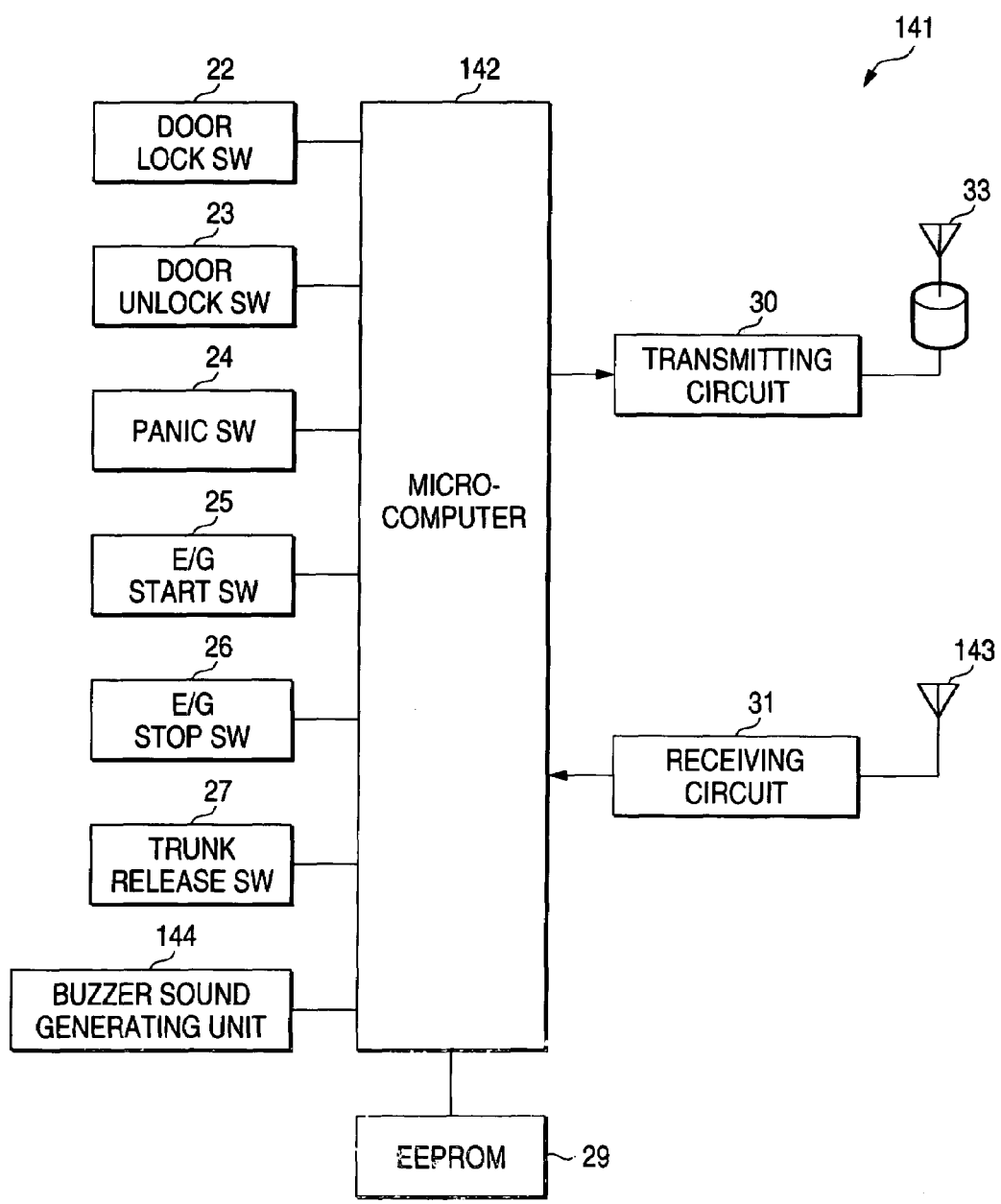
FIG. 20 is a block diagram schematically showing a main portion of the portable transmitter according to Embodiment (8).

FIG. 20 is a block diagram schematically showing a main portion of the portable transmitter 141 according to Embodiment (8). Constituent parts similar to those in the portable transmitter shown in FIG. 2 are denoted by the same reference numerals correspondingly, and description thereof will be omitted here. The portable transmitter 141 includes a microcomputer 142, an EEPROM 29, a transmitting circuit 30, a receiving circuit 31, a high-efficiency transmitting antenna 33, a receiving antenna 143, a door lock switch 22, a door unlock switch 23, a panic switch 24, an engine start switch 25, an engine stop switch 26, a trunk release switch 27 and a buzzer sound generating unit 144 for generating a buzzer sound.

Figure 21:
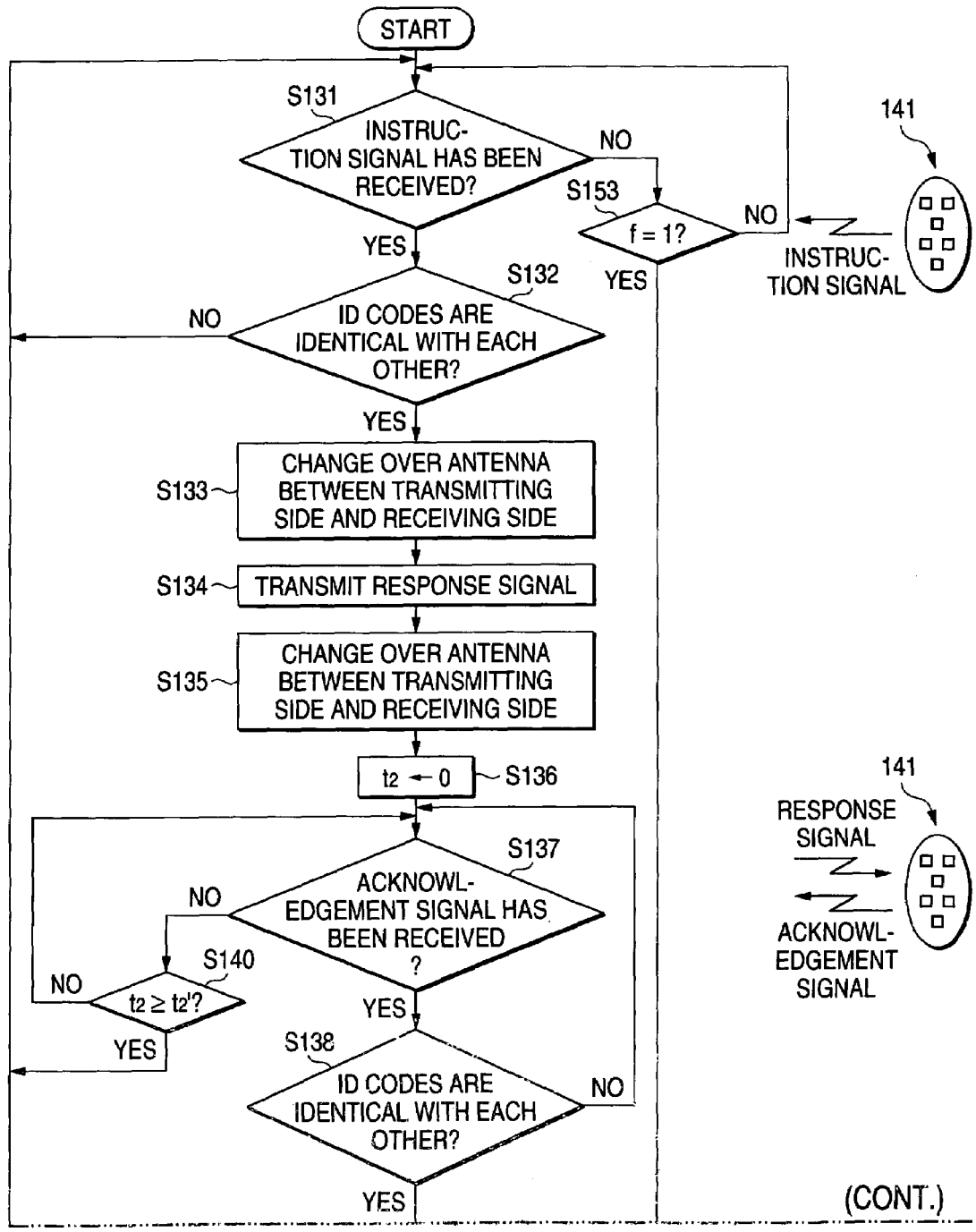
FIG. 21 is a flow chart showing a processing operation to be executed by a microcomputer in the processing apparatus according to Embodiment (8).

Next a processing operation [8-b] to be executed by the microcomputer 132 in the processing apparatus 131 according to Embodiment (8) will be described with reference to the flow chart shown in FIG. 21. Steps S131 to S140 in the processing operation [8-b] are substantially similar to Steps S31 to S43 in the processing operation [1-b] shown in FIG. 4. Accordingly, description will be made here about only the operation on and after Step 139.

In Step S139, the microprocessor 132 makes control to activate a function to be activated by instruction information included in an instruction signal transmitted from the portable transmitter 141. After that, the microprocessor 132 first judges whether the activated function is a trunk release function or not (Step S141). When the microprocessor 132 concludes that the activated function is a trunk release function, the microprocessor 132 sets a timer $t_3$ to zero and starts the timer $t_3$ (Step S142). Then, the microprocessor 132 sets a trunk flag f to 1 indicating that the trunk has been released (Step S143).

Next, based on information obtained from the trunk open/close detection sensor 133, the microprocessor 132 judges whether the trunk has been closed or not (Step S144). When the microprocessor 132 concludes that the trunk has been closed, the microprocessor 132 further concludes that the risk of theft or the like which may occur when the trunk has been released by remote operation has been avoided, and sets the trunk flag f to 0 (Step S145). Then, the processing operation returns directly to Step S131.

On the other hand, when the microprocessor 132 concludes that the trunk has not been closed, the microprocessor 132 next judges whether the timer $t_3$ has reached a predetermined time $t_3'$ (for example, 30 seconds) or not (Step S146). When the microprocessor 132 concludes that the timer $t_3$ has reached the predetermined time $t_3'$ (that is, 30 seconds have passed since the trunk was released), the microprocessor 132 next controls the changeover switch 6 to change over the high-efficiency antenna 9 to the transmitting side (Step S147). The microprocessor 132 outputs a caution signal to the transmitting circuit 103 so as to radiate the caution signal from the high-efficiency antenna 9 (Step S148). The caution signal (including the ID code stored in the EEPROM 3) is provided for notifying the user of the fact that 30 seconds has passed since the trunk was released and there is a risk of theft or the like. After that, the microprocessor 132 controls the changeover switch 6 to change over the high-efficiency antenna 9 to the receiving side (Step S149), and sets the trunk flag f to 0 (Step S150). Then, the processing operation returns to Step S131.

On the other hand, when the microprocessor 132 concludes in Step S146 that the timer $t_3$ has not yet reached the predetermined time $t_3'$, the microprocessor 132 next judges whether the door is open or not (Step S151). When the microprocessor 132 concludes that the door is open (that is, the user is near the vehicle), the microprocessor 132 resets the timer $t_3$ to zero and restarts the timer $t_3$ (Step S152) because it is not necessary to transmit the caution signal. After that, the processing operation returns to Step S131. On the other hand, when the microprocessor 132 concludes that the door is closed, the processing operation returns directly to Step S131 because it is not necessary to reset the timer $t_3$ to 0. Incidentally, as for the method for judging whether the door is open or not, there is, for example, a method in which a door open detection sensor for detecting the open state of the door is connected to the microcomputer 132, and the microcomputer 132 judges whether the door is open or not based on information obtained from the door open detection sensor.

When the microcomputer 132 concludes in Step S151 that the door is open, it is suggested that the user, that is, a driver is near the vehicle. In this case, it is therefore unnecessary to transmit the caution signal. After that, when the door is closed with the trunk being still released, the microcomputer 132 skips over the processing operation in Step S152. Since the timer $t_3$ is not reset to 0, the timer $t_3$ keeps counting as it is. As soon as the predetermined time $t_3'$ has passed with the trunk being still released, the caution signal is transmitted.

When the microcomputer 132 concludes in Step S141 that the activated function is not a trunk release function, the processing operation returns directly to Step S131 because it is not necessary to perform the processing operation on and after Step S142. When the microcomputer 132 concludes in Step S131 that the instruction signal transmitted from the portable transmitter 141 has not been received, the microcomputer 132 next judges whether the trunk flag f is 1 or not (Step S153). When the microcomputer 132 concludes that the trunk flag f is 1, the processing operation proceeds to Step S144. When the microcomputer 132 concludes that the trunk flag f is not 1, the processing operation returns directly to Step S131.

Figure 22:
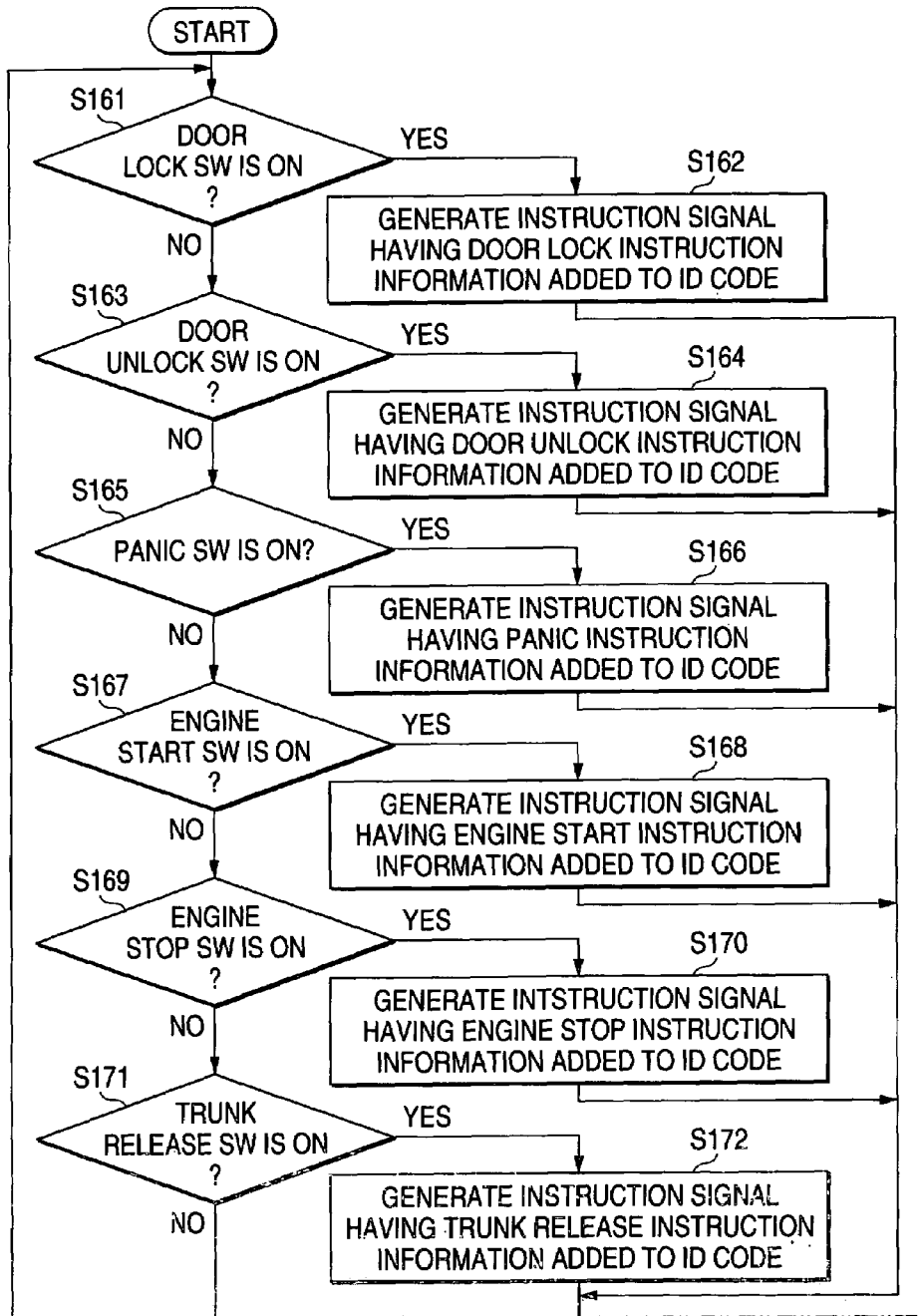
FIG. 22 is a flow chart showing a processing operation to be executed by a microcomputer in the portable transmitter according to Embodiment (8).

Next, a processing operation [8-a] to be executed by the microcomputer 142 in the processing apparatus 141 according to Embodiment (8) will be described with reference to the flow chart shown in FIG. 22. Steps S161 to S178 in the processing operation [8-a] are substantially similar to Steps S1 to S20 in the processing operation [1-a] shown in FIG. 3.

Accordingly, description will be made here about only the operation on and after Step 179.

In Step S179, the microcomputer 142 judges whether the caution signal transmitted from the processing apparatus 131 has been received or not. When the microcomputer 142 concludes that the caution signal has been received, the microcomputer 142 judges whether an ID code included in the received caution signal is identical with the ID code stored in the EEPROM 29 or not (Step S180).

When the microcomputer 142 concludes that the ID codes are identical with each other (that is, the received caution signal is a signal transmitted from the processing apparatus 131 paired with the portable transmitter 141), the microcomputer 142 controls the buzzer sound generating unit 144 to generate a buzzer sound so as to inform the user of the fact that 30 seconds have passed since the trunk was released (Step S181). Then, the processing operation returns to Step S161.

On the other hand, the microcomputer 142 concludes that the ID codes are not identical with each other, the processing operation returns directly to Step S161 because it is not necessary to generate a buzzer sound. Also when the microcomputer 142 concludes in Step S179 that the caution signal has not been received, the processing operation returns directly to Step S161.

In the remote operation system including the processing apparatus and the portable transmitter according to Embodiment (8), when the trunk has been released by remote operation, and the predetermined time $t_3'$ (for example, 30 seconds) have passed with the trunk being still released, the user is informed of the fact that the predetermined time $t_3'$ have passed with the trunk being still released. Thus, the risk of theft or the like can be reduced.

The processing apparatus 131 according to Embodiment (8) sends an notification under a condition of such notification that the predetermined time $t_3'$ have passed with the trunk being still released. However, the condition for sending the notification is not limited to this. For example, in processing apparatus according to another embodiment, even if the predetermined time $t_3'$ have passed with the trunk being still released, when the door has been opened once in the meantime, it may be concluded that the user is near the vehicle, so that no notification is sent (the caution signal is not transmitted).

In the remote operation system according to Embodiment (8), a buzzer sound is generated in the portable transmitter 141. However, in a remote operation system according to another embodiment, a buzzer sound may be generated on the processing apparatus side. Incidentally, the mode of the notification is not limited to such a buzzer sound, but may be another sound or something visual such as a display. Alternatively, the portable transmitter may be vibrated. The remote operation system according to Embodiment (8) may be combined with the remote operation system according to any one of Embodiments (1) to (7).

Description up to now has been made only about the case where the arrival distance of a response signal to be transmitted from processing apparatus is adjusted. However, in a portable transmitter according to another embodiment, the power intensity of a radio wave to be transmitted may be adjusted, or an output antenna may be changed over among a plurality of transmitting antennas different in radiation efficiency so as to adjust the arrival distance of an instruction signal, an acknowledgement signal or the like in accordance with each function, in the same manner as in the processing apparatus.

The remote operation systems according to Embodiments (1) to (7) have been described about the case where the arrival distance of a radio wave to be transmitted from the portable transmitter 21, 81, . . . is substantially equal to the maximum arrival distance of a radio wave to be transmitted from the processing apparatus 1, 1A, . . . However, those arrival distances do not have to be equal to each other. In a remote operation system according to another embodiment, for example, the maximum arrival distance of a response signal to be transmitted from the processing apparatus 1, 1A, . . . may be made shorter than the arrival distance of an instruction signal to be transmitted from the portable transmitter 21, 81, . . . Thus, the response signal receivable range (the rage where the response signal can reach) can be set as the remote operation allowable range. As a result, the remote operation allowable range can be set properly on the processing apparatus 1, 1A, . . . side.

Figure 23:
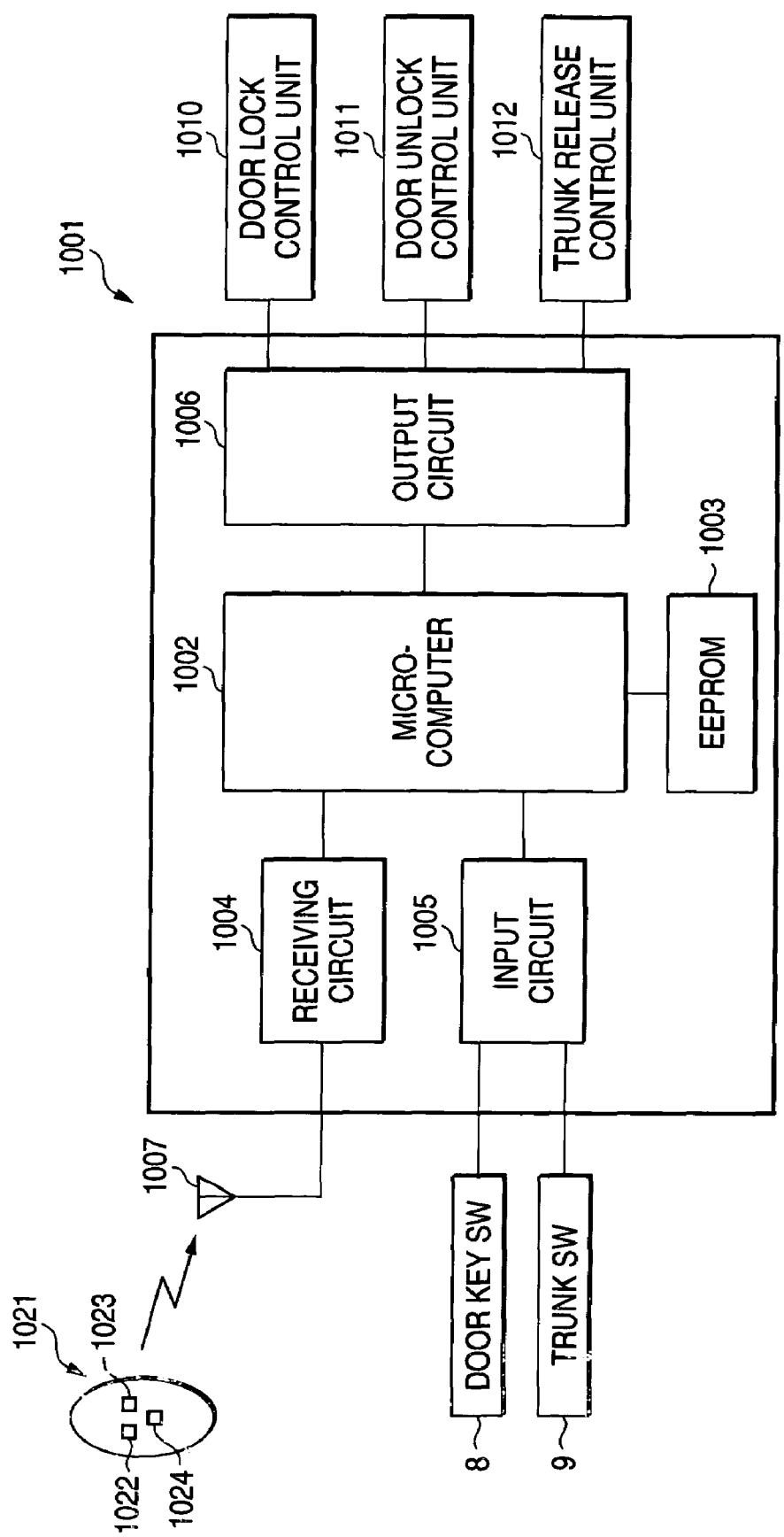
FIG. 23 is a block diagram schematically showing a main portion of a remote operation system including a portable transmitter according to Embodiment (9) of the invention.

FIG. 23 is a block diagram schematically showing a main portion of a remote operation system including a portable transmitter according to Embodiment (9).

In FIG. 23, the reference numeral 1001 represents a processing apparatus to be mounted on a vehicle. The processing apparatus 1001 includes a microcomputer 1002, an EEPROM 1003 storing an ID code, a receiving circuit 1004 for receiving a radio wave (a signal in which instruction information has been added to the ID code) transmitted from a portable transmitter 1021 to be portably carried by a registered user, an input circuit 1005, and an output circuit 1006. An antenna 1007 is connected to the receiving circuit 1004. On the other hand, the portable transmitter 1021 includes a door lock switch 1022, a door unlock switch 1023 and a trunk release switch 102.4.

A door key switch 1008 for locking/unlocking the door and a trunk switch 1009 for releasing the trunk are connected to the input circuit 1005. A door lock control unit 1010 for making door lock control, a door unlock control unit 1011 for making door unlock control and a trunk release control unit 1012 for making trunk release control (unlock control) are connected to the output circuit 1006.

Here, the processing apparatus 1001 is designed to control the door lock control unit 1010 for making door lock control and the door unlock control unit 1011 for making door unlock control, individually. However, according to another embodiment, the processing apparatus 1001 may be designed to control a single control unit for making door lock/unlock control.

When receiving a signal in which door lock instruction information has been added to a correct ID code (that is, a code identical to the ID code stored in the EEPROM 1003), the microcomputer 1002 controls the door lock control unit 1010 so as to lock the door. When receiving a signal in which door unlock instruction information has been added to the correct ID code, the microcomputer 1002 controls the door unlock control unit 1011 so as to unlock the door.

When receiving a signal having trunk release instruction information added to the correct ID code, the microcomputer 1002 controls the trunk release control unit 1012 so as to release the trunk in the same manner as when receiving a signal including the door lock instruction information or the door unlock instruction information.

Further, based on a signal obtained from the door key switch 1008 or the trunk switch 1009, the microcomputer 1002 controls the door lock control unit 1010, the door unlock control unit 1011 or the trunk release control unit 1012 so as to lock the door, unlock the door or release the trunk.

Figure 24:
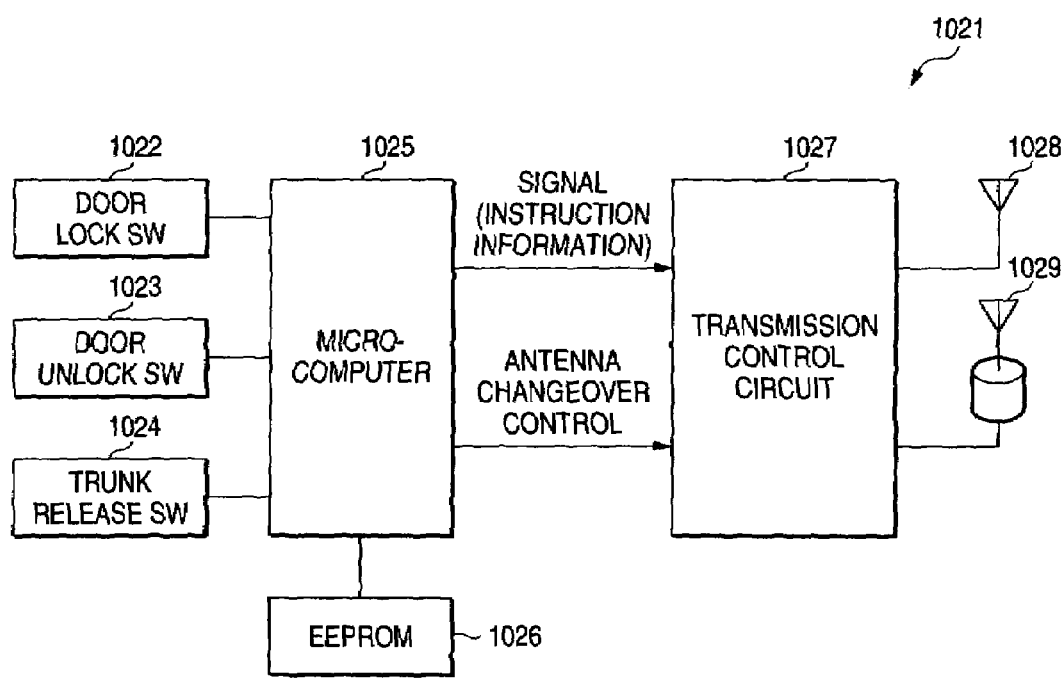
FIG. 24 is a block diagram schematically showing a main portion of the portable transmitter according to Embodiment (9).

FIG. 24 is a block diagram schematically showing a main portion of the portable transmitter 1021 according to Embodiment (9). The portable transmitter 1021 includes a microcomputer 11025, an EEPROM 1026 storing an ID code, a transmission control circuit 1027, a low-efficiency antenna 1028 for setting a transmitted radio wave arrival distance as a short distance (for example, up to 10 m), a middle-efficiency antenna 1029 for setting a transmitted radio wave arrival distance as a middle distance (for example, up to 30 m), a door lock switch 1022, a door unlock switch 1023, and a trunk release switch 1024.

When the door lock switch 1022 or the door unlock switch 1023 is operated, the microcomputer 11025 outputs a signal in which the door lock instruction information or the door unlock instruction information has been added to the ID code, to the transmission control circuit 1027. Then, the microcomputer 11025 makes control to radiate the signal from the middle-efficiency antenna 1029. Thus, the arrival distance of the signal is set as the middle distance. On the other hand, when the trunk release switch 1024 is operated, the microcomputer 11025 outputs a signal in which the trunk release instruction information has been added to the ID code, to the transmission control circuit 1027. Then, the microcomputer 11025 makes control to radiate the signal from the low-efficiency antenna 1028. Thus, the arrival distance of the signal is reduced.

Figure 25:
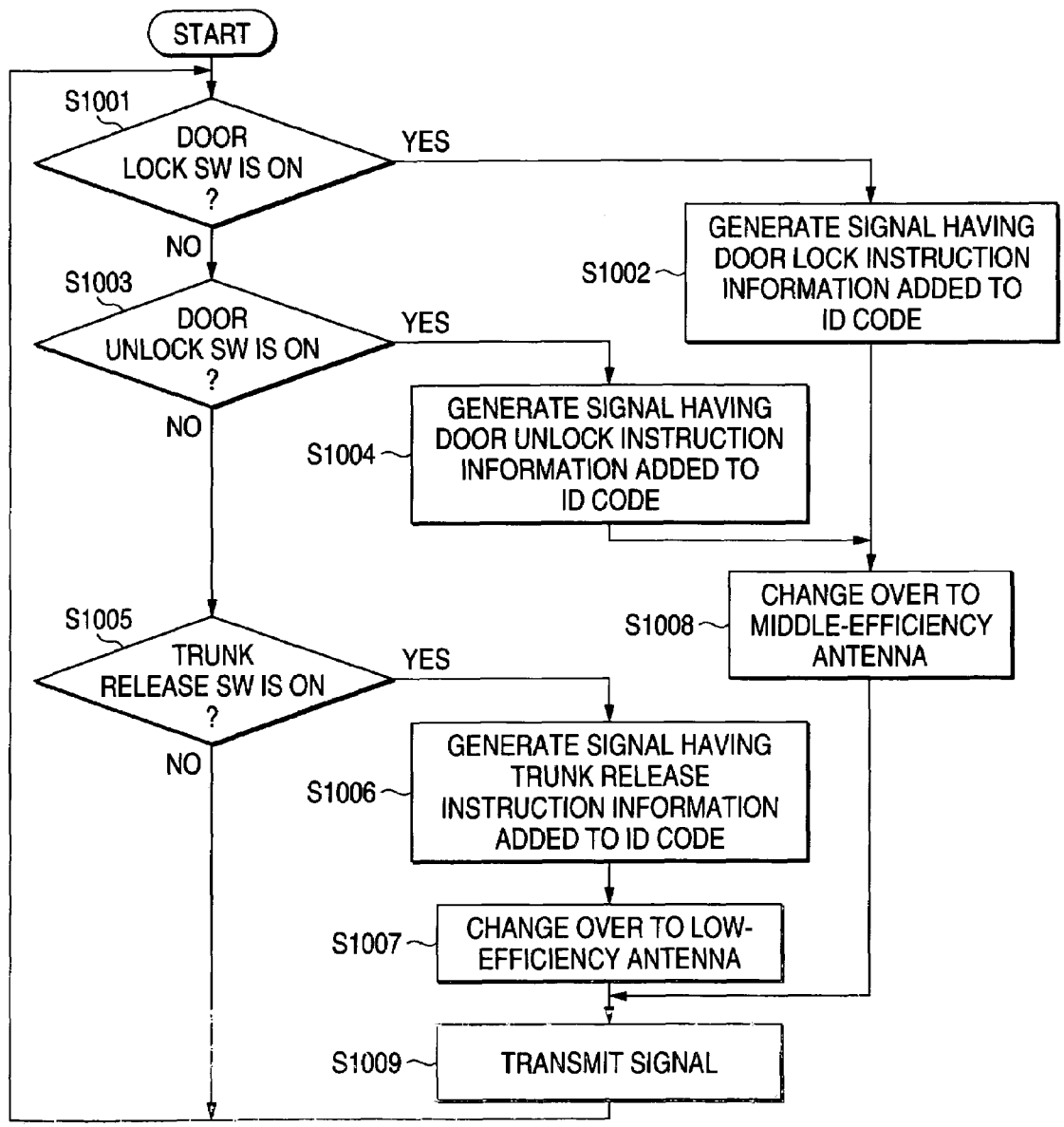
FIG. 25 is a flow chart showing a processing operation to be executed by a microcomputer in the portable transmitter according to Embodiment (9).

Next, a processing operation [9] to be executed by the microcomputer 11025 in the portable transmitter 1021 according to Embodiment (9) will be described with reference to the flow chart shown in FIG. 25. First, the microcomputer 11025 judges whether or not the door lock switch 1022 has been operated (Step S1001). When the microcomputer 11025 concludes that the door lock switch 1022 has been operated, the microcomputer 11025 next reads the ID code stored in the EEPROM 1026, and generates a signal in which instruction information (here, door lock instruction information) corresponding to the operated switch has been added to the read ID code (Step S1002). Next, the microcomputer 11025 controls the transmission control circuit 1027 so as to set the middle-efficiency antenna 1029 as an output antenna (Step S1008). After that, the microcomputer 11025 outputs the generated signal to the transmission control circuit 1027 so as to radiate the signal from the middle-efficiency antenna 1029 (Step S1009). Then, the processing operation returns to Step S1001. Thus, the arrival distance of a radio wave including the door lock instruction information can be set as the middle distance.

On the other hand, when the microcomputer 11025 concludes in Step S1001 that the door lock switch 1022 has not been operated, the microcomputer 11025 next judges whether the door unlock switch 1023 has been operated or not (Step S1003). When the microcomputer 11025 concludes that the door unlock switch 1023 has been operated, the microcomputer 11025 generates a signal in which instruction information (here, door unlock instruction information) corresponding to the operated switch has been added to the ID code (Step S1004) in the same manner as when the microcomputer 11025 concludes that the door lock switch 1022 has been operated. The microcomputer 11025 radiates the generated signal from the middle-efficiency antenna 1029 (Step S1008 and S1009). Thus, the arrival distance of a radio wave including the door unlock instruction information can be set as the middle distance.

On the other hand, when the microcomputer 11025 concludes in Step S1003 that the door unlock switch 1023 has not been operated, the microcomputer 11025 judges whether the trunk release switch 1024 has been operated or not (Step S1005). When the microcomputer 11025 concludes that the trunk release switch 1024 has been operated, the microcomputer 11025 next reads the ID code stored in the EEPROM 1026, and generates a signal in which instruction information (here, trunk release instruction information) corresponding to the operated switch has been added to the read ID code (Step S1006). Next, the microcomputer 11025 controls the transmission control circuit 1027 so as to set the low-efficiency antenna 1028 as an output antenna (Step S1007). After that, the microcomputer 11025 outputs the generated signal to the transmission control circuit 1027 so as to radiate the signal from the low-efficiency antenna 1028 (Step S1009). Then, the processing operation returns to Step S1001. Thus, the arrival distance of a radio wave including the trunk release instruction information can be set as the short distance.

According to the portable transmitter of Embodiment (9), control is made as follows. That is, when a radio wave including instruction information for activating a door lock function or a door unlock function is to be transmitted, the arrival distance of the radio wave to be transmitted is set as a middle distance (for example, 30 m). On the other hand, when a radio wave including instruction information for activating a trunk release function is to be transmitted, the arrival distance of the radio wave to be transmitted is set as a short distance (for example, 10 m).

Thus, the remote operation allowable range in the trunk release function can be limited to only a range closer to the vehicle than the remote operation allowable range in the door unlock function. Accordingly, the risk of vehicle theft can be reduced so that the security can be improved.

Figure 26:
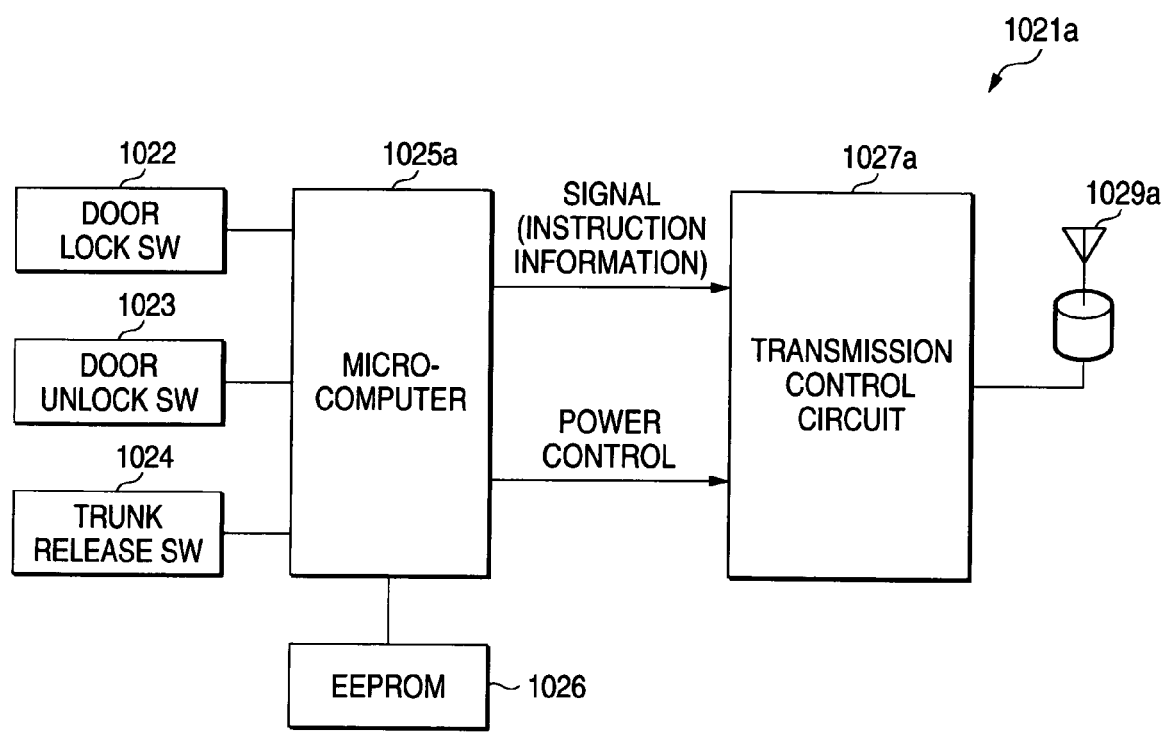
FIG. 26 is a block diagram schematically showing a main portion of a portable transmitter according to another embodiment.

Although the portable transmitter according to Embodiment (9) has the low-efficiency antenna 1028 and the middle-efficiency antenna 1029, a portable transmitter 1021a according to another embodiment may have only a middle-efficiency antenna 1029a as shown in FIG. 26. In FIG. 26, a microcomputer 11025a controls a transmission control circuit 1027a so as to adjust the power intensity of a radio wave to be transmitted and hence adjust the arrival distance of the transmitted radio wave.

Figure 27:
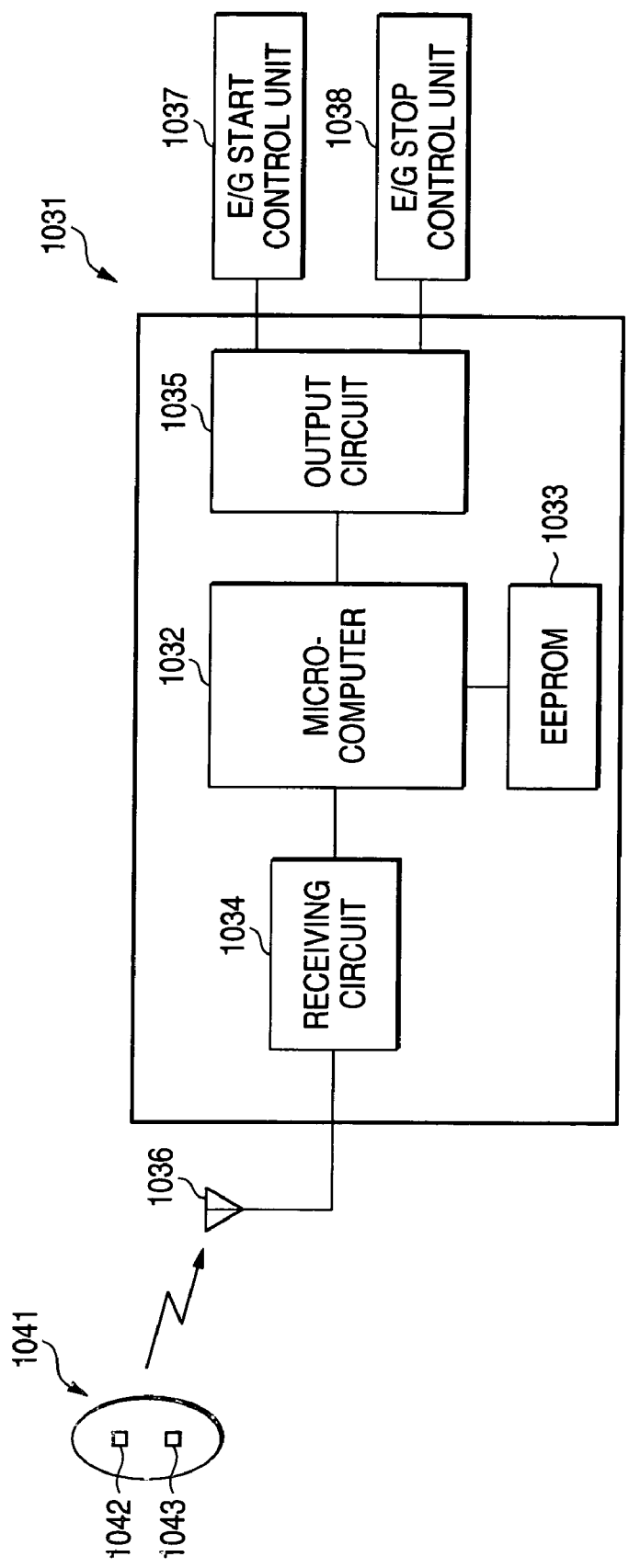
FIG. 27 is a block diagram schematically showing a main portion of a remote operation system including a portable transmitter according to Embodiment (10).

FIG. 27 is a block diagram schematically showing a main portion of a remote operation system including a portable transmitter according to Embodiment (10). In FIG. 27, the reference numeral 1031 represents a processing apparatus to be mounted on a vehicle. The processing apparatus 1031 is constituted by a microcomputer 1032, an EEPROM 1033 storing an ID code, a receiving circuit 1034 for receiving a radio wave (a signal in which instruction information has been added to the ID code) transmitted from a portable transmitter 1041 to be portably carried by a registered user, and an output circuit 1035. An antenna 1036 is connected to the receiving circuit 1034. On the other hand, the portable transmitter 1041 includes an engine start switch 1042 and an engine stop switch 1043.

An engine start control unit 1037 for making engine start control, and an engine stop control unit 1038 for making engine stop control are connected to the output circuit 1035. When receiving a signal in which engine start instruction information has been added to a correct ID code (that is, a code identical to the ID code stored in the EEPROM 1033), the microcomputer 1032 controls the engine start control unit 1037 so as to start the engine. When receiving a signal in which engine stop instruction information has been added to the correct ID code, the microcomputer 1032 controls the engine stop control unit 1038 so as to stop the engine.

Figure 28:
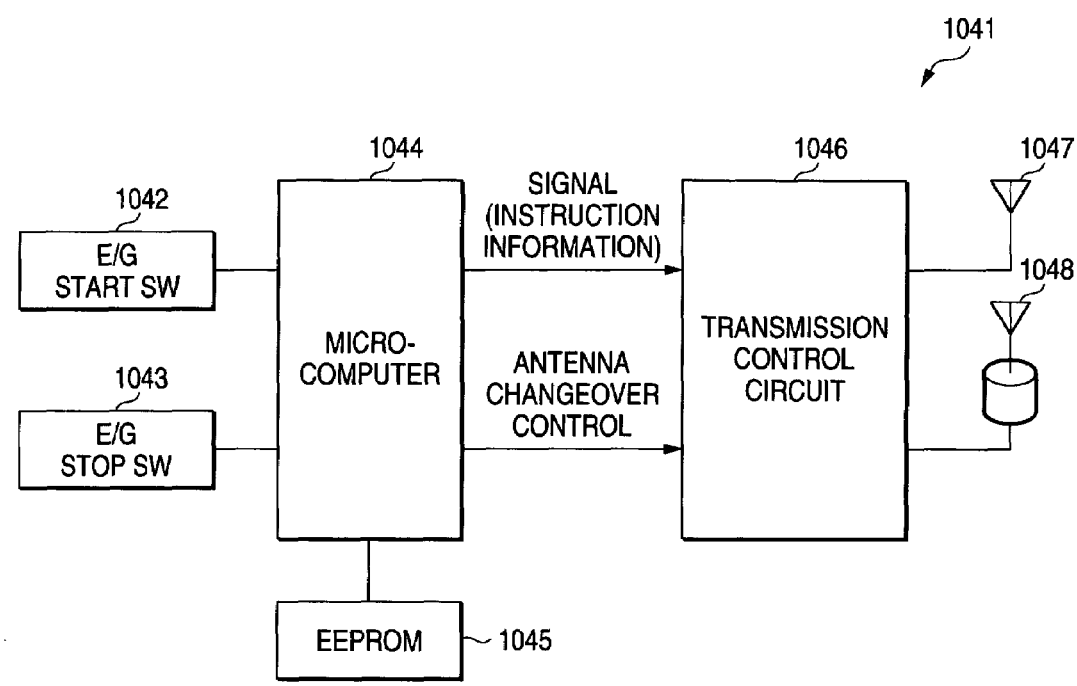
FIG. 28 is a block diagram schematically showing a main portion of the portable transmitter according to Embodiment (10).

FIG. 28 is a block diagram schematically showing a main portion of the portable transmitter 1041 according to Embodiment (10). The portable transmitter 1041 includes a microcomputer 1044, an EEPROM 1045 storing an ID code, a transmission control circuit 1046, a high-efficiency antenna 1047 for setting a transmitted radio wave arrival distance as a long distance (for example, up to 200 m), a high-efficiency antenna 1048 for making the transmitted radio wave arrival distance slightly longer (for example, up to 210 m) than the arrival distance set by the high-efficiency antenna 1047, the engine start switch 1042, and the engine stop switch 1043.

When the engine start switch 1042 is operated, the microcomputer 1044 outputs a signal in which the engine start instruction information has been added to the ID code, to the transmission control circuit 1046. Then, the microcomputer 1044 makes control to radiate the signal from the high-efficiency antenna 1047. Thus, the arrival distance of the signal is set as the long distance. On the other hand, when the engine stop switch 1043 is operated, the microcomputer 1044 outputs a signal in which the engine stop instruction information has been added to the ID code, to the transmission control circuit 1046. Then, the microcomputer 1044 makes control to radiate the signal from the high-efficiency antenna 1048. Thus, the arrival distance of the signal is made slightly longer than the arrival distance set for transmitting the engine start instruction information.

Figure 29:
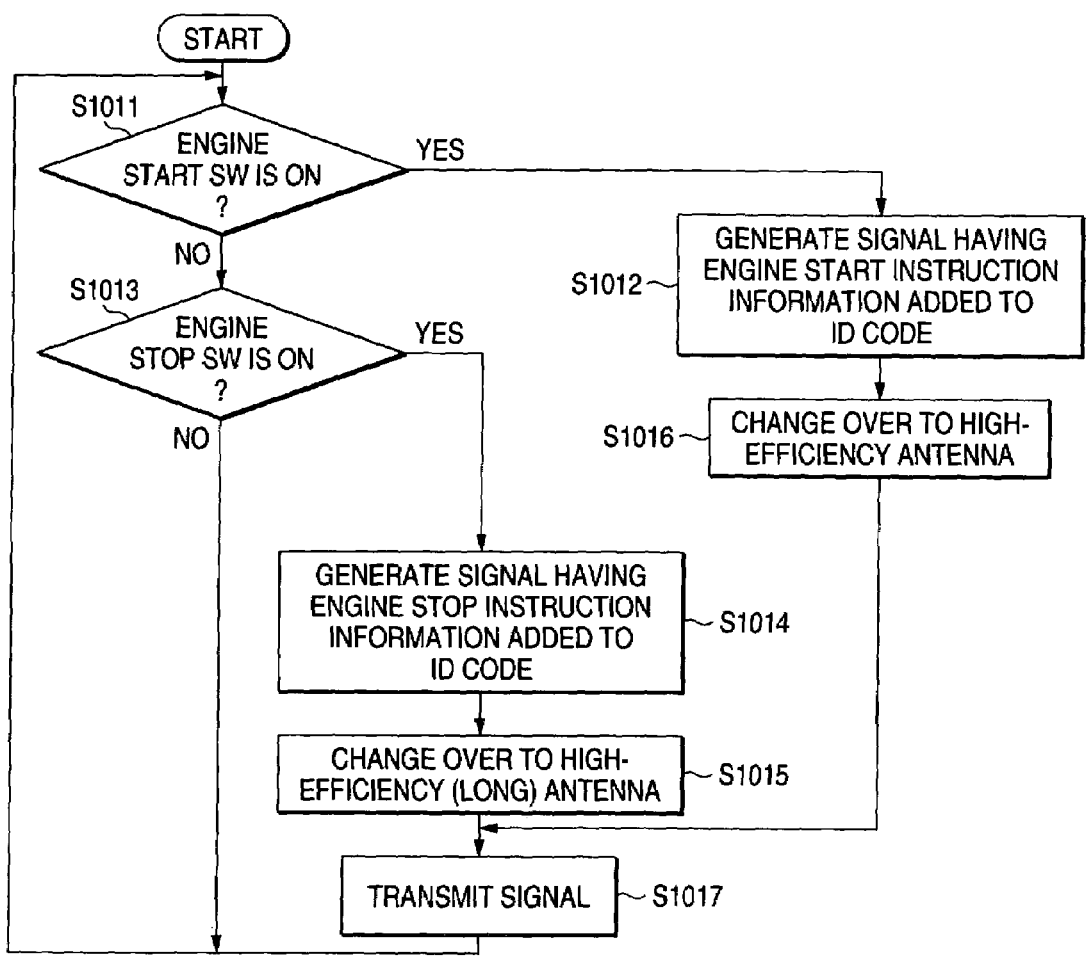
FIG. 29 is a flow chart showing a processing operation to be executed by a microcomputer in the portable transmitter according to Embodiment (10).

Next, a processing operation [10] to be executed by the microcomputer 1044 in the portable transmitter 1041 according to Embodiment (10) will be described with reference to the flow chart shown in FIG. 29. First, the microcomputer 1044 judges whether the engine start switch 1042 has been operated or not (Step S1011). When the microcomputer 1044 concludes that the engine start switch 1042 has been operated, the microcomputer 1044 next reads the ID code stored in the EEPROM 1045, and generates a signal in which instruction information (here, engine start instruction information) corresponding to the operated switch has been added to the read ID code (Step S1012). Next, the microcomputer 1044 controls the transmission control circuit 1046 so as to set the high-efficiency antenna 1047 as an output antenna (Step S1016). After that, the microcomputer 1044 outputs the generated signal to the transmission control circuit 1046 so as to radiate the signal from the high-efficiency antenna 1047 (Step S1017). Then, the processing operation returns to Step S1011. Thus, the arrival distance of a radio wave including the engine start instruction information can be set as the long distance (for example, 200 m).

On the other hand, when the microcomputer 1044 concludes in Step S1011 that the engine start switch 1042 has not been operated, the microcomputer 1044 next judges whether the engine stop switch 1043 has been operated or not (Step S1013). When the microcomputer 1044 concludes that the engine stop switch 1043 has been operated, the microcomputer 1044 next reads the ID code stored in the EEPROM 1045, and generates a signal in which instruction information (here, engine stop instruction information) corresponding to the operated switch has been added to the read ID code (Step S1014). Next, the microcomputer 1044 controls the transmission control circuit 1046 so as to set the high-efficiency antenna 1048 as an output antenna (Step S1015). After that, the microcomputer 1044 outputs the generated signal to the transmission control circuit 1046 so as to radiate the signal from the high-efficiency antenna 1048 (Step S1017). Then, the processing operation returns to Step S1011. Thus, the arrival distance of a radio wave including the engine stop instruction information can be made slightly longer than the arrival distance of a radio wave including the engine start instruction information.

According to the portable transmitter of Embodiment (10), the arrival distance of each signal is adjusted so that the arrival distance of a signal for activating the engine start function is shorter than the arrival distance of a signal for activating the engine stop function. Thus, the engine stop function can be always operated remotely wherever the engine start function can be operated remotely. As a result, the engine can be prevented from being driven carelessly.

The engine start function is paired with the engine stop function. When the difference in size between the remote operation allowable ranges of the paired functions is too large, there is a fear that the user friendliness deteriorates. For example, assume that the engine stop remote operation is allowable at a place up to 300 m distant from the vehicle, while the engine start remote operation is allowable at a place up to 200 m distant from the vehicle. In this case, there is a fear that it is difficult for the user to grasp how long the remote operation allowable range is in the engine start or stop function. It is therefore desired that the difference between the arrival distances (that is, the remote operation allowable ranges) is put within a predetermined range (for example, 5-30 m).

Figure 30:
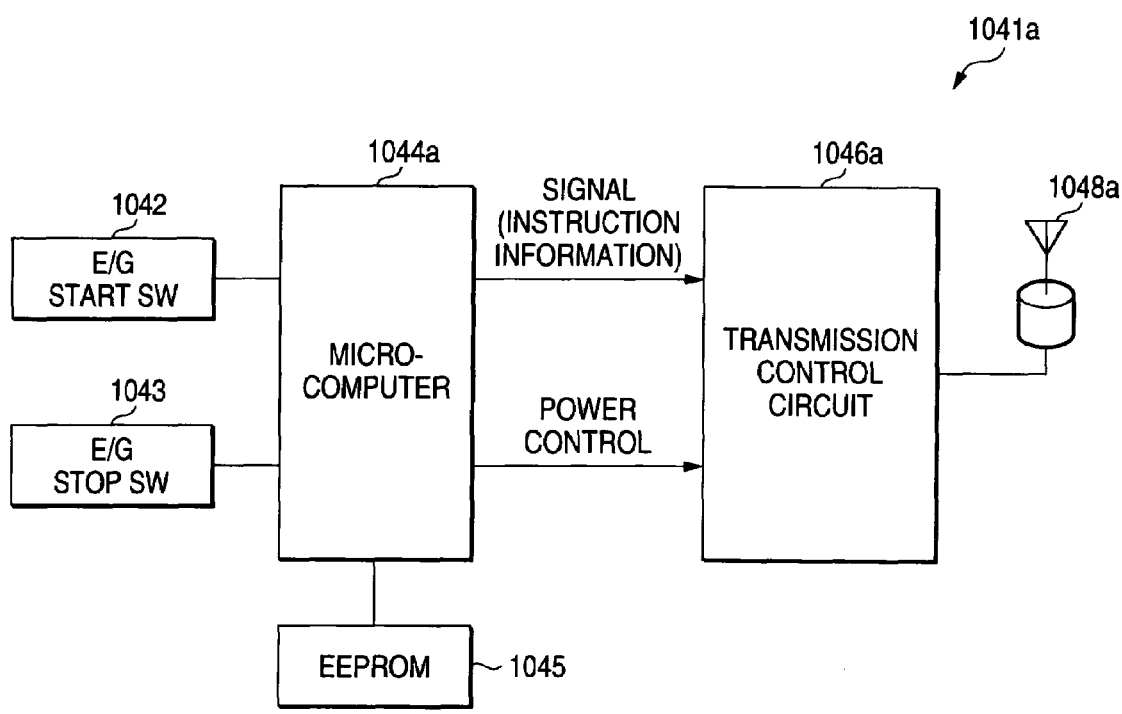
FIG. 30 is a block diagram schematically showing a main portion of a portable transmitter according to another embodiment.

Although the portable transmitter according to Embodiment (10) has the high-efficiency antennas 1047 and 1048, a portable transmitter 1041a according to another embodiment may have only a high-efficiency antenna 1048a as shown in FIG. 30. In FIG. 30, a microcomputer 1044a controls a transmission control circuit 1046a so as to adjust the power intensity of a radio wave to be transmitted and hence adjust the arrival distance of the transmitted radio wave.

In the portable transmitter according to Embodiment (10), the remote operation allowable range in the engine stop function is made wider than the remote operation allowable range in the engine start function. On the contrary, in a portable transmitter according to another embodiment, the remote operation allowable range in the engine stop function may be made narrower than the remote operation allowable range in the engine start function. Thus, the engine start function can be always operated remotely wherever the engine stop function can be operated remotely. It is therefore possible to surely restart the engine even if the user stops the engine accidentally. Incidentally, these settings may be done to meet user's needs.

Figure 31:
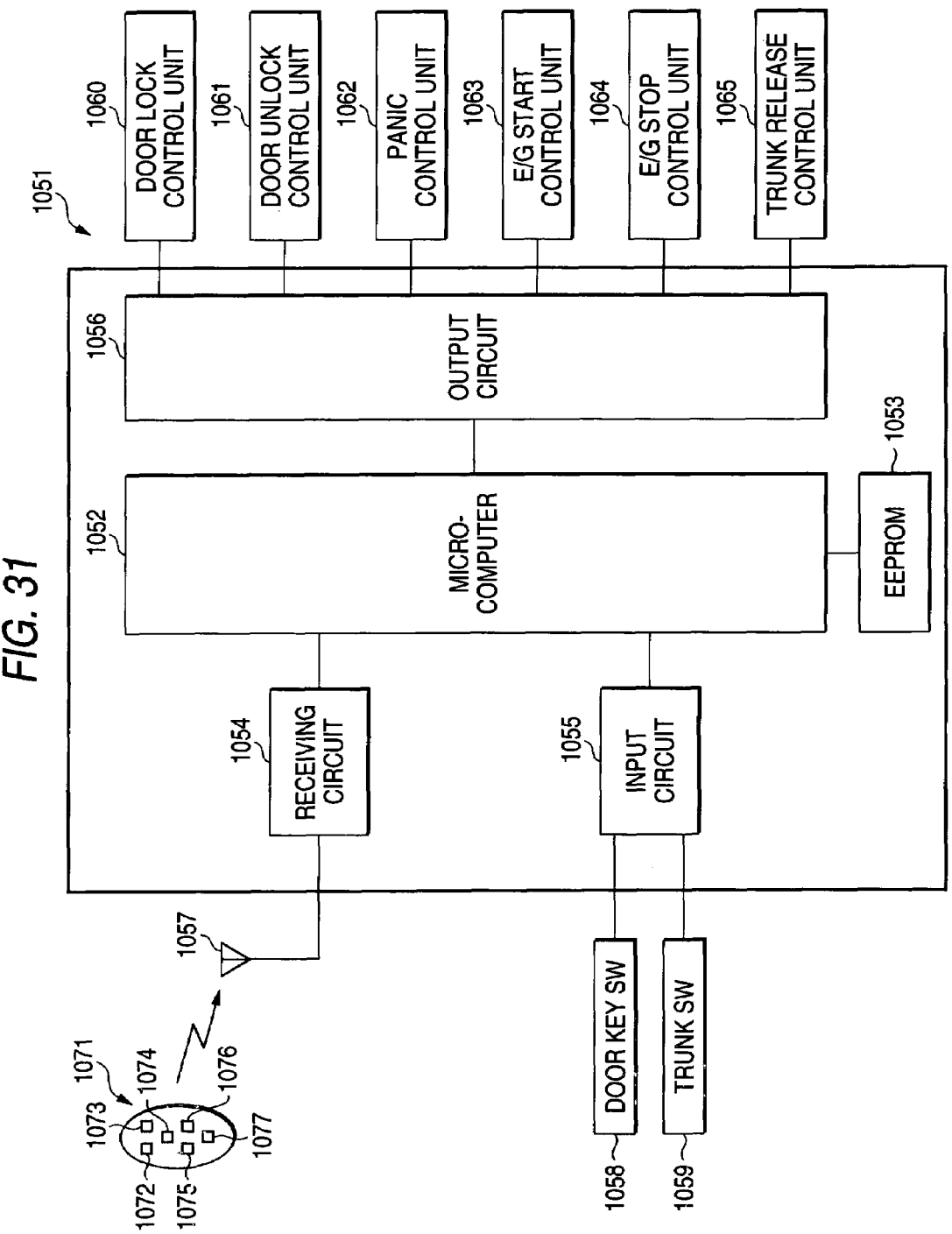
FIG. 31 is a block diagram schematically showing a main portion of a remote operation system including a portable transmitter according to Embodiment (11).

FIG. 31 is a block diagram schematically showing a main portion of a remote operation system including a portable transmitter according to Embodiment (11). In FIG. 31, the reference numeral 1051 represents a processing apparatus to be mounted on a vehicle. The processing apparatus 1051 includes a microcomputer 1052, an EEPROM 1053 storing an ID code, a receiving circuit 1054 for receiving a radio wave (a signal in which instruction information has been added to the ID code) transmitted from a portable transmitter 1071 to be portably carried by a registered user, an input circuit 1055, and an output circuit 1056. An antenna 1057 is connected to the receiving circuit 1054. On the other hand, the portable transmitter 1071 includes a door lock switch 1072, a door unlock switch 1073, a panic switch 1074, an engine start switch 1075, an engine stop switch 1076, and a trunk release switch 1077.

A door key switch 1058 for locking/unlocking the door and a trunk switch 1059 for releasing the trunk are connected to the input circuit 1055. A door lock control unit 1060 for making door lock control, a door unlock control unit 1061 for making door unlock control, a panic control unit 1062 for giving an alarm, an engine start control unit 1063 for making engine start control, an engine stop control unit 1064 for making engine stop control, and a trunk release control unit 1065 for making trunk release control are connected to the output circuit 1056.

When receiving a signal in which door lock instruction information has been added to a correct ID code (that is, a code identical to the ID code stored in the EEPROM 1053), the microcomputer 1052 controls the door lock control unit 1060 so as to lock the door. When receiving a signal in which door unlock instruction information has been added to the correct ID code, the microcomputer 1052 controls the door unlock control unit 1061 so as to unlock the door.

When receiving a signal in which panic instruction information, engine start instruction information, engine stop instruction information or trunk release instruction information has been added to the correct ID code, the microcomputer 1052 controls a control unit corresponding to the received instruction information, that is, the panic control unit 1062, the engine start control unit 1063, the engine stop control unit 1064 or the trunk release control unit 1065 so as to give an alarm, start the engine, stop the engine or release the trunk in the same manner as when receiving a signal including the door lock instruction information or the door unlock instruction information.

Further, based on a signal obtained from the door key switch 1058 or the trunk switch 1059, the microcomputer 1052 controls the door lock control unit 1060, the door unlock control unit 1061 or the trunk release control unit 1065 so as to lock the door, unlock the door or release the trunk.

Figure 32:
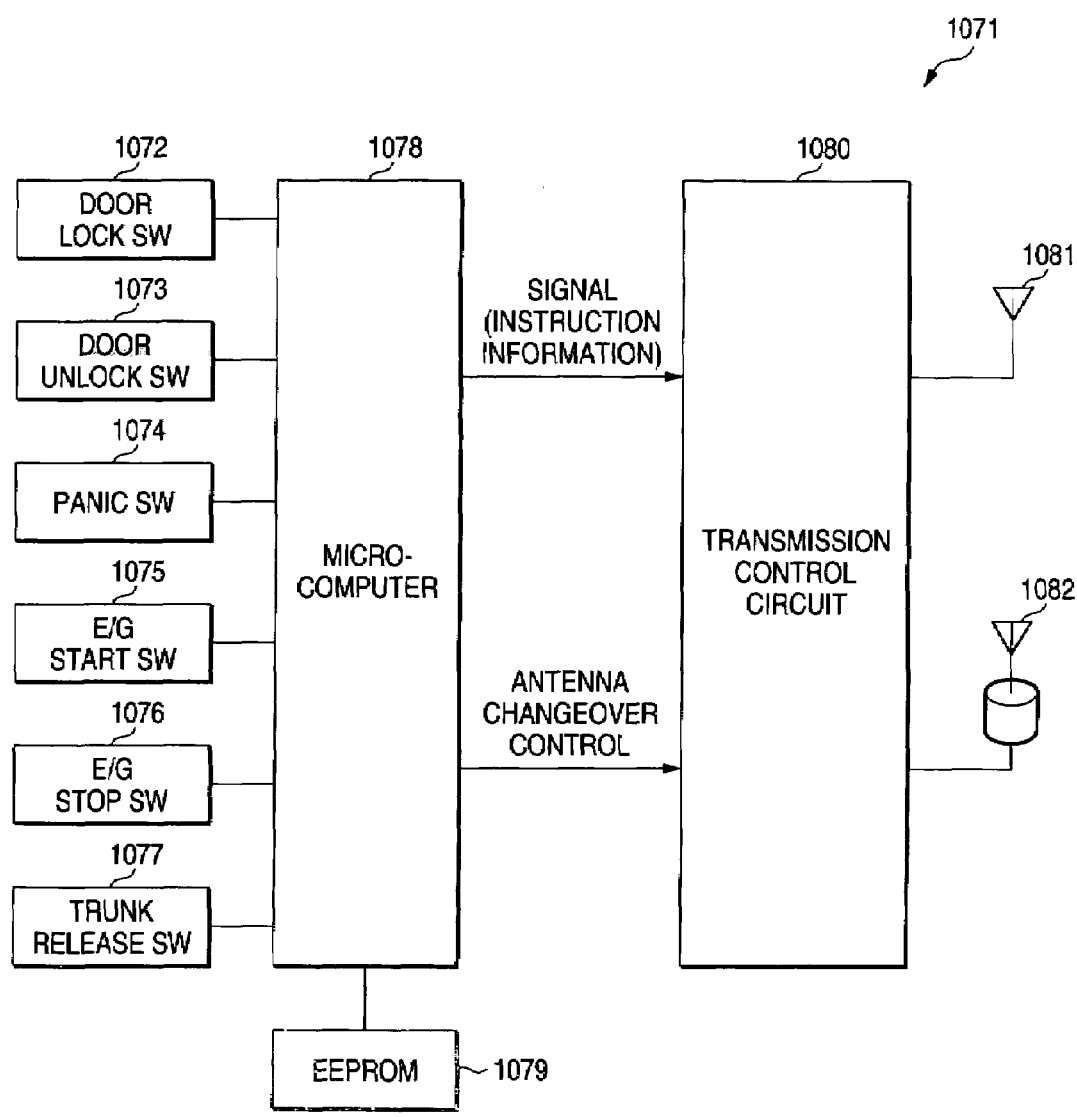
FIG. 32 is a block diagram schematically showing a main portion of the portable transmitter according to Embodiment (11).

FIG. 32 is a block diagram schematically showing a main portion of the portable transmitter 1071 according to Embodiment (11). The portable transmitter 1071 includes a microcomputer 1078, an EEPROM 1079 storing an ID code, a transmission control circuit 1080, a low-efficiency antenna 1081 for setting a transmitted radio wave arrival distance as a short distance (for example, up to 10 m), a high-efficiency antenna 1082 for setting the transmitted radio wave arrival distance as a long distance (for example, up to 200 m), the door lock switch 1072, the door unlock switch 1073, the panic switch 1074, the engine start switch 1075, the engine stop switch 1076 and the trunk release switch 1077.

When the door lock switch 1072 is operated, the microcomputer 1078 outputs a signal in which the door lock instruction information has been added to the ID code, to the transmission control circuit 1080. Then, the microcomputer 1078 makes control to radiate the signal from the high-efficiency antenna 1082 so as to increase the arrival distance of the signal. On the other hand, when the door unlock switch 1073 is operated, the microcomputer 1078 outputs a signal in which the door unlock instruction information has been added to the ID code, to the transmission control circuit 1080. Then, the microcomputer 1078 makes control to radiate the signal from the low-efficiency antenna 1081 so as to reduce the arrival distance of the signal.

When the panic switch 1074, the engine start switch 1075, the engine stop switch 1076 or the trunk release switch 1077 is operated, the microcomputer 1078 outputs a signal in which instruction information corresponding to the operated switch has been added to the ID code, to the transmission control circuit 1080 in the same manner as when the door lock switch 1072 or the door unlock switch 1073 is operated. Then, the microcomputer 1078 makes control to radiate the signal from the low-efficiency antenna 1081 or the high-efficiency antenna 1082.

Figure 33:
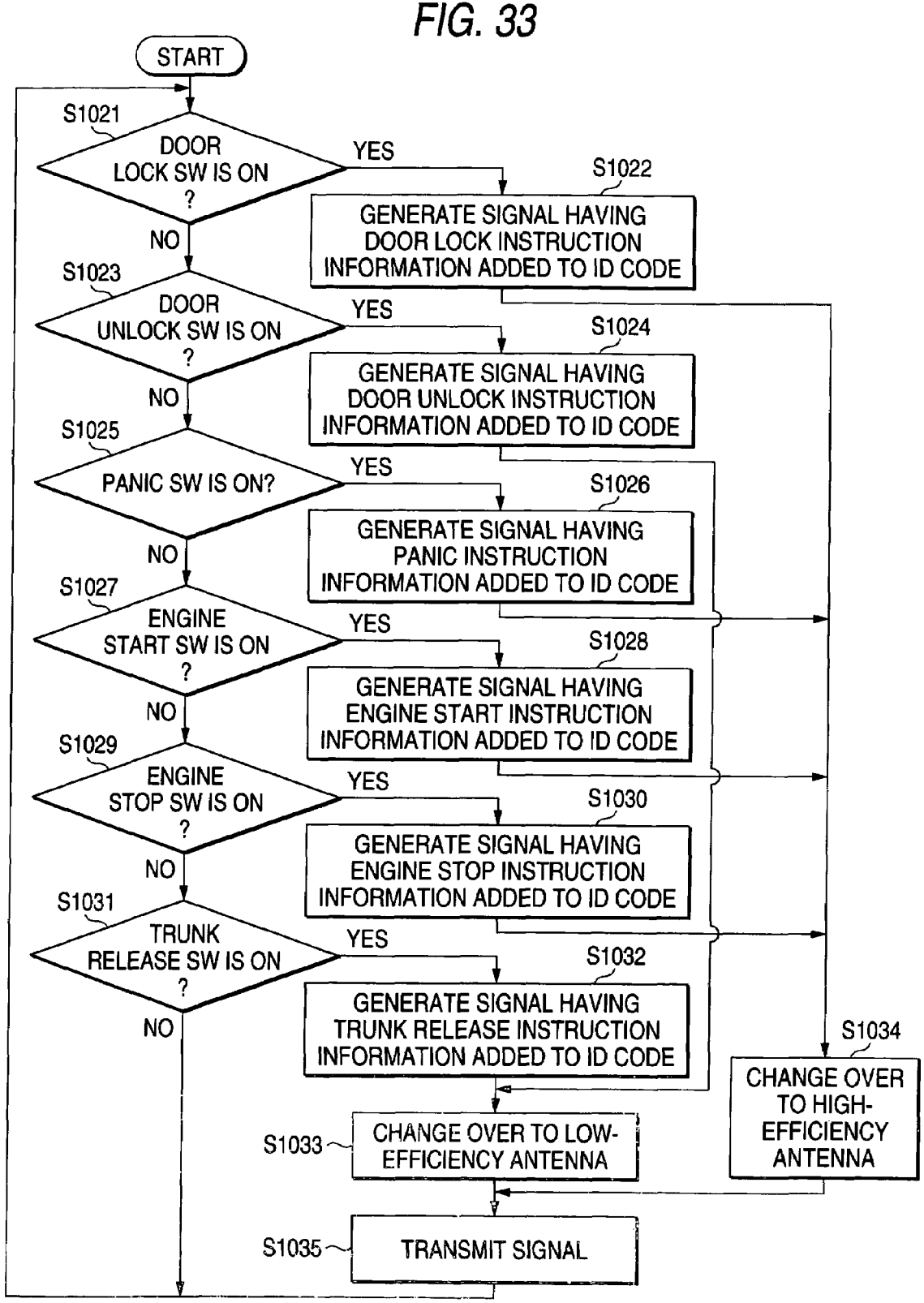
FIG. 33 is a flow chart showing a processing operation to be executed by a microcomputer in the portable transmitter according to Embodiment (11).

Next, a processing operation [11] to be executed by the microcomputer 1078 in the portable transmitter 1071 according to Embodiment (11) will be described with reference to the flow chart shown in FIG. 33. First, the microcomputer 1078 judges whether the door lock switch 1072 has been operated or not (Step S1021). When the microcomputer 1078 concludes that the door lock switch 1072 has been operated, the microcomputer 1078 next reads the ID code stored in the EEPROM 1079, and generates a signal in which instruction information (here, door lock instruction information) corresponding to the operated switch has been added to the read ID code (Step S1022). Next, the microcomputer 1078 controls the transmission control circuit 1080 so as to set the high-efficiency antenna 1082 as an output antenna (Step S1034). After that, the microcomputer 1078 outputs the generated signal to the transmission control circuit 1080 so as to radiate the signal from the high-efficiency antenna 1082 (Step S1035). Then, the processing operation returns to Step S1021. Thus, the arrival distance of a radio wave including the door lock instruction information can be set as the long distance.

On the other hand, when the microcomputer 1078 concludes in Step S1021 that the door lock switch 1072 has not been operated, the microcomputer 1078 next judges whether the door unlock switch 1073 has been operated or not (Step S1023). When the microcomputer 1078 concludes that the door unlock switch 1073 has been operated, the microcomputer 1078 next reads the ID code stored in the EEPROM 1079, and generates a signal in which instruction information (here, door unlock instruction information) corresponding to the operated switch has been added to the read ID code (Step S1024). Next, the microcomputer 1078 controls the transmission control circuit 1080 to set the low-efficiency antenna 1081 as an output antenna (Step S1033). After that, the microcomputer 1078 outputs the generated signal to the transmission control circuit 1080 so as to radiate the signal from the low-efficiency antenna 1081 (Step S1035). Then, the processing operation returns to Step S1021. Thus, the arrival distance of a radio wave including the door unlock instruction information can be set as a short distance.

On the other hand, when the microcomputer 1078 concludes in Step S1023 that the door unlock switch 1073 has not been operated, the microcomputer 1078 judges whether or not any one of the panic switch 1074, the engine start switch 1075, the engine stop switch 1076 and the trunk release switch 1077 has been operated (Step S1025, S1027, S1029 or S1031) in the same manner as described above. When the microcomputer 1078 concludes that any one of the panic switch 1074, the engine start switch 1075 and the engine stop switch 1076 has been operated, the microcomputer 1078 generates a signal in which instruction information (here, panic instruction information, engine start instruction information or engine stop instruction information) corresponding to the operated switch has been added to the ID code (Step S1026, S1028 or S1030) in the same manner as when the microcomputer 1078 concludes that the door lock switch 1072 has been operated. Then, the microcomputer 1078 radiates the generated signal from the high-efficiency antenna 1082 (Steps S1034 and S1035). As a result, the arrival distance of a radio wave including the panic instruction information, the engine start instruction signal or the engine stop instruction information can be set as the long distance.

When the microcomputer 1078 concludes that the trunk release switch 1077 has been operated, the microcomputer 1078 generates a signal in which instruction information (here, trunk release instruction information) corresponding to the operated switch has been added to the ID code (Step S1032) in the same manner as when the microcomputer 1078 concludes that the door unlock switch 1073 has been operated. Then, the microcomputer 1078 radiates the generated signal from the low-efficiency antenna 1081 (Steps S1033 and S1035). As a result, the arrival distance of a radio wave including the trunk release instruction information can be set as the short distance.

According to the portable transmitter of Embodiment (11), control is made as follows. That is, the user will feel inconvenienced if the engine start/stop function or the panic function cannot be operated from a place at a certain distance from the vehicle. When it is intended to transmit a radio wave including instruction information for activating such a function, the arrival distance of the radio wave to be transmitted is set as a long distance. On the other hand, it will be difficult to secure the safety if the door unlock function or the trunk release function can be operated from a place at along distance from the vehicle. When it is intended to transmit a radio wave including instruction information for activating such a function, the arrival distance of the radio wave to be transmitted is set as a short distance.

Thus, the processing apparatus 1051 mounted on the vehicle cannot receive radio waves including instruction information for activating the door unlock function or the trunk release function when the portable transmitter 1071 is far from the vehicle. The processing apparatus 1051 can receive the radio waves including the instruction information only when the portable transmitter 1071 is close to the vehicle. In other words, the remote operation allowable range can be set suitably for each function, so that not only is it possible to improve the user-friendliness but it is also possible to secure the safety of the vehicle.

Although the portable transmitter according to Embodiment (11) radiates a radio wave including the door lock instruction information from the high-efficiency antenna 1082, the user may not feel so inconvenienced if the door can be locked only in the neighborhood of the vehicle. Therefore, in a portable transmitter according to another embodiment, the radio wave including the door lock instruction information may be radiated from the low-efficiency antenna 1081.

Figure 34:
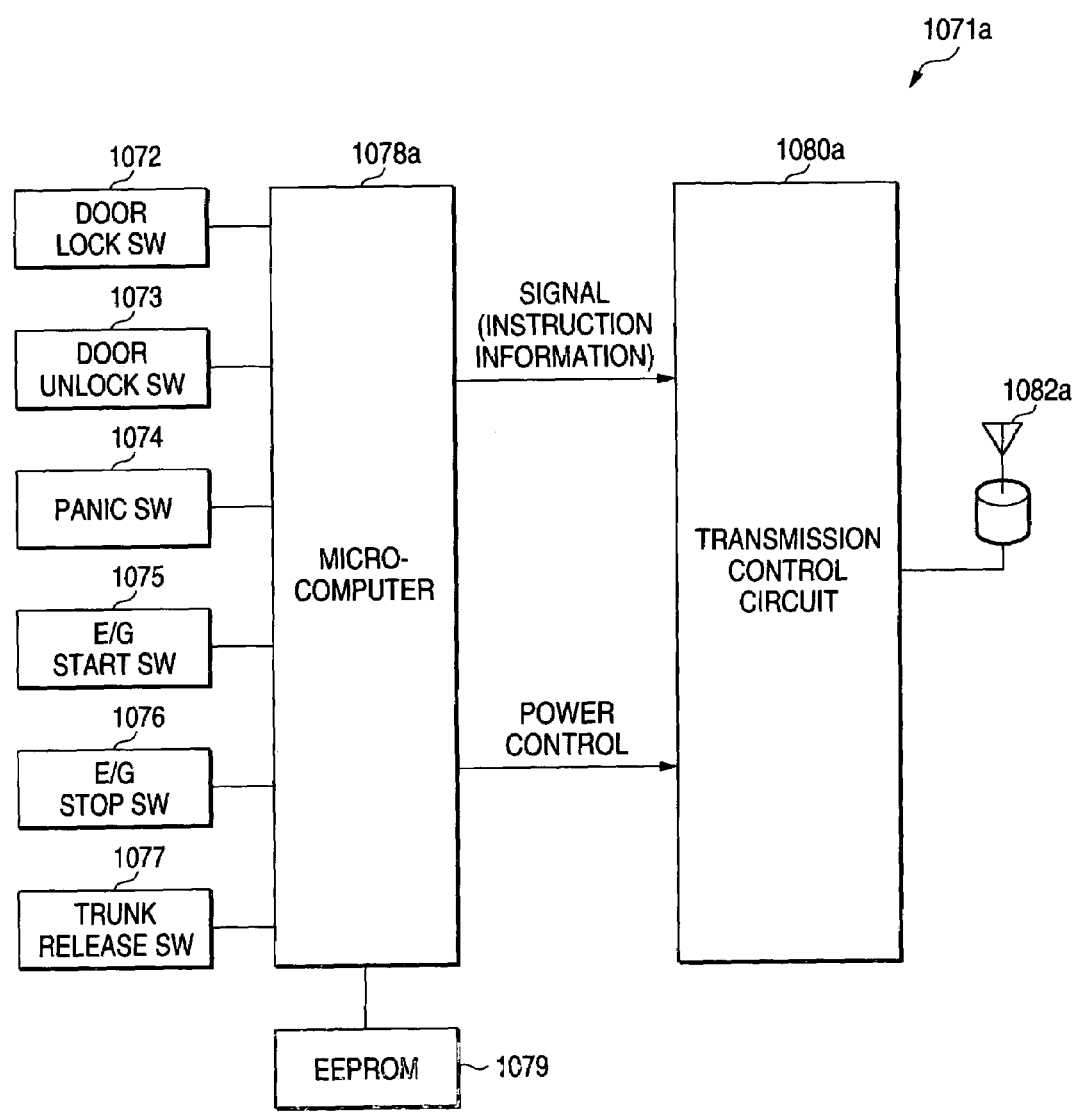
FIG. 34 is a block diagram schematically showing a main portion of a portable transmitter according to another embodiment.

Although the portable transmitter according to Embodiment (11) has the low-efficiency antenna 1081 and the high-efficiency antenna 1082, a portable transmitter 1071a according to another embodiment may have only a high-efficiency antenna 1082a as shown in FIG. 34. In FIG. 34, a microcomputer 1078a controls a transmission control circuit 1080a so as to adjust the power intensity of a radio wave to be transmitted and hence adjust the arrival distance of the transmitted radio wave.

Figure 35:
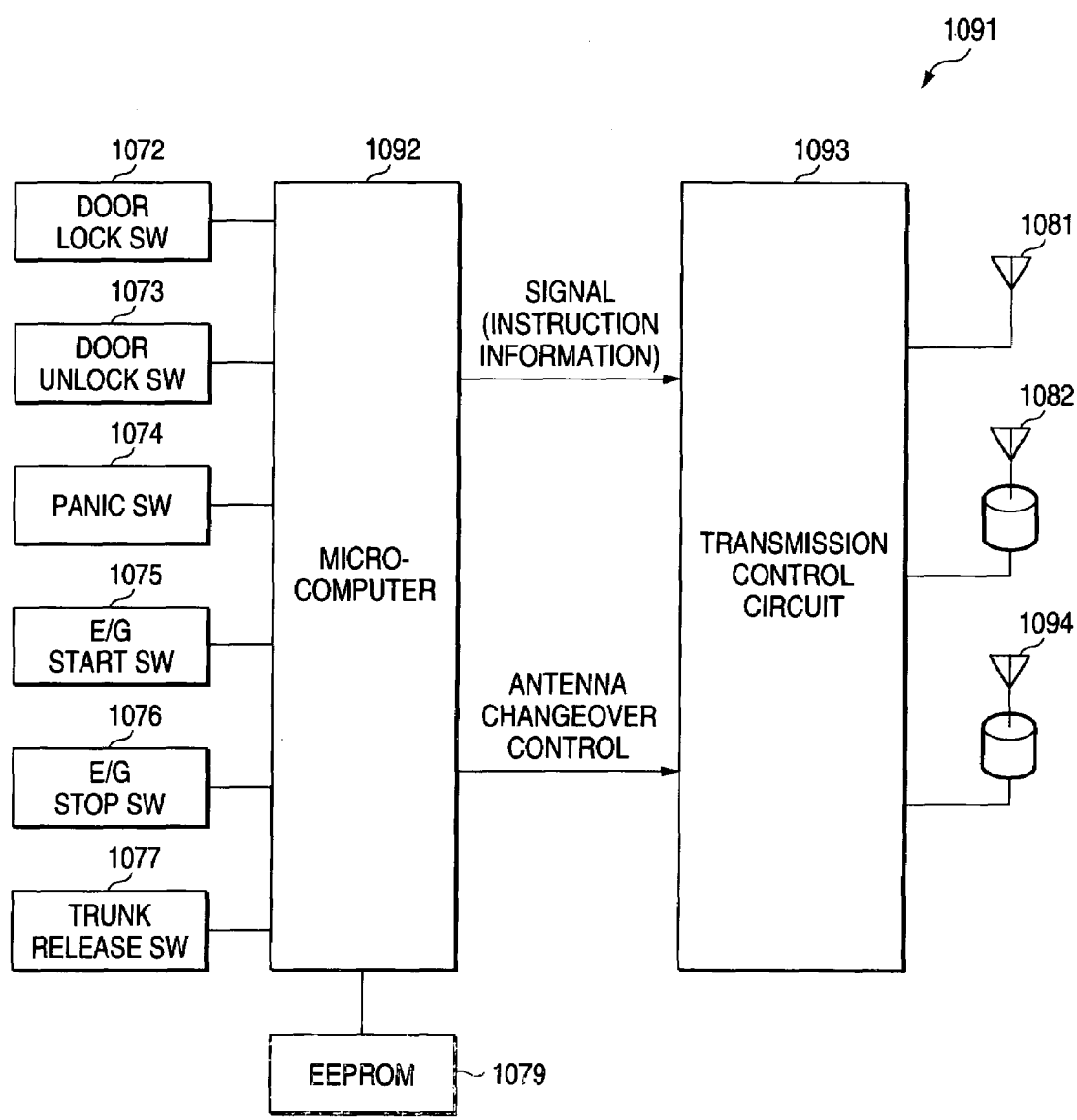
FIG. 35 is a block diagram schematically showing a main portion of a portable transmitter according to Embodiment (12).

FIG. 35 is a block diagram schematically showing a main portion of a portable transmitter according to Embodiment (12). Constituent parts similar to those in the portable transmitter 1071 shown in FIG. 32 are denoted by the same reference numerals correspondingly, and description thereof will be omitted here. In FIG. 35, the reference numeral 1091 represents a portable transmitter. The portable transmitter 1091 includes a microcomputer 1092, an EEPROM 1079, a transmission control circuit 1093, a low-efficiency antenna 1081 for setting a transmitted radio wave arrival distance as a short distance (for example, up to 10 m), a high-efficiency antenna 1082 for setting the transmitted radio wave arrival distance as a long distance (for example, up to 200 m), a high-efficiency antenna 1094 for making the transmitted radio wave arrival distance slightly longer (for example, up to 210 m) than the arrival distance set by the high-efficiency antenna 1082, a door lock switch 1072, a door unlock switch 1073, a panic switch 1074, an engine start switch 1075, an engine stop switch 1076 and a trunk release switch 1077.

Figure 36:
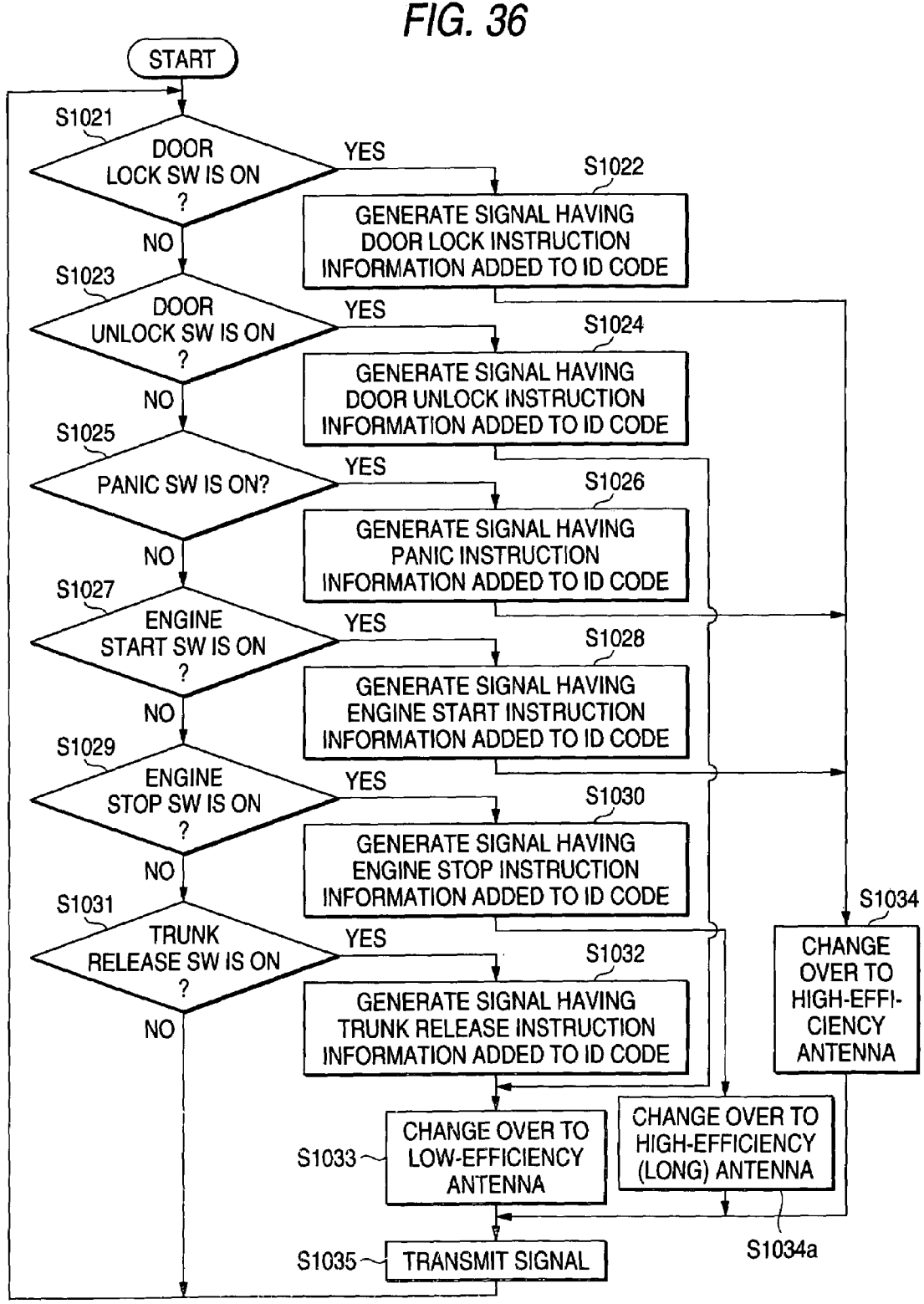
FIG. 36 is a flow chart showing a processing operation to be executed by a microcomputer in the portable transmitter according to Embodiment (12).

Next, a processing operation [12] to be executed by the microcomputer 1092 in the portable transmitter 1091 according to Embodiment (12) will be described with reference to the flow chart shown in FIG. 36. The processing operation [12] is similar to the processing operation [11] shown in FIG. 33 except for steps after the microcomputer 1092 concludes in Step S1029 that the engine stop switch 1076 has been operated. Accordingly, description will be made here about only the operation after the microcomputer 1092 concludes in Step S1029 that the engine stop switch 1076 has been operated.

When the microcomputer 1092 concludes in Step S1029 that the engine stop switch 1076 has been operated, the microcomputer 1092 next reads the ID code stored in the EEPROM 1079, and generates a signal in which instruction information (here, engine stop instruction information) corresponding to the operated switch has been added to the read ID code (Step S1030). Next, the microcomputer 1092 controls the transmission control circuit 1093 so as to set the high-efficiency antenna 1094 as an output antenna (Step S1034a). After that, the microcomputer 1092 outputs the generated signal to the transmission control circuit 1093 so as to radiate the signal from the high-efficiency antenna 1094 (Step S1035). Then, the processing operation returns to Step S1021. Thus, the arrival distance of a radio wave including the engine stop instruction information can be made slightly longer than the arrival distance of a radio wave including the engine start instruction information.

In the portable transmitter according to Embodiment (12), the remote operation allowable range in the engine stop function is not identical to the remote operation allowable range in the engine start function to be paired with the engine stop function, but can be made slightly wider than the remote operation allowable range in the engine start function. Thus, the engine stop function can be always operated remotely wherever the engine start function can be operated remotely. It is therefore possible to prevent the engine from being driven carelessly.

The engine start function is paired with the engine stop function. When the difference in size between the remote operation allowable ranges of the paired functions is too large, there is a fear that the user friendliness deteriorates. For example, assume that the engine stop remote operation is allowable at a place up to 300 m distant from the vehicle, while the engine start remote operation is allowable at a place up to 200 m distant from the vehicle. In this case, there is a fear that it is difficult for the user to grasp how long the remote operation allowable range is in the engine start or stop function. It is therefore desired that the difference between the arrival distances (that is, the remote operation allowable ranges) is set within a predetermined range (for example, 5-30 m).

Although the portable transmitter according to Embodiment (12) radiates a radio wave including the door lock instruction information from the high-efficiency antenna 1082, the user may not feel so inconvenienced if the door can be locked only in the neighborhood of the vehicle. Therefore, in a portable transmitter according to another embodiment, the radio wave including the door lock instruction information may be radiated from the low-efficiency antenna 1081.

In the portable transmitter according to Embodiment (12), the remote operation allowable range in the engine stop function is made wider than the remote operation allowable range in the engine start function. On the contrary, in a portable transmitter according to another embodiment, the remote operation allowable range in the engine stop function may be made narrower than the remote operation allowable range in the engine start function. Thus, the engine start function can be always operated remotely wherever the engine stop function can be operated remotely. It is therefore possible to surely restart the engine even if the user stops the engine accidentally. Incidentally, these settings may be done to meet user's needs.

Of the functions to be mounted in the vehicle, functions to be paired include not only the engine start and stop functions but also the door lock and unlock functions. In a portable transmitter according to further another embodiment, the remote operation allowable range in the door lock function may be made slightly wider or slightly narrower than the remote operation allowable range in the door unlock function paired with the door lock function.

Figure 37:
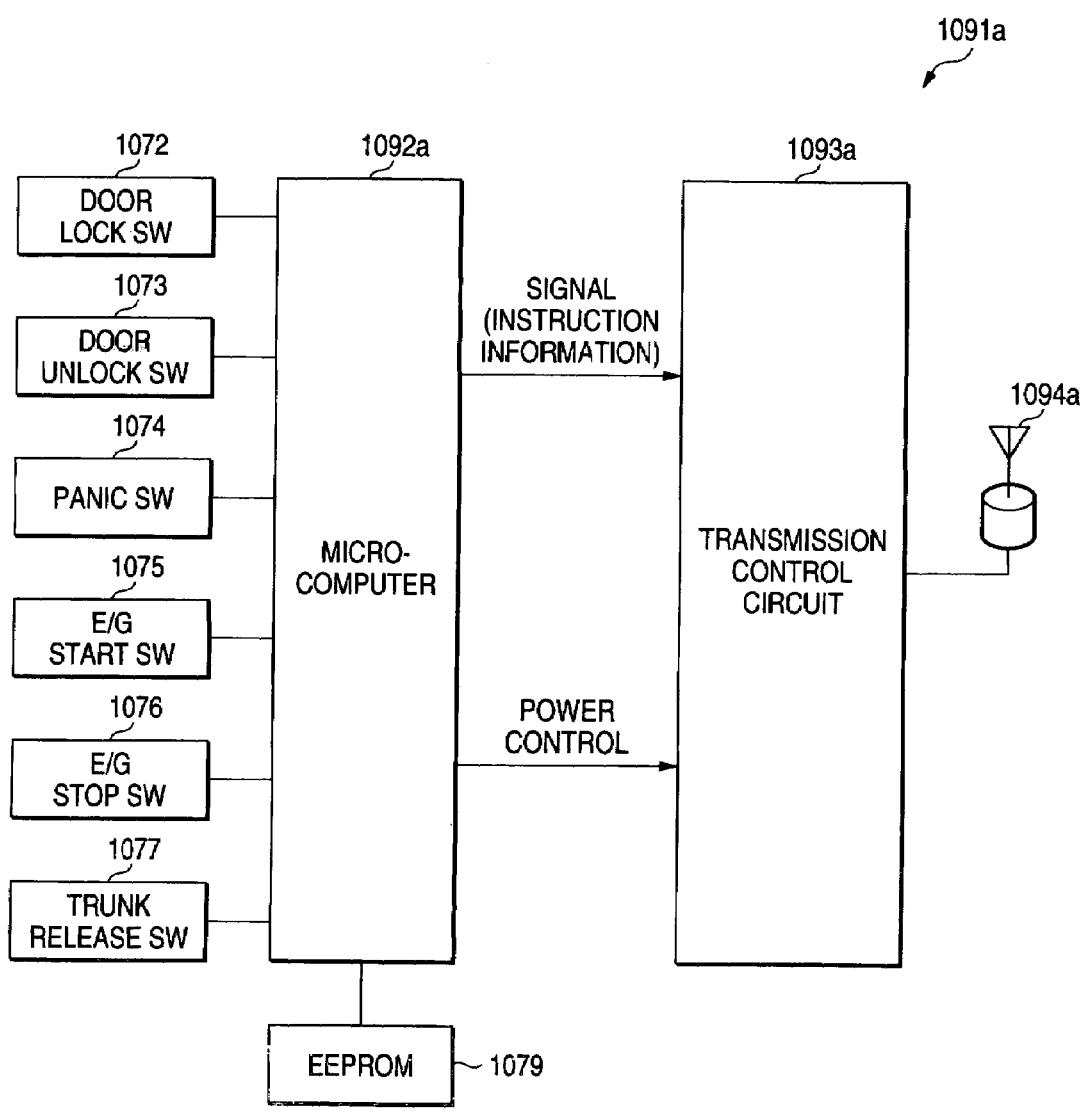
FIG. 37 is a block diagram schematically showing a main portion of a portable transmitter according to another embodiment.

Although the portable transmitter according to Embodiment (12) has the low-efficiency antenna 1081 and the high-efficiency antennas 1082 and 1094, a portable transmitter 1091*a* according to another embodiment may have only a high-efficiency antenna 1094*a* as shown in FIG. 37. In FIG. 37, a microcomputer 1092*a* controls a transmission control circuit 1093*a* so as to adjust the power intensity of a radio wave to be transmitted and hence adjust the arrival distance of the transmitted radio wave.

Figure 38:
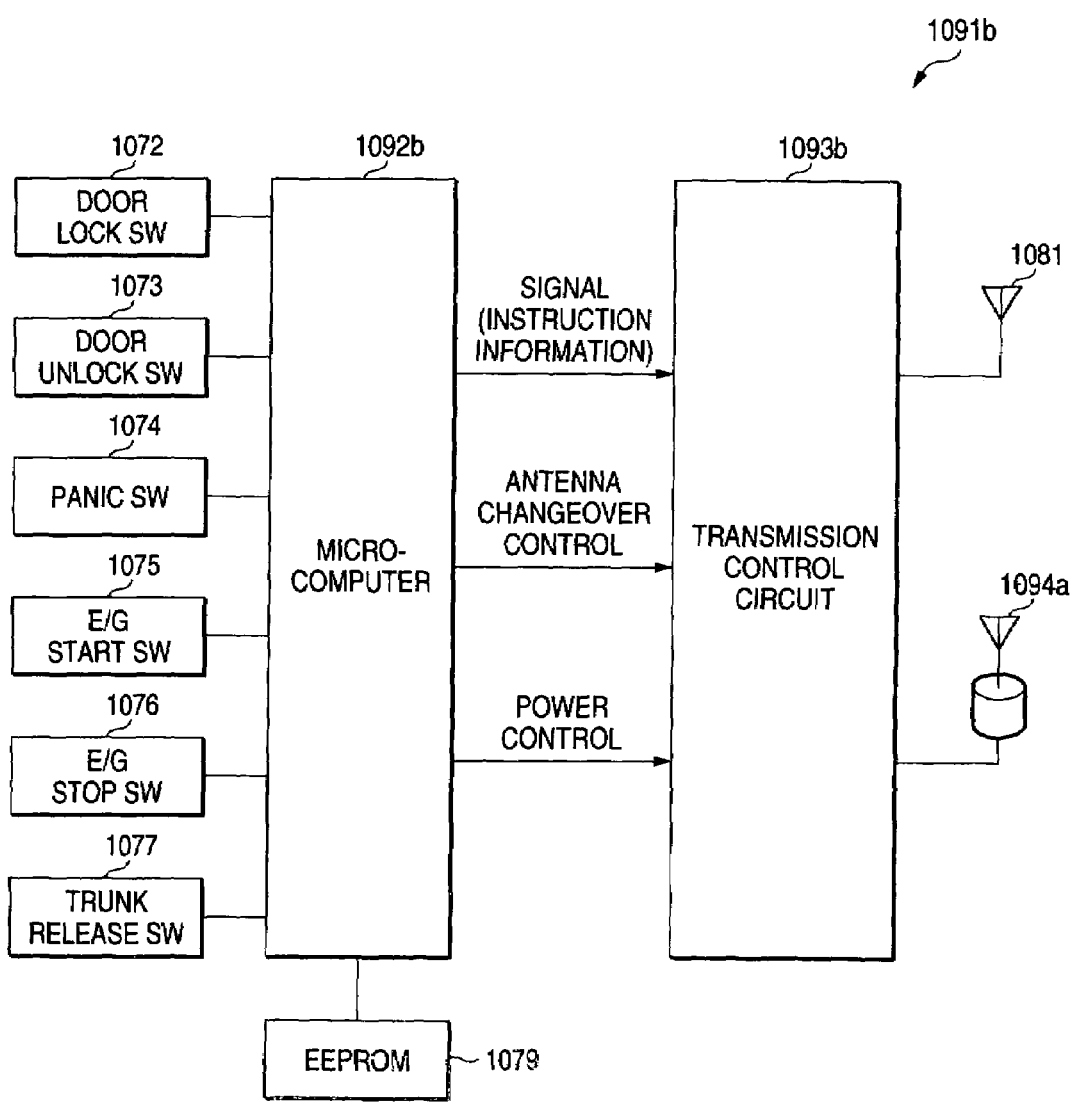
FIG. 38 is a block diagram schematically showing a main portion of a portable transmitter according to another embodiment.

Alternatively, a portable transmitter 1091*b* according to further another embodiment may have the low-efficiency antenna 1081 and the high-efficiency antenna 1094*a* as shown in FIG. 38. In FIG. 38, a microcomputer 1092*b* controls a transmission control circuit 1093*b* so as to change over the output antenna and adjust the power intensity of a radio wave to be transmitted. Thus, the arrival distance of the transmitted radio wave is adjusted.

For example, when the door unlock switch 1073 or the trunk release switch 1077 is operated, the microcomputer 1092*b* may control the transmission control circuit 1093*b* to set the low-efficiency antenna 1081 as the output antenna and radiate a given signal from the low-efficiency antenna 1081. On the other hand, when the door lock switch 1072, the panic switch 1074, the engine start switch 1075 or the engine stop switch 1076 is operated, the microcomputer 1092*b* may control the transmission control circuit 1093*b* to set the high-efficiency antenna 1094*a* as the output antenna and radiate a given signal from the high-efficiency antenna 1094*a*. However, when the engine start switch 1075 is operated, the microcomputer 1092*b* controls the transmission control circuit 1093*b* to reduce the power intensity of the radio wave to be transmitted. Thus, the remote operation allowable range in the engine start function is made not identical to but slightly narrower than the remote operation allowable range in the engine stop function paired with the engine start function.

Figure 39:
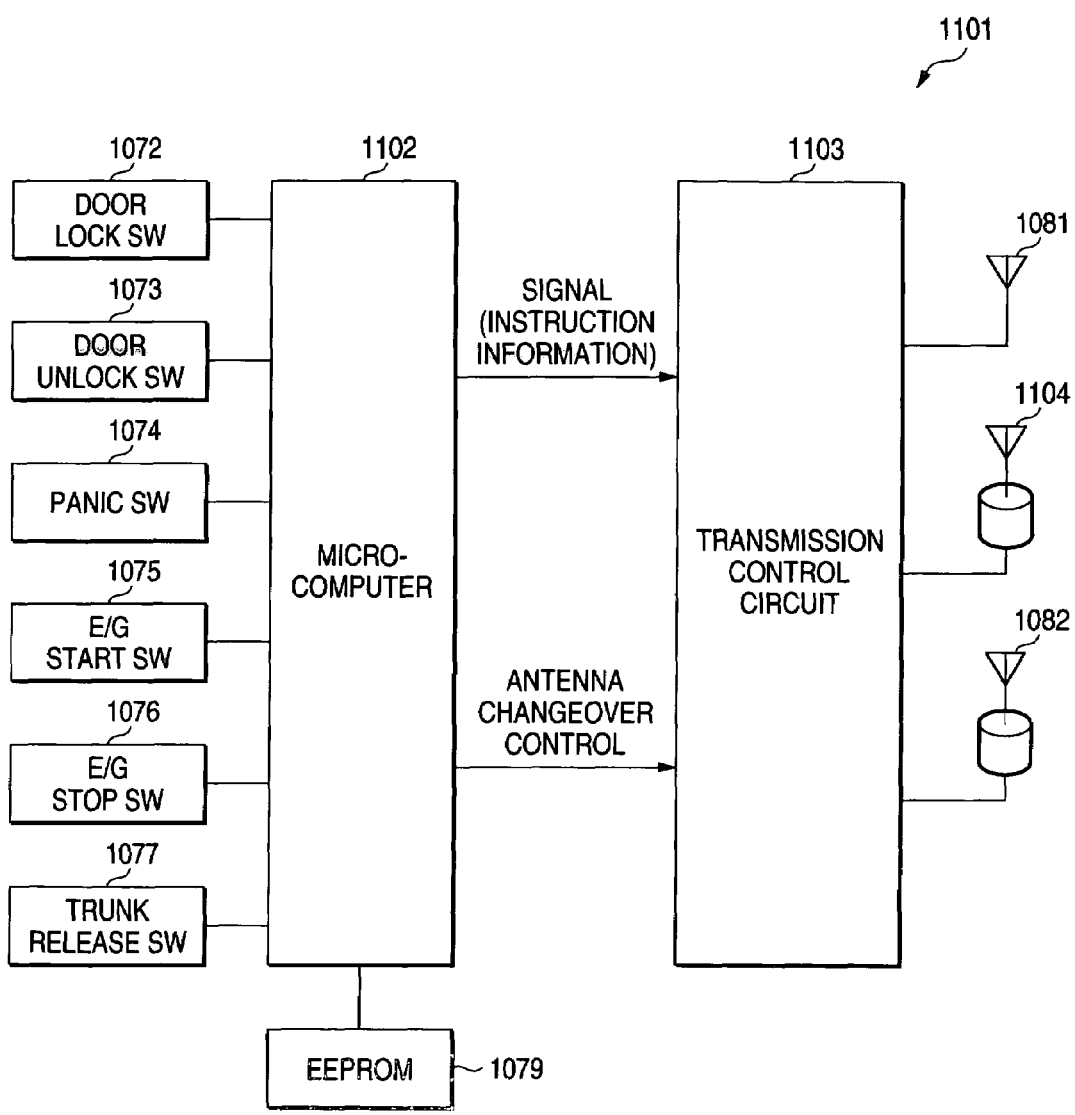
FIG. 39 is a block diagram schematically showing a main portion of a portable transmitter according to Embodiment (13).

FIG. 39 is a block diagram schematically showing a main portion of a portable transmitter according to Embodiment (13). Constituent parts similar to those in the portable transmitter 1071 shown in FIG. 32 are denoted by the same reference numerals correspondingly, and description thereof will be omitted here. In FIG. 39, the reference numeral 1101 represents a portable transmitter. The portable transmitter 1101 includes a microcomputer 1102, an EEPROM 1079, a transmission control circuit 1103, a low-efficiency antenna 1081 for setting a transmitted radio wave arrival distance as a short distance (for example, up to 10 m), a middle-efficiency antenna 1104 for setting the transmitted radio wave arrival distance as a middle distance (for example, up to 30 m), a high-efficiency antenna 1082 for setting the transmitted radio wave arrival distance as a long distance (for example, up to 200 m), a door lock switch 1072, a door unlock switch 1073, a panic switch 1074, an engine start switch 1075, an engine stop switch 1076 and a trunk release switch 1077.

Figure 40:
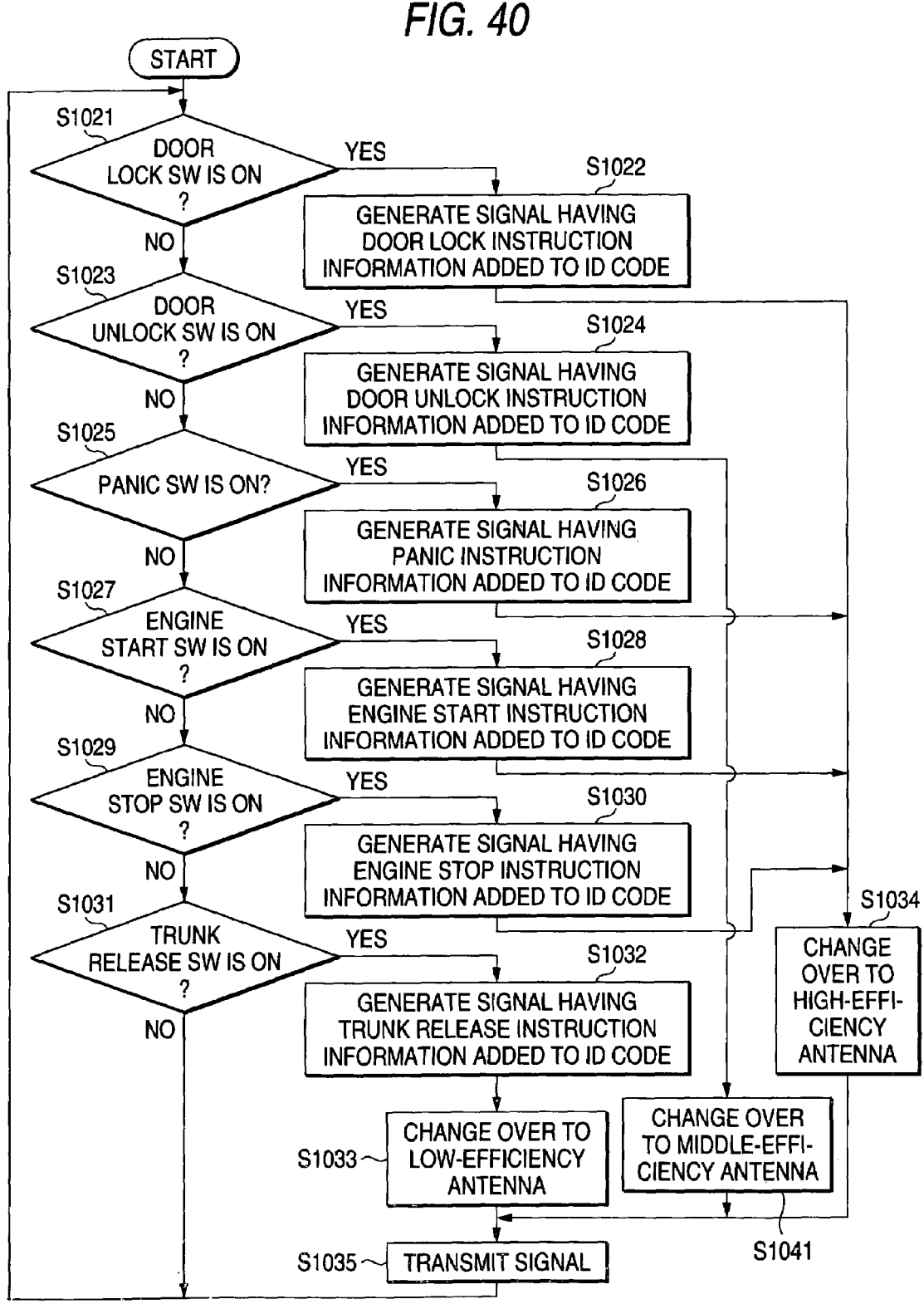
FIG. 40 is a flow chart showing a processing operation to be executed by a microcomputer in the portable transmitter according to Embodiment (13).

Next, a processing operation [13] to be executed by the microcomputer 1102 in the portable transmitter 1101 according to Embodiment (13) will be described with reference to the flow chart shown in FIG. 40. The processing operation [13] is similar to the processing operation [11] shown in FIG. 33 except for steps after the microcomputer 1102 concludes in Step S1023 that the door unlock switch 1073 has been operated. Accordingly, description will be made here about only the operation after the microcomputer 1102 concludes in Step S1023 that the door unlock switch 1073 has been operated.

When the microcomputer 1102 concludes in Step S1023 that the door unlock switch 1073 has been operated, the microcomputer 1102 next reads the ID code stored in the EEPROM 1079, and generates a signal in which instruction information (here, door unlock instruction information) corresponding to the operated switch has been added to the read ID code (Step S1024). Next, the microcomputer 1102 controls the transmission control circuit 1103 so as to set the middle-efficiency antenna 1104 as an output antenna (Step S1041). After that, the microcomputer 1102 outputs the generated signal to the transmission control circuit 1103 so as to radiate the signal from the middle-efficiency antenna 1104 (Step S1035). Then, the processing operation returns to Step S1021. Thus, the arrival distance of a radio wave including the trunk release instruction information can be made shorter than the arrival distance of a radio wave including the door unlock instruction information.

According to the portable transmitter of Embodiment (13), control is made as follows. That is, the user will feel inconvenienced if an engine start/stop function or a panic function cannot be operated from a place at a certain distance from the vehicle. When it is intended to transmit a radio wave including instruction information for operating such a function, the arrival distance of the radio wave to be transmitted is set as a long distance. On the other hand, it will be difficult to secure the safety if a door unlock function can be operated from a place at a long distance from the vehicle. When it is intended to transmit a radio wave including instruction information for operating such a function, the arrival distance of the radio wave to be transmitted is set as a middle distance. Further, when it is intended to transmit a radio wave including instruction information for operating a trunk release function, the arrival distance of the radio wave to be transmitted is set as a short distance.

Fundamentally the user-friendliness is improved as the remote operation allowable range is wider. However, it becomes difficult to secure the safety. According to the portable transmitter of Embodiment (13), the remote operation allowable range in the trunk release function is made narrower than the remote operation allowable range in the door unlock function. Thus, more importance is attached to the security.

This reason will be described below. Whether the trunk has been released or not can be more easily found from the outside than whether the door has been unlocked or not. In addition, the trunk can be closed only by hand. Further, even if the door is unlocked by remote operation, the door cannot open at its own will. Accordingly, chances of theft when the door has been unlocked are lower than those when the trunk has been released. Further, if there is provided an auto-relock function, the door will be locked automatically when a predetermined period of time has passed with the door not open. Thus, it is possible to obtain a remote operation system keeping a balance between the user-friendliness and the security.

Although the portable transmitter according to Embodiment (13) radiates a radio wave including the door lock instruction information from the high-efficiency antenna 1082, the user may not feel so inconvenienced if the door can be locked only in the neighborhood of the vehicle. Therefore, in a portable transmitter according to another embodiment, the radio wave including the door lock instruction information may be radiated from the middle-efficiency antenna 1104 or the low-efficiency antenna 1081.

Figure 41:
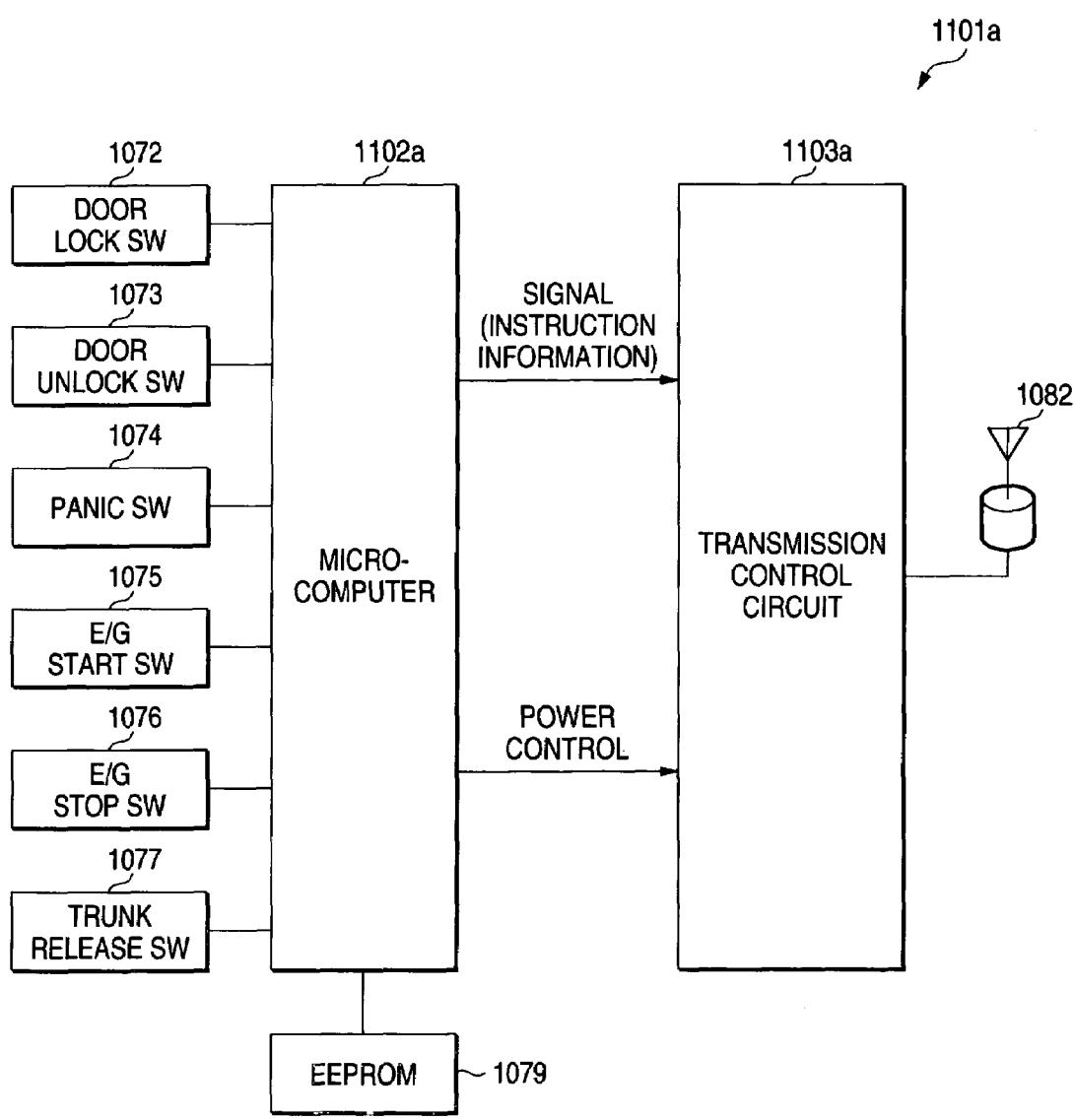
FIG. 41 is a block diagram schematically showing a main portion of a portable transmitter according to another embodiment.

Although the portable transmitter according to Embodiment (13) has the low-efficiency antenna 1081, the middle-efficiency antenna 1104 and the high-efficiency antenna 1082, a portable transmitter 1101a according to another embodiment may have only the high-efficiency antenna 1082 as shown in FIG. 41. In FIG. 41, a microcomputer 1102a controls a transmission control circuit 1103a so as to adjust the power intensity of a radio wave to be transmitted and hence adjust the arrival distance of the transmitted radio wave in three levels.

Figure 42:
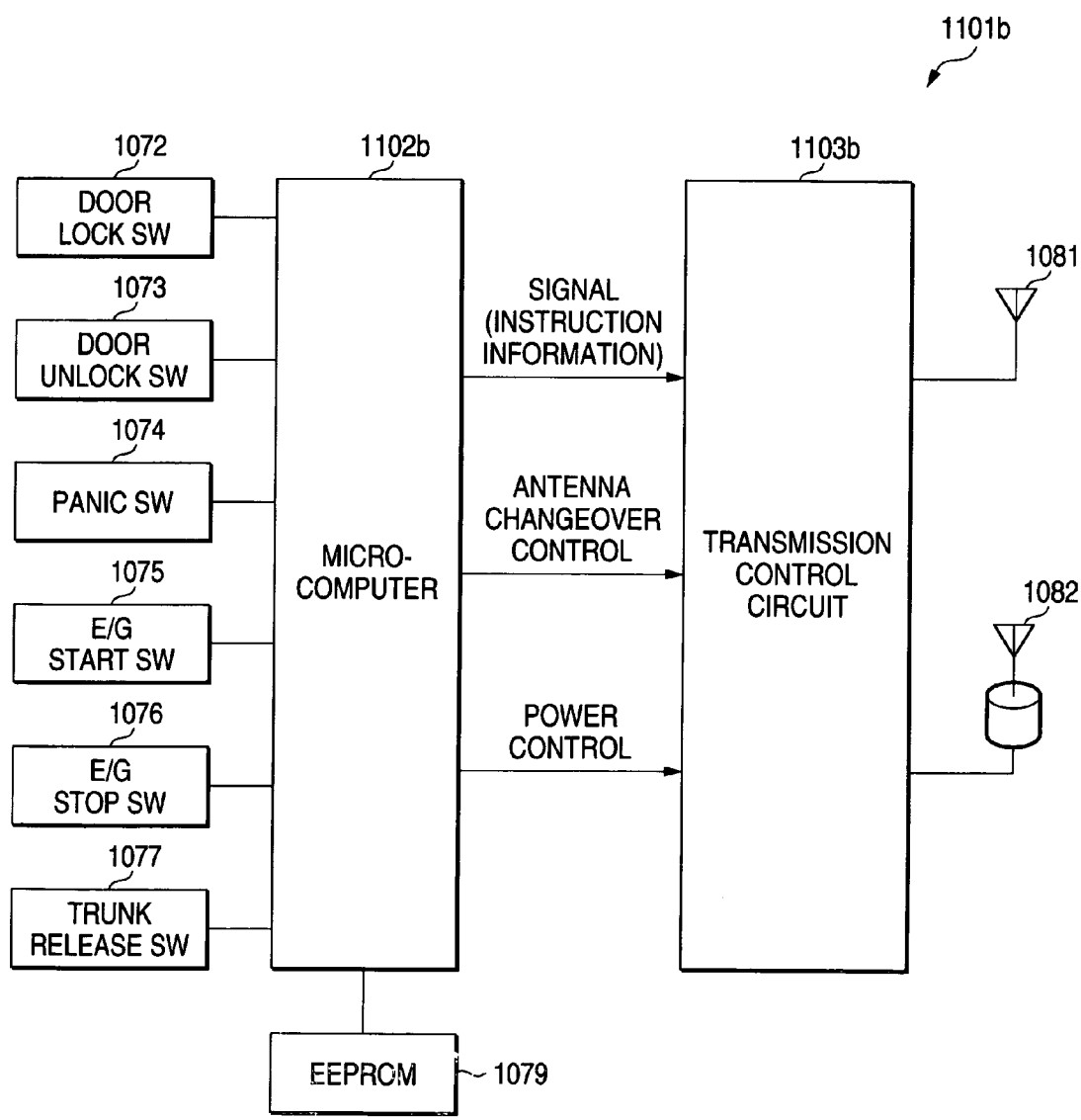
FIG. 42 is a block diagram schematically showing a main portion of a portable transmitter according to another embodiment.

Alternatively, a portable transmitter 1101b according to further another embodiment may have antennas with different radiation efficiencies, for example, the low-efficiency antenna 1081 and the high-efficiency antenna 1082 as shown in FIG. 42. In FIG. 42, a microcomputer 1102b controls a transmission control circuit 1103b so as to switch the output antenna and adjust the power intensity of a radio wave to be transmitted. Thus, the arrival distance of the transmitted radio wave can be adjusted in three levels.

For example, when the trunk release switch 1077 is operated, the microcomputer 1102b may control the transmission control circuit 1103b to set the low-efficiency antenna 1081 as the output antenna and radiate a given signal from the low-efficiency antenna 1081. On the other hand, when the door lock switch 1072, the door unlock switch 1073, the panic switch 1074, the engine start switch 1075 or the engine stop switch 1076 is operated, the microcomputer 1102b may control the transmission control circuit 1103b to set the high-efficiency antenna 1082 as the output antenna and radiate a given signal from the high-efficiency antenna 1082. However, when the door unlock switch 1073 is operated, the microcomputer 1102b controls the transmission control circuit 1103b to reduce the power intensity of the radio wave to be transmitted. Thus, the remote operation allowable range in the door unlock function is narrowed. For example, the remote operation allowable range is set within a range of 30 m from the vehicle.

Figure 43:
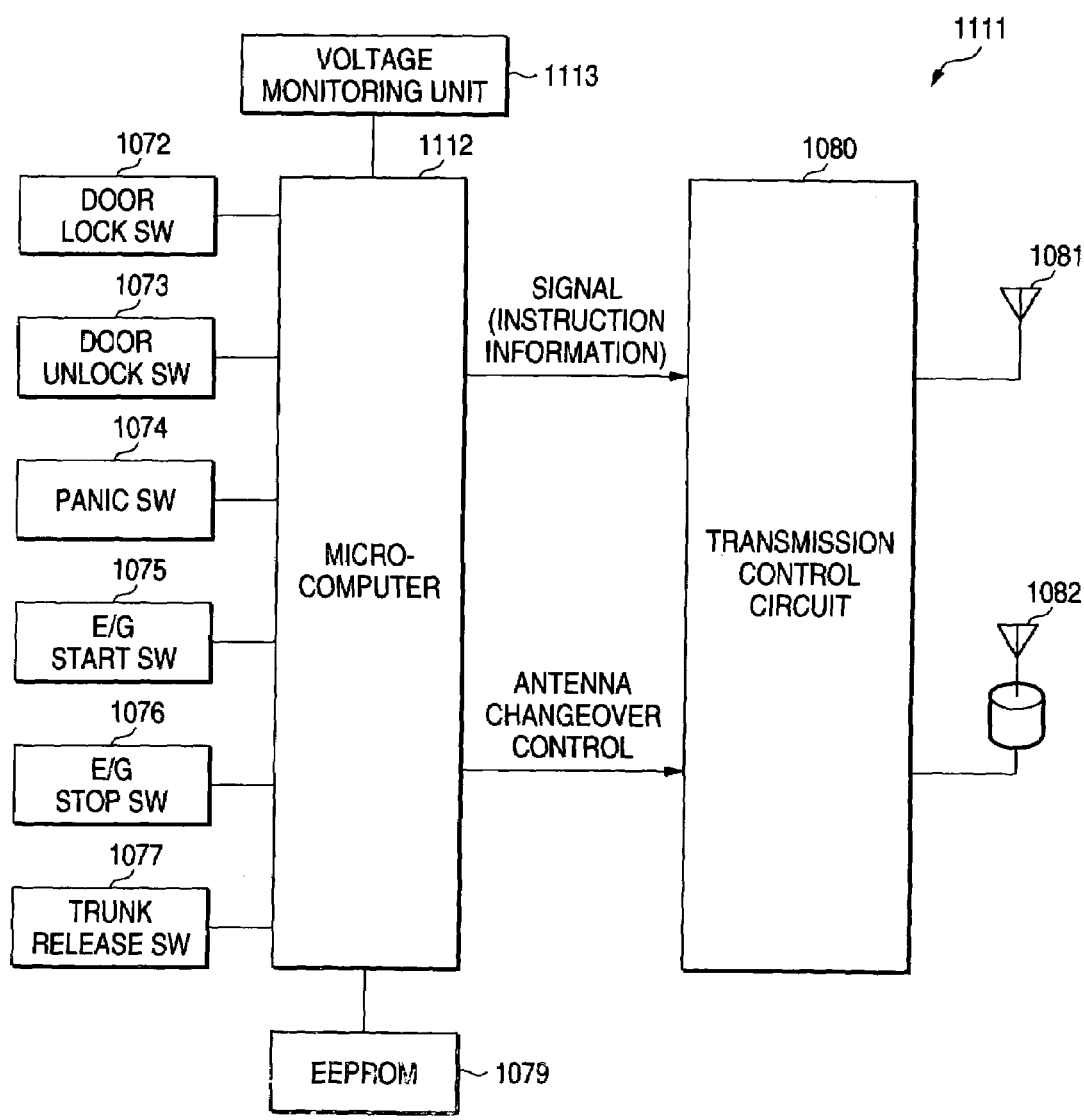
FIG. 43 is a block diagram schematically showing a main portion of a portable transmitter according to Embodiment (14).

FIG. 43 is a block diagram schematically showing a main portion of a portable transmitter according to Embodiment (14). Constituent parts similar to those in the portable transmitter 1071 shown in FIG. 32 are denoted by the same reference numerals correspondingly, and description thereof will be omitted here. In FIG. 43, the reference numeral 1111 represents a portable transmitter. The portable transmitter 1111 includes a microcomputer 1112, an EEPROM 1079, a transmission control circuit 1080, a low-efficiency antenna 1081, a high-efficiency antenna 1082, a door lock switch 1072, a door unlock switch 1073, a panic switch 1074, an engine start switch 1075, an engine stop switch 1076, a trunk release switch 1077, and a voltage monitoring unit 1113. The voltage monitoring unit 1113 monitors a voltage of a battery (not shown) for supplying power to various members, so as to measure the battery capacity.

Figure 44:
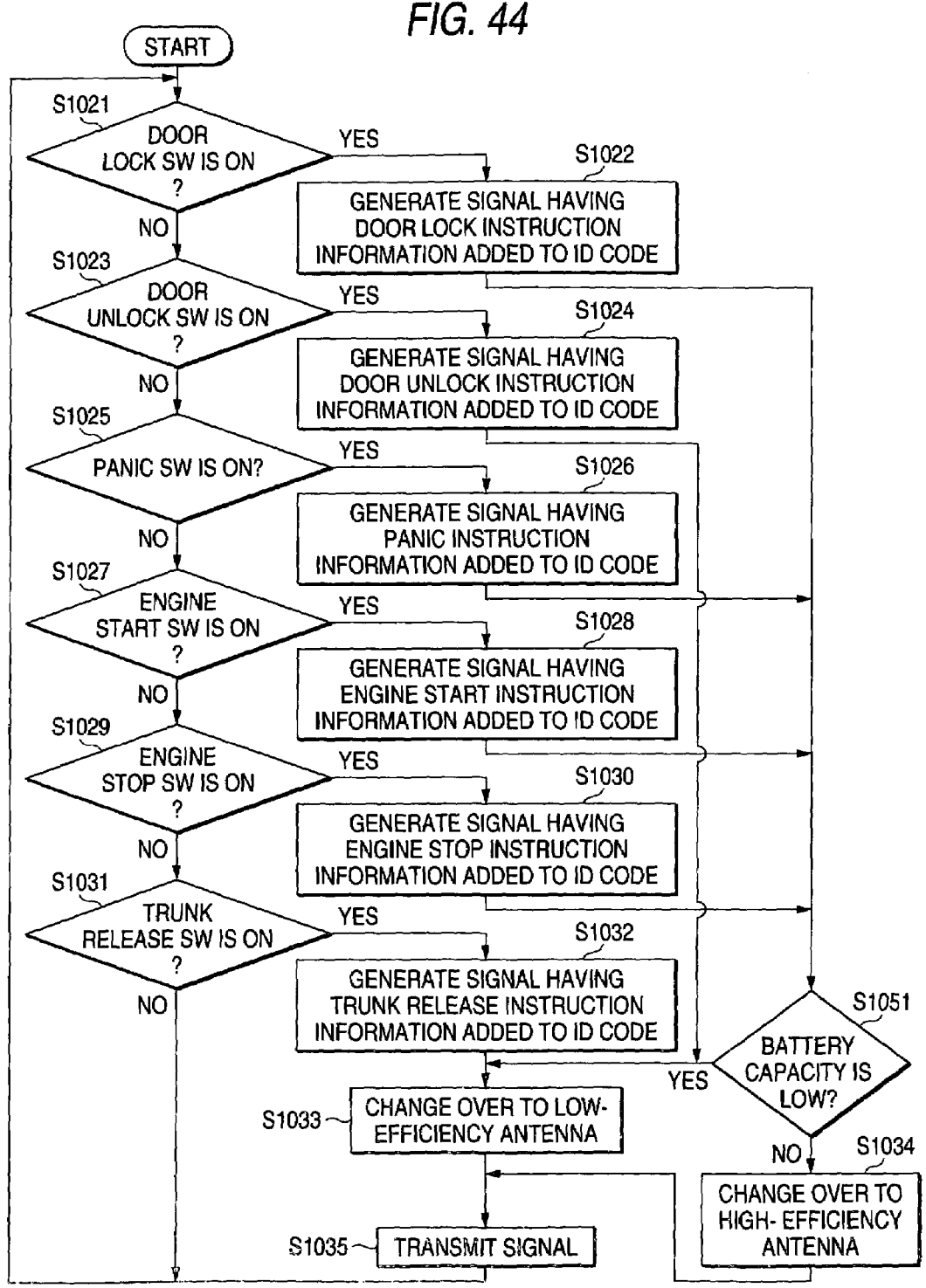
FIG. 44 is a flow chart showing a processing operation to be executed by a microcomputer in the portable transmitter according to Embodiment (14).

Next, a processing operation [14] to be executed by the microcomputer 1112 in the portable transmitter 1111 according to Embodiment (14) will be described with reference to the flow chart shown in FIG. 44. The processing operation [14] is similar to the processing operation [11] shown in FIG. 33 except for steps after the microcomputer 1112 concludes in Step S1021, S1025, S1027 or S1029 that the door lock switch 1072, the panic switch 1074, the engine start switch 1075 or the engine stop switch 1076 has been operated. Accordingly, description will be made here about only the operation after the microcomputer 1112 concludes in Step S1021, S1025, S1027 or S1029 that the door lock switch 1072, the panic switch 1074, the engine start switch 1075 or the engine stop switch 1076 has been operated.

When the microcomputer 1112 concludes in Step S1021, S1025, S1027 or S1029 that the door lock switch 1072, the panic switch 1074, the engine start switch 1075 or the engine stop switch 1076 has been operated, the microcomputer 1112 next reads the read ID code stored in the EEPROM 1079, and generates a signal in which instruction information (for example, door lock instruction information, panic instruction information, engine start instruction information or engine stop instruction information) corresponding to the operated switch has been added to the read ID code (Step S1022, S1026, S1028 or S1030).

Next, based on information obtained from the voltage monitoring unit 1113, the microcomputer 1112 judges whether or not the battery capacity is on or below a predetermined value (Step S1051). When the microcomputer 1112 concludes that the battery capacity is not on or below a predetermined value, the microcomputer 1112 controls the transmission control circuit 1080 so as to set the high-efficiency antenna 1082 as an output antenna (Step S1034). After that, the microcomputer 1112 outputs the generated signal to the transmission control circuit 1080 so as to radiate the signal from the high-efficiency antenna 1082 (Step S1035). Then, the processing operation returns to Step S1021.

On the contrary, when the microcomputer 1112 concludes that the battery capacity is on or below a predetermined value, the microcomputer 1112 controls the transmission control circuit 1080 so as to set the low-efficiency antenna 1081 as the output antenna (Step S1033) in order to reduce required power for transmission of a radio wave. After that, the microcomputer 1112 outputs the generated signal to the transmission control circuit 1080 so as to radiate the signal from the low-efficiency antenna 1081 (Step S1035). Then, the processing operation returns to Step S1021. In this event, in a portable transmitter according to another embodiment, some notification may be given to the user in order to inform the user of the fact that the battery capacity has dropped. For example, a light emitting diode may be provided to be lit for the notification.

In the portable transmitter according to Embodiment (14), the radio wave transmission power is reduced when the battery capacity is on or below the predetermined value. Accordingly, the arrival distance of the transmitted radio wave is shortened, but the usable period of the battery can be prolonged. The portable transmitter according to Embodiment (14) provides a contrivance for the case of the dropped battery capacity based on the portable transmitter according to Embodiment (11) shown in FIG. 32. This contrivance is effective not only in the portable transmitter according to Embodiment (11) but also in the portable transmitters according to Embodiments (9), (10), (12) and (13).

In the portable transmitters according to Embodiments (9) to (14), description has been made about the case where the door lock and unlock functions, the panic function, the engine start and stop functions and the trunk release function are operated remotely. However, functions to be operated remotely are not limited to those functions. For example, unlock functions to be operated remotely may include not only the door unlock function and the trunk release (unlock) function but also a bonnet unlock function, a fuel tank cap unlock function, etc.

What is claimed is:

1. A processing apparatus to be mounted on a to-be-equipped body, for transmitting/receiving signals to/from a portable transmitter portably carried by a user and activating one of functions provided in the to-be-equipped body in accordance with instruction information included in an instruction signal transmitted from the portable transmitter, the processing apparatus comprising:
a receiving unit that receives the instruction signal transmitted from the portable transmitter;
a transmitting unit that transmits a response signal in response to the instruction signal;
a judgment unit that judges whether or not an acknowledgement signal transmitted from the portable transmitter in response to the response signal has been received;
a control unit that activates a function to be activated by the instruction information when the judgment unit concludes that the acknowledgement signal has been received; and
an adjustment unit that adjusts an arrival distance of the response signal in accordance with the function to be activated by the instruction information.

2. A processing apparatus to be mounted on a to-be-equipped body, for transmitting/receiving signals to/from a portable transmitter portably carried by a user and activating one of functions provided in the to-be-equipped body in accordance with instruction information included in an instruction signal transmitted from the portable transmitter, the processing apparatus comprising:
a receiving unit that receives the instruction signal transmitted from the portable transmitter;
a first judgment unit that judges whether or not it is necessary to transmit a response signal in response to the instruction signal, based on a function to be activated by the instruction information included in the instruction signal;
a first control unit that activates the function to be activated by the instruction information when the first judgment unit concludes that it is not necessary to transmit the response signal;
a transmitting unit that transmits the response signal when the first judgment unit concludes that it is necessary to transmit the response signal;
a second judgment unit that judges whether or not an acknowledgement signal transmitted from the portable transmitter in response to the response signal has been received; and
a second control unit that activates the function to be activated by the instruction information when the second judgment unit concludes that the acknowledgement signal has been received.

3. A processing apparatus to be mounted on a to-be-equipped body, for transmitting/receiving signals to/from a portable transmitter portably carried by a user and activating one of functions provided in the to-be-equipped body in accordance with instruction information included in an instruction signal transmitted from the portable transmitter, the processing apparatus comprising:
a receiving unit that receives the instruction signal transmitted from the portable transmitter;
a transmitting unit that transmits a response signal in response to the instruction signal, the response signal being shorter in arrival distance than the instruction signal;
a judgment unit that judges whether or not an acknowledgement signal transmitted from the portable transmitter in response to the response signal has been received; and
a control unit that activates a function to be activated by the instruction information when the judgment unit concludes that the acknowledgement signal has been received.

4. A processing apparatus to be mounted on a to-be-equipped body, for transmitting/receiving signals to/from a portable transmitter portably carried by a user and activating one of functions provided in the to-be-equipped body in accordance with instruction information included in an instruction signal transmitted from the portable transmitter, the processing apparatus comprising:
a receiving unit that receives the instruction signal transmitted from the portable transmitter;
a first control unit that activates a function to be activated by the instruction information included in the instruction signal when the receiving unit receives the instruction signal;
a transmitting unit that transmits a response signal in response to the instruction signal;
a judgment unit that judges whether or not an acknowledgement signal transmitted from the portable transmitter in response to the response signal has been received; and
a second control unit that performs one of (a) canceling activation of the function having no acknowledgement and (b) restoring the to-be-equipped body to a state before activating the function having no acknowledgement, when the judgment unit concludes that the acknowledgement signal has not been received.

5. A processing apparatus to be mounted on a to-be-equipped body, for transmitting/receiving signals to/from a portable transmitter portably carried by a user and activating one of functions provided in the to-be-equipped body in accordance with instruction information included in an instruction signal transmitted from the portable transmitter, the processing apparatus comprising:
a receiving unit that receives the instruction signal transmitted from the portable transmitter;
a first control unit that activates a function to be activated by the instruction information included in the instruction signal when the receiving unit receives the instruction signal;
a transmitting unit that transmits a response signal in response to the instruction signal;
a judgment unit that judges whether or not a cancel signal, which is transmitted from the portable transmitter and includes cancel instruction information, has been received; and
a second control unit that performs one of (a) canceling activation of the function in accordance with the cancel instruction information and (b) restoring the to-be-equipped body to a state before the activation of the function, when the cancel signal reception judgment unit concludes that the cancel signal has been received.

6. The Processing apparatus according to claim 2, further comprising:
an adjustment unit that adjusts an arrival distance of the response signal in accordance with the function to be activated by the instruction information.

7. The processing apparatus according to claim 1, wherein when the function to be activated by the instruction information is a function, which may cause a security problem if a remote operation allowable range for the function is wider than a predetermined distance, the adjustment unit sets the arrival distance of the response signal within the predetermined distance.

8. The processing apparatus according to claim 1, further comprising:
a second judgment unit that judges whether or not a trunk lock mechanism of the to-be-equipped body has been unlocked for at least a predetermined time, when the control unit activates a function of unlocking the trunk lock mechanism in accordance with the instruction signal transmitted from the portable transmitter; and
an information unit that informs the user of a fact that the trunk lock mechanism has been unlocked, when the second judgment unit concludes that the trunk lock mechanism has been unlocked for at least the predetermined time.

9. The processing apparatus according to claim 8, wherein when (a) the control unit activates the function of unlocking the trunk lock mechanism and (b) a door-open detection unit detects that a door is opened before the trunk lock mechanism has been unlocked for the predetermined time, the information unit is prohibited from informing the user.

10. The processing apparatus according to claim 2, further comprising:
a third judgment unit that judges whether or not a trunk lock mechanism of the to-be-equipped body has been unlocked for at least a predetermined time, when the second control unit activates a function of unlocking the trunk lock mechanism in accordance with the instruction signal transmitted from the portable transmitter; and
an information unit that informs the user of a fact that the trunk lock mechanism has been unlocked, when the third judgment unit concludes that the trunk lock mechanism has been unlocked for at least the predetermined time.

11. The processing apparatus according to claim 10, wherein when (a) the second control unit activates the function of unlocking the trunk lock mechanism and (b) a door-open detection unit detects that a door is opened before the trunk lock mechanism has been unlocked for the predetermined time, the information unit is prohibited from informing the user.

12. The processing apparatus according to claim 4, further comprising:
a second judgment unit that judges whether or not a trunk lock mechanism of the to-be-equipped body has been unlocked for at least a predetermined time, when the first control unit activates a function of unlocking the trunk lock mechanism in accordance with the instruction signal transmitted from the portable transmitter; and
an information unit that informs the user of a fact that the trunk lock mechanism has been unlocked, when the second judgment unit concludes that the trunk lock mechanism has been unlocked for at least the predetermined time.

13. The processing apparatus according to claim 12, wherein when (a) the first control unit activates the function of unlocking the trunk lock mechanism and (b) a door-open detection unit detects that a door is opened before the trunk lock mechanism has been unlocked for the predetermined time, the information unit is prohibited from informing the user.

14. A portable transmitter to be portably carried by a user, for transmitting/receiving signals to/from a processing apparatus installed in a to-be-equipped body to remotely operate one of functions provided in the to-be-equipped body, the portable transmitter comprising:
a first transmitting unit that transmits, in accordance with a predetermined operation, an instruction signal including instruction information for activating the function provided in the to-be-equipped body;
a receiving unit that receives signals transmitted from the processing apparatus;
a judgment unit that judges whether or not a response signal transmitted from the processing apparatus in response to the instruction signal has been received; and
a second transmitting unit that transmits a cancel signal including cancel instruction information for giving an instruction to cancel activation of the function to be activated in accordance with the instruction information included in the instruction signal, when the judgment unit concludes that the response signal transmitted from the processing apparatus has not been received.

15. A remote operation system comprising:
a processing apparatus to be mounted on a to-be-equipped body; and
a portable transmitted to be portably carried by a user, wherein:
the processing apparatus includes:
a first receiving unit that receives an instruction signal transmitted from the portable transmitter;
a first transmitting unit that transmits a response signal in response to the instruction signal;
a judgment unit that judges whether or not an acknowledgement signal transmitted from the portable transmitter in response to the response signal has been received;
a control unit that activates a function to be activated by instruction information included in the instruction signal when the judgment unit concludes that the acknowledgement signal has been received; and
a first adjustment unit that adjusts an arrival distance of the response signal in accordance with the function to be activated by the instruction information;
the portable transmitter includes:
a second receiving unit that receives signals transmitted from the processing apparatus;
a second transmitting unit that transmits the instruction signal, in accordance with a predetermined operation;
a third transmitting unit that transmits an acknowledgement signal in response to the response signal transmitted from the processing apparatus; and
a second adjustment unit that adjusts an arrival distance of the instruction signal in accordance with the function to be activated.

16. A portable transmitter for remotely operating functions provided in a vehicle, the portable transmitter comprising:
- a transmitting unit that transmits a signal including an instruction signal for activating one of the functions provided in the vehicle, the functions to be operated remotely including a door unlock function and a trunk unlock function; and
- an adjustment unit that adjusts an arrival distance of a signal transmitted by the transmitting unit so that an arrival distance of a signal for activating the trunk unlock function is shorter than that of a signal for activating the door unlock function.

17. A portable transmitter for remotely operating functions provided in a vehicle, the portable transmitter comprising:
- a transmitting unit that transmits a signal including an instruction signal for activating one of the functions provided in the vehicle, the functions to be operated remotely including an engine stop function and an engine start function; and
- an adjustment unit that adjusts an arrival distance of a signal transmitted by the transmitting unit so that an arrival distance of a signal for activating the engine start function is shorter than that of a signal for activating the engine stop function.

18. A portable transmitter for remotely operating functions provided in a vehicle, the portable transmitter comprising:
- a transmitting unit that transmits a signal including an instruction signal for activating one of the functions provided in the vehicle, the functions to be operated remotely including a panic function and a door unlock function, the panic function being a function of forcibly generating an alarm in response to an instruction from the portable transmitter; and
- an adjustment unit that adjusts an arrival distance of a signal transmitted by the transmitting unit so that an arrival distance of a signal for activating the door unlock function is shorter than that of a signal for activating the panic function.

19. A portable transmitter for remotely operating functions provided in a vehicle, the portable transmitter comprising:
- a transmitting unit that transmits a signal including an instruction signal for activating one of the functions provided in the vehicle, the functions to be operated remotely including a panic function and a trunk unlock function, the panic function being a function of forcibly generating an alarm in response to an instruction from the portable transmitter; and
- an adjustment unit that adjusts an arrival distance of a signal transmitted by the transmitting unit so that an arrival distance of a signal for activating the trunk unlock function is shorter than that of a signal for activating the panic function.

20. The portable transmitter according to claim 16, wherein:
- number of the functions to be operated remotely is three or more; and
- the adjustment units classifies arrival distances of the signals transmitted by the transmitting unit into at least three levels.

21. A portable transmitter for remotely operating functions provided in a vehicle, the portable transmitter comprising:
- a transmitting unit that transmits a signal including an instruction signal for activating one of the functions provided in the vehicle, the functions to be operated remotely including at least three kinds of functions; and
- an adjustment unit that classifies arrival distances of the signals transmitted by the transmitting unit into at least three levels to adjust the arrival distances of the signals based on the functions to be operated remotely.

22. The portable transmitter according to claim 16, wherein:
- the adjustment unit adjusts power intensity of the signal transmitted by the transmitting unit so as to adjust the arrival distance of the signal.

23. The portable transmitter according to claim 16, further comprising:
- a plurality of transmitting antennas different in radiant efficiency, wherein:
- the adjustment unit changes over from one of the transmitting antennas to another so as to adjust the arrival distance of the signal.

24. The portable transmitter according to claim 16, further comprising:
- a detection unit that detects a battery capacity; and
- an output reduction unit that reduces a radio wave transmission power based on the battery capacity detected by the detection unit.

25. The portable transmitter according to claim 16, further comprising:
- an information unit that informs a user of reduction in the radio wave transmission power based on the battery capacity detected by the detection unit.

* * * * *